United States Patent [19]
Horiuchi et al.

[11] Patent Number: 5,978,511
[45] Date of Patent: Nov. 2, 1999

[54] METHOD AND APPARATUS OF INPUTTING AND OUTPUTTING COLOR PICTURES AND CONTINUALLY-CHANGING TONE PICTURES

[75] Inventors: Takahiko Horiuchi; Ryoji Haruki, both of Tsukuba, Japan

[73] Assignee: Tsukuba Software Laboratory Co., Ltd., Iwai, Japan

[21] Appl. No.: 08/811,352

[22] Filed: Mar. 4, 1997

[30] Foreign Application Priority Data

Nov. 12, 1996 [JP] Japan .................................... 8-317017

[51] Int. Cl.$^6$ ...................................................... G06K 9/36
[52] U.S. Cl. ............................................................ 382/241
[58] Field of Search ...................................... 382/153, 232, 382/233, 240, 241, 242, 243, 266, 272, 294

[56] References Cited

U.S. PATENT DOCUMENTS

| | | |
|---|---|---|
| 5,572,605 | 11/1996 | Toraichi . |
| 5,579,444 | 11/1996 | Dalziel et al. ........................... 382/153 |
| 5,710,838 | 1/1998 | Jung ........................................ 382/242 |
| 5,867,602 | 2/1999 | Zandi et al. ............................. 382/248 |

FOREIGN PATENT DOCUMENTS

| | | |
|---|---|---|
| 40 05 492 A1 | 8/1990 | Germany . |
| 6-83952 | 3/1994 | Japan . |
| 6-96199 | 4/1994 | Japan . |
| WO 96/02894 | 2/1996 | WIPO . |

OTHER PUBLICATIONS

Baseri et al, "Region–Based Coding of Images Using a Spline Model", Proceedings of the International Conference on Image Processing (IC, Austin Nov. 13–16, 1994, vol. 3, No. Conf. 1, Nov. 13, 1994, pp. 866–870, IEEE.

Liu et al, "Optimal Contour Approximation by Deformable Piecewise Cubic Splines", Proceedings of the Computer Society Conference on Computer Vision of a Pattern Recognition, Lahaina, Maui, Hawaii, Jun. 3–6, 1991, pp. 638–643, IEEE.

Yasumoto et al, "Corner Detection and Curve Representation Using Cubic B–Splines", Systems and Computers in Japan, vol. 19, No. 12, Dec. 1, 1988, pp. 73–80.

Eden et al, "On the Performance of a Contour Coding Algorithm in the Context of Image Coding Part 1: Contour Segment Coding", Signal Processing European Journal Devoted to the Methods and Applications of Signal Processing, vol. 8, No. 4, Jul. 1985, pp. 381–386.

(List continued on next page.)

*Primary Examiner*—Jose L. Couso
*Attorney, Agent, or Firm*—Pillsbury Madison & Sutro LLP

[57] ABSTRACT

An apparatus for inputting, compressing, memorizing and regenerating continually-changing tone pictures or color pictures, which allows us to store the image data by a small amount of memory, to output the regenerating picture in a short time and to enlarge the picture in any size with keeping its quality. The apparatus proceeds the inputting steps of reading-in a continually-changing picture, dividing the picture into a plurality of regions of the pixels having similar tones within a width 2W, reckoning an average tone of every region, producing an average-tone picture by painting every region with the average tone, extracting boundaries dividing neighboring regions artificially, seeking branch points and turning points on the boundaries, approximating the coordinates (x,y) of subboundaries terminated at the branch points or the turning points by single-variable spline functions by the biorthonormal function method till the errors become smaller than a critical value, memorizing coefficients of the approximation functions as boundary data, making a differential image by subtracting the average-tone image from the input image, approximating the differential tone image by two-variable spline functions by the biorthonormal method till the errors become smaller than a critical value, and memorizing the coefficients of the approximation functions. In the case of a color picture, the input picture is resolved into three or four primary color pictures.

17 Claims, 13 Drawing Sheets

OTHER PUBLICATIONS

Liow, "A Contour Tracing Algorithm That Preserves Common Boundaries Between Regions", Computer Vision Grpahics and Image Processing, vol. 53, No. 3, May 1, 1990, pp. 313–321.

Trans.IEE of Japan, vol. 113–C, No. 12, Dec. 1993, On Method of Extracting Joints for Generating Function–Fonts of Multi–Symbols, Takahiko Horiuchi et al, pp. 1136–1143 (with translation attached).

IEEE Transactions on Biomedical Engineering, vol. 40, No. 6 Jun. 1993 Compressing Data Volume of Left Ventricular Cineangiograms, Kazuo Toraichi et al, pp. 579–588.

A Study on Adaptable System Model and Its Application to Desktop Publishing system, Takahiko Horiuchi, Dissertation Presented to doctoral Program in Engineering, Mar. 1995 Fast Observation Method for Realizing Real–Time Processing (32), pp. 100–105.

Digital Image Processing, William K. Pratt, A Wiley–Interscience Publication, pp. 93–120.

IEEE Transactions on Medical Imaging, vol. MI–2, No. 1, Mar. 1983 Comparison of Interpolating Methods for Image Resampling, J.Anthony Parker et al, pp. 31–39.

Improvement of Video Hardcopy Image Quality by Using Spline Interpolation, Kazuo Toraichi et al, vol. J71–D No. 7, pp. 1276–1285.

The Transactions of the institute of Electronics, Information and Communication Engineers D–II, The Information and Systems Society, vol. J79–D–II No. 5 pp. 647–1016, May 25, 1996.

The Transactions of the Institute of Electronics, Information and Communication Engineers (D–II No. 4 pp. 819–920 Apr. 24, 1993.

The Transactions of the Institute of Electronics Information and Communication Engineers (D–II) vol. J76–DII No. 9 pp. 1835–2154 Sep. 25, 1993.

FIG. 2(a) Input Image
FIG. 2(b) Average-Tone Image
FIG. 2(c) Boundaries
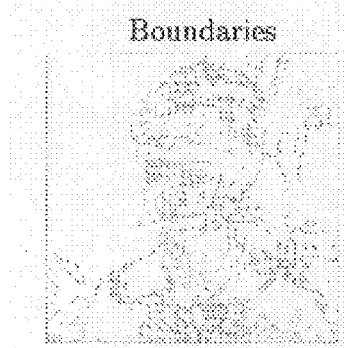
FIG. 2(d) Branch Points
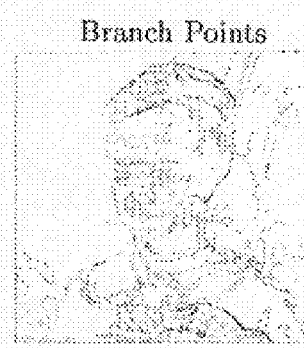
FIG. 2(e) Turning Points
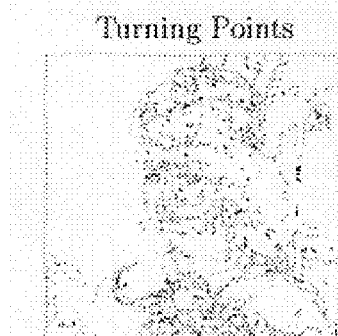
FIG. 2(f) Differential Image
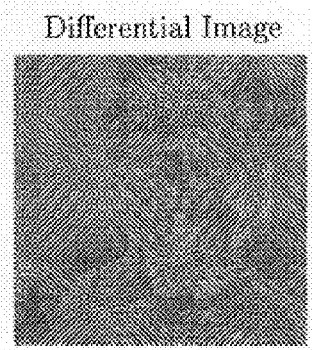
FIG. 2(g) Revived Image

Input Image

Average-Tone Image

Boundaries

Branch Points

Turning Points

Differential Image

W = 8

Average-Tone Image

W = 16

Average-Tone Image

W = 32

Average-Tone Image

FIG.5 (a)
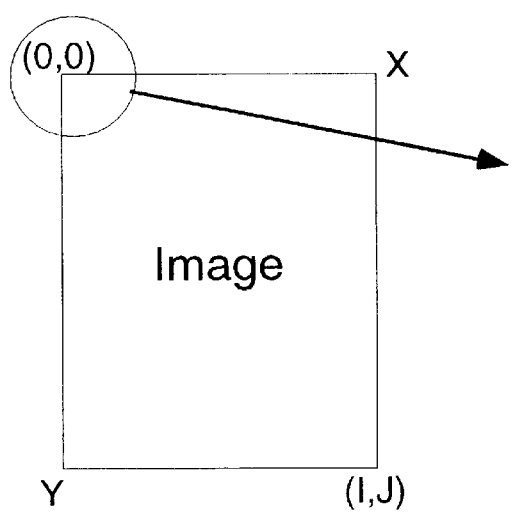
FIG.5 (b)
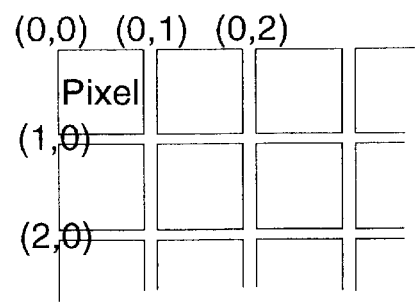
FIG.6 (a)
FIG.6 (b)
FIG.6 (d)
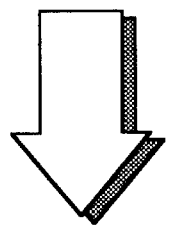
Magnification
FIG.6 (c)
FIG.6 (e)

FIG. 7(a) FIG. 7(b) FIG. 7(c)
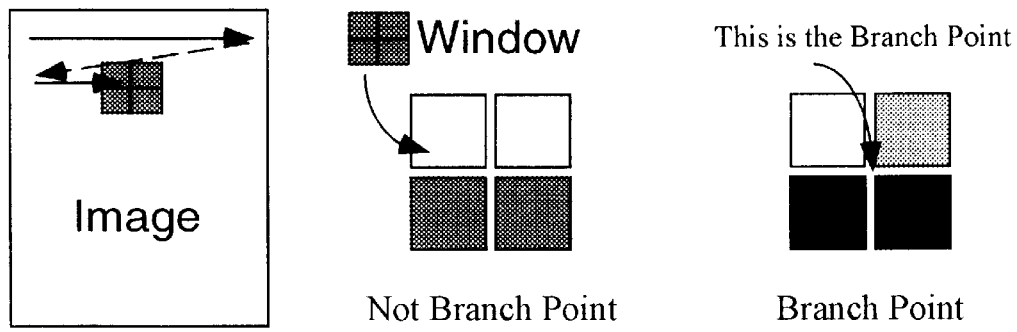
Not Branch Point     Branch Point
FIG. 8(a)     FIG. 8(b)
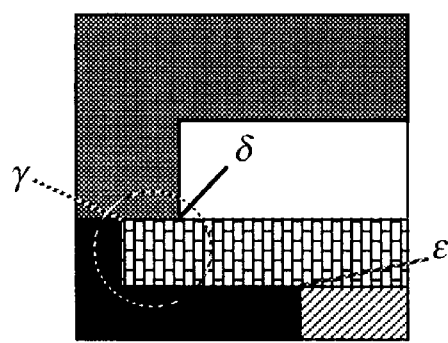 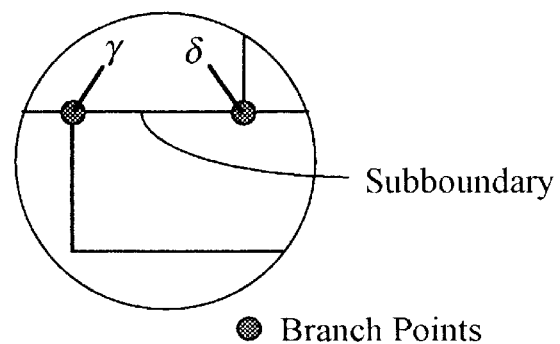
FIG. 9(a)     FIG. 9(b)
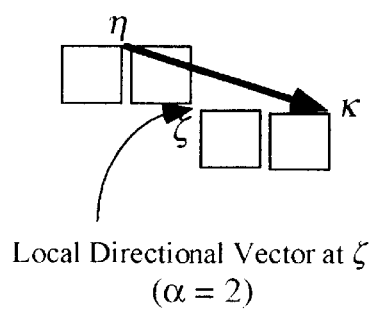 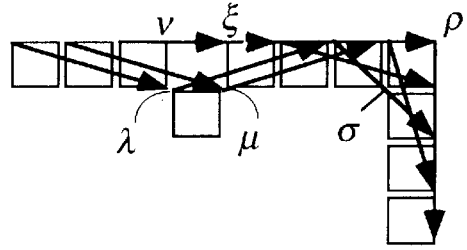
Local Directional Vector at $\zeta$
($\alpha = 2$)

W = 8
Differential Image

W = 1 6
Differential Image

W = 3 2
Differential Image

Differential Image

Original Picture

Original Picture

Regenerated Picture

Regenerated Picture

Reduced Regenerated Picture

Regenerated Picture

Enlarged Regenerated Picture

Outline

Branch Points

Boundary

METHOD AND APPARATUS OF INPUTTING AND OUTPUTTING COLOR PICTURES AND CONTINUALLY-CHANGING TONE PICTURES

FIELD OF THE INVENTION

This invention relates to a method and an apparatus of inputting and outputting color pictures and monochromatic continually tone-changing pictures. In this description, the continually tone-changing picture is used as a concept of a various mode of tones of a picture excluding a binary (two-valued) tone picture which consists of white regions and black regions. The number of steps of tone is sometimes 256, 512 or 1028. The continually tone-changing picture is sometimes called a "continually changing tone pictures" or a "continual-tone picture" in short in this description. Similarly, a "binary tone picture" is sometimes written as a "binary picture" in brief.

Since a color picture can be resolved to three or four elementary color pictures by solving the original picture by regard to elementary colors, the processing of the resolved pictures can be treated by the same way as the monochromatic continually tone-changing pictures. The resolution of a color picture into elementary-color images and the synthesis of the elementary-color images into a unified color picture are one of the well-known techniques. The essence of this invention is the processing of monochromatic continually-changing tone pictures. Thus, the following explanation mainly relates to the processing of monochromatic continually-changing tone pictures. The processing of a color picture can be reduced to three or four processings of the elementary-color images.

Pictures have been gradually treated as assemblies of digital information. The digital information signifies two meanings, that is, one is the capability of resolving a picture into pixels by sampling images, and the other is the capability of reduced into definite number of steps by quantization of the tone of every pixel. Namely, "digital" signifies discrete pixels which are separated spatially and discrete degrees of the tones of a pixel.

Furthermore, object pictures are, in general, more complicated year by year in various fields of applications of pictures. Available fields of services for picture processing are expanding. The object pictures are not only photographs but also handwriting illustrations, characters and computer graphics. The services of the picture processing are not only restricted to the regeneration of pictures, but are expanding to the enlargement of object pictures in an arbitrary scale, the free laying out and the printing the processed pictures.

These various purposes require a new method capable of inputting and outputting various types of pictures, transforming the pictures in size or orientation and regenerating the objects with high quality. Besides, it is desirable to compress the data of pictures and to reduce the number of data for curtailing the amount of memory and shortening the processing time.

The pictures which this invention aims at include photographs, calligraphic characters, printed characters, illustrations and logomarks or paintings. The continually-changing tone pictures are the pictures in which the tone (intensity) of the base color is continually changing spatially. This invention includes color pictures besides monochromatic pictures, since a color picture can be reduced to four or three elementary-color monochromatic pictures by resolving the object color picture with regard to elementary colors. Namely, an object of the present invention is the image-processing of the pictures which vary continually the intensity of colors.

A continually-changing tone picture is used as an antonym of a simple two-value picture which is briefly constructed with the regions of black and the extra regions of white. Thus the objects of the present invention include not only tone-changing monochromatic pictures but also tone-changing color pictures. This invention, however, is also capable of processing simpler binary pictures owing to the affluent generality.

Therefore the present invention aims at reading in a continual-tone picture, obtaining multivalued data from the inputted picture, eliminating noise, reducing the number of data, memorizing the compressed data with a smaller amount of memory and regenerating the original continual-tone picture from the data without losing the features.

In the case of a color picture, this invention preparatively dissolves the read-in original color pictures into four or three elementary-color pictures. Then this invention processes the elementary-color monochromatic pictures independently in the same manner of obtaining multivalued data from the dissolved monochromatic data, eliminating noise, reducing the number of data, memorizing the compressed data in memories, regenerating the elementary-color pictures from the data without losing the inherent features, and synthesizing the elementary-color pictures into a single continual-tone color picture.

BACKGROUND OF THE INVENTION

This application claims the priority of Japanese Patent Application No.8-317017(317017/1996) filed on Nov. 12, 1996, which is incorporated herein by reference.

Three types of data processing methods have been proposed for inputting, storing and regenerating continual-tone pictures.

(A) Bit map data method which treats the data of object pictures as an assembly of bit map data.

(B) Discrete cosine transformation method (DCT method) which compresses the image data by the discrete cosine transformation.

(C) Function-approximation method which approximates the image data by a special function.

The three prior methods are explained in short.

(A) Bit Map Data Method

The bit map data method is the most popular method of processing continual-tone pictures by dissolving the object pictures into individual pixels, determining the tone-values (degrees of tones) of the individual pixels, memorizing the tone-values of all the pixels as they are without data compression, and regenerating the pictures from the memorized data of tone-values directly. The method stores all the tone-data of all the pixels in memories. The process is so simple that many people adopt the bit map method for treating continual-tone pictures at present.

Nevertheless, this method is annoyed at an enormous amount of data, because the method must memorize the crude tone data of all the pixels. Such a huge amount of data brings about a fatal drawback to the bit map data method. The treatment of the huge data requires a big capacity of memory and a long time for processing.

Besides, the method tries to enlarge, reduce or transform an object picture by enlarging, reducing or transforming the coordinates of all the related pixels directly, since all the tone data are stored as the inherent values of individual pixels. The bit map calculation degrades the quality of the regenerated pictures. The peripheries of individual image components are often blurred. Some people proposed improvements for overcoming the inherent defects of the bit map data method.

① W. K. Pratt:"Digital Image Processing", Wiley Interscience, New York (1978).

② (J. A. Parker, R. V. Kenyon and D. E. Troxel:"Comparison of Interpolating Methods for Image Resampling", IEEE Trans. MI, MI-2, 1, pp.31–39 (1983).

③ Kazuo Toraichi, Masaru Kamada, Satomi Ishiuchi, Sai Yang and Ryoichi Mori,"Improvement of Video Hardcopy Image Quality by using Spline Interpolation", Trans. IEICE Jpn (D) vol. J71-D, No.7, pp.1276–1285 (1988).

④ Akira Tanaka, Hideyuki Imai, Masaaki Miyakoshi, Jun Date, "Enlargement of Digital Images by Multiresolution Analysis", Trans. IEICE Jpn (D-II) vol. J79-D-II, No.5, pp819–825 (1996).

① and ② suggested improvements of interpolating the bit map data by the sinc function, and outputting the interpolated data. ③ proposed another improvement of interpolating the bit map data by using piecewise polynomials, and outputting the interpolated data. ④ tried to analyse the bit map data by the multiresolution way with a plurality of degrees of resolution and interpolate the bit map data by the analysis, and output the data interpolated by the multiresolution analysis. These trials are capable of enlarging or reducing the pictures, since unknown data are obtained by interpolating according to some rules. These improvements are still annoyed at an enormous amount of the bit map data, since they store the parameters of the object pictures as the bit map data, and they enlarge, reduce or regenerate the pictures from the stored bit map data. Therefore, these proposals cannot give the final solution for the inherent difficulty of the bit map data method.

(B) Discrete Cosine Transformation Method (DCT Method)

The discrete cosine transformation method is effective for such a picture having continually-changing tones but is incompetent for a picture in which the tone changes drastically. The discontinuity of the tone gives the DCT method the block distortion or the edge degeneration. The incompetence for the quick-changing tone induces a fatal drawback of degrading the quality of the picture in the case of the picture including various types of images. Another weak point is the degeneration accompanying the enlargement of the object picture. The enlargement, the reduction or the transformation degrades the quality of the picture. Someone proposed improvements of the DCT method for suppressing the degradation of the quality. The trials are still insufficient for overcoming the difficulties.

⑤ Koichi Fukuda, Hirohiko Minakuchi, Akira Kawakami,"Encoding Method of Static Pictures by applying the AR assumption on the DCT of edge-blocks", Trans. IEICE Jpn (D-II) J76-D-II, 4 pp827–834, (1993).

⑥ Eiji Shinbori and Mikio Takagi,"High quality enlargement of pictures by applying the Gerchberg-Papoulis' repetition method on the DCT", Trans. IEICE Jpn (D-II) J76-D-II, No.9, pp.1932–1940 (1993).

⑤ proposed an improvement of the DCT method for suppressing the degeneration of quality of edge portions by the AR assumption. ⑤ however, is incompetent for the enlargement, the reduction or the transformation. ⑥ suggested a method for solving the problem of the degradation of the edge portions in enlargement by the quasi-revival processing. Being annoyed at an enormous amount of data, these improvements are still inoperative for the problems which this invention intends to solve.

(C) Function-Approximation Method

This method tries to approximate the parts of pictures by some functions.

⑦ Takahiko Horiuchi, Yasuhiro Ohtaki, Kazuo Toraichi, "Multistep deduction of joint points for automatic approximation of multi-fonts", Trans. IEE Jpn(C), vol.113-C, No.12, pp.1136–1143, (1993).

⑧ Japanese Patent Application No.4-259137(259137/'92).

⑨ Japanese Patent Application No.4-269646(269646/'92).

⑩ K. Toraichi, T. Horiuchi, R. E. Kalman, Y. Ohtaki and H. Nagasaki, "Compressing Data volume of Left Ventricular Cineangiograms", IEEE Trans. BME, vol.40, No.6, pp.579–588 (1993).

The three treatises ⑦ to ⑨ aim not at continually-changing tone pictures but at binary tone pictures which have only white pixels and black pixels and lack medium-steps of tone. These methods deduce outlines of black parts and process the outlines. Therefore, these methods are fully incompetent for continually-changing tone pictures, e.g., photographs, in which peripheral lines cannot be clearly defined. The binary tone methods are incapable of treating continually-changing tone pictures.

⑩ it suggested a way of processing medical-purposed continually-changing tone pictures by approximating all the horizontal lines of pixels from the left to the right by special functions, i.e., the raster order. We assume that the picture has I pixels in the x-direction and has J pixels in the y-direction. The x-direction is defined from the left to the right in the horizontal line. The y-direction is defined from the top to the bottom in the vertical line. I and J are big numbers, e.g., 512 to 2048. Since ⑩ must approximate the whole of the I pixels aligning in a horizontal line having a big variation of tones by a set of special functions without serious discrepancy from the crude tone values of the pixels, the approximation functions must be an assembly of polynomials of high orders. Using high order functions so as to approximate plenty of tone values of all the pixels aligning in horizontal lines, ⑩ will suffer from a great many parameters which define the high order approximation functions. An excess number of parameters prohibits ⑩ from compressing the data for storing in memories. The number of parameters is one drawback. There is still a more serious difficulty in the raster order approximation method ⑩. It is the y-direction discontinuity of the approximation functions. The raster order scanning approximation method respects the continuity in the x-direction but ignores the continuity in the y-direction. Thus severe discontinuity often appears in the y-direction in regeneration of the pictures. The y-direction discontinuity degenerates the quality of regenerated pictures, in particular, in the case of enlargement. The raster scanning approximation method ⑩ is fully incapable of rotation or anisotropic enlargement of pictures.

The discontinuity in the y-direction and the impossibility of enlargement or transformation are inherent and serious difficulties of the raster order approximation method ⑩ which scans a picture in the raster order, accumulates the data in the same order and approximates the linearly-aligning data by some functions. Thus the raster order scanning approximation method is still incompetent for the problems this invention attempts to solve. Namely, there is no effective method for processing continually-changing tone pictures yet.

The Problems to be Solved

Objects of this invention are now described in brief;

(1) automatic compression of data of continually tone-changing pictures, (2) feasible enlargement, reduction and transformation of continually tone-changing pictures, and (3) a small number of data for memorizing the object pictures. The abovementioned prior art ① to ⑩ cannot satisfy all the three requirements.

A purpose of the present invention is to provide an inputting and outputting method and apparatus for continually-changing tone pictures including the steps of reading in optically or making originally continually-changing tone pictures, compressing the image data, storing the compressed data in memories, and regenerating the pictures in an arbitrary scale at an arbitrary position in a short time. Another purpose of the present invention is to provide an inputting and outputting method and apparatus capable of compressing automatically the image data of continually-changing tone pictures. A further purpose is to provide an inputting and outputting method and apparatus capable of enlarging, shrinking or transforming continually-changing tone pictures without degenerating the quality of the pictures. A further purpose is to provide an inputting and outputting method and apparatus capable of memorizing the object pictures with a small number of data.

A further purpose of the present invention is to provide an inputting and outputting method and apparatus feasible for converting the image data of object pictures into multivariable vector data and for regenerating the object pictures at an arbitrary position in an arbitrary scale. A further purpose is to provide an inputting and outputting method and apparatus capable of memorizing the input pictures as compressed data and of treating the compressed data in printing machines or computers. A still further purpose is to provide an inputting and outputting method and apparatus suitable for transmitting image data between remote terminals wirelessly or through telephone cables.

SUMMARY OF THE INVENTION

An inputting and outputting apparatus of the present invention is composed of an image memory device memorizing the image data of a picture optically read-in by an image scanner or a picture read-in by another image inputting device A. Image memory device 1
B. region-division device
C. region memory device
D. boundary-extracting device
E. branch-point extracting device
F. boundary memory device
G. turning-point extracting device
H. boundary approximating device
I. regional data memory
J. differential image production device
K. differential image memory device
L. differential Image division device
M. differential block memory device
N. data approximation device
O. compressed data memory device
P. encoding device
Q. encoded data outputting device
R. encoded data memory device
S. encoded data inputting device
T. decoding device
U. differential block revival device
V. differential image retrieve device
W. continual tone picture regenerating device
X. continual tone picture outputting device A set of the above devices is sufficient for processing monochromatic pictures. In the case of color pictures, a color dissolving device and a color synthesis device are added in the processing at the beginning step and at the final step respectively.

Hence these additional devices are;

Y. color dissolving device
Z. color synthesis device

This invention, therefore, dissolves a color picture into elementary-color monochromatic pictures, treats the dissolved pictures by the same processes in parallel, obtains compressed data of the elementary colors, regenerates monochromatic elementary color pictures and synthesizes a set of the elementary color pictures into a color picture.

The above processes divide the differential (subtracted) image into blocks. Otherwise, the division of the differential image into blocks and the combination of the blocks can be omitted by approximating all the differential image by some functions. Alternatively, the encoding and decoding processes carried by the devices P to T can also be omitted, when the data should not be encoded or decoded.

The processes of the present invention are now explained by referring to an exemplary picture of SIDBA "Girl" shown in FIG. 2 as an example of a continually-changing tone picture.

Case of Continually-Changing Tone Picture

First, an original photograph of the "Girl" is read in by an Image scanner. This is the optical input of the picture. Alternatively, it is also possible to draft pictures on the display of a computer. Then the original picture is divided into plenty of regions having similar tones (densities) by the region-division device. Each region is painted uniformly with an average tone. The image which is divided into the regions painted with the average tone is called an "average-tone image". The average-tone image is stored in the region memory device.

Since the picture is divided into plenty of regions, many boundaries appear between neighboring regions. Every boundary encloses a region. Every boundary is a closed loop. But boundaries are not separated. Some of the boundaries join with together. There are points at which three or four boundaries meet. The point at which more than two boundaries meet is called a "branch point" or a "branching point". The branch point is one type of characteristic points which define the boundaries. A part of a boundary which is divided by two neighboring branch point is called a "boundary interval". A boundary, a closed loop is an assembly of boundary intervals which are open curves terminated at branch points. The branch points are deduced from the assembly of the boundaries.

The other type of characteristic points is a "turning point" at which a boundary interval changes the direction discontinuously. The branch points and the turning points lie on the boundaries, and characterize the boundaries. The turning points are extracted by investigating the change of the directions. The branch points and the turning points are singular points on the boundaries.

A boundary is divided into boundary intervals by the branch points. A boundary interval is divided by the turning points into partial lines again. Every partial line divided by the turning points and the branch points is a curving or straight line having both ends. The partial lines of the boundary intervals are now called "subboundaries" in this description. The subboundaries are approximated by some simple functions. Since every subboundary has no singular point like the turning point or the branch point, the subboundaries can be approximated by low order polynomials. Once the subboundary are approximated by some functions, all the memories of the coordinates of the point series on the subboundaries can be abandoned. The subboundary is defined and memorized by the branch points, the turning points and the approximation functions instead of individual points. The abandonment of individual coordinates of the point series on the subboundaries reduces the amount of the data of the boundaries.

A differential (subtraction) image is defined by a difference between an original picture and an average-tone image stored in the region-memory device. Then the differential (subtraction) image is calculated by subtracting the average-tone image from the original picture. Since the average-tone image is made by painting each region with its own average tone, the subtraction of the average-tone image from the original picture is equivalent to calculating the deviation of the tones from the local average tones. The image produced by subtracting the average-tones from the original one is built only by weak fluctuation of tones. The resultant image of the subtraction is called a "differential (subtraction) image". The number of the differential image is only one despite a great number of regions. The differential image includes only low frequency components of tones which vary smoothly. High frequency components of tones are already allocated to the average-tone image. The differential (subtraction) image is approximated by some pertinent functions which are mentioned afterward. Since the differential image contains only smoothly varying tones, low order polynomials are sufficient to approximate the subtraction image. Then the compressed data for expressing the subtraction image are yielded. Both the function-approximation of the boundaries and the function-approximation of the differential image enable this method to reduce the amount of the data greatly.

For example, if the quality of the original picture and the regenerated picture is assumed to be 30 dB(p-p/rms), the bit rate which signifies the data amount is calculated to be 1.98 [bit/pel]. Since the original picture is expressed in an 8 [bit/pel], the data are compressed, in the example, to about 25% of the original amount.

The above is a brief explanation of the data processing of the present invention in the case of a continually-changing tone picture. The main purpose of the present invention is to treat continually tone-changing pictures. The binary tone picture is excluded from the concept of the continually-tone changing picture in principle. However, the binary picture is a simplified limit of a continually tone-changing picture. The processing of continually tone-changing pictures is far more difficult than that of binary pictures (black/white). A method effective to continually-changing tone pictures is also applicable to binary pictures. The present invention can treat binary tone pictures as a matter of course by the same way. The concrete processing is simpler in binary pictures than in continual-tone pictures. An example of processing a binary picture is explained by referring to FIG. 3.

Case of a Binary Picture

FIG. 3 exhibits the steps of processing an original binary Chinese character "智" printed in the Gothic font. FIG. 3(a) is an original picture. The character is written in black on a white background. The tones of the white region and the black regions are constant. The object picture is read-in by an image scanner in quite the same manner as the continually tone-changing pictures. This method deduces the regions of the pixels having similar tones, paints the regions with an average tone of the regions, and memorizes the average-tone image in the region memory-device.

Since the object is a simple binary picture, the boundaries are just equal to the outlines of the character. The average tone within the outlines is equal to the uniform tone of the black regions. All the outlines are independent, isolated and separated from others. The outlines have neither crossing points nor branching points. There is no boundary which divides the binary picture into more than two regions. There is no branch point at which three or four different regions are in contact. Non-existence of the branch point, separated outlines, two valued regions and a monotone of the regions simplify the treatment of binary pictures.

There may be turning points on the outlines. Then the boundaries, i.e., the outlines may be divided into subboundaries at the turning points. The subboundaries cut at the turning points have no singular points. The subboundaries can be approximated by some suitable functions. The black regions are painted with a monotone. FIG. 3(b) is an average-tone image stored in the region-memory device. The average-tone image is similar to the original picture of FIG. 3(a). FIG. 3(c) shows the boundaries which are just the outlines of the black parts in the binary pictures. FIG. 3(d) is the figure after the step of extracting branch points. Since the outlines include no branch point, the extraction of branching points has no effect on the figure. Thus FIG. 3(d) is equal to FIG. 3(c).

FIG. 3(e) shows the step of extracting the turning points on the outlines. The turning points are denoted by black dots. The subtracted image is calculated by subtracting the average-tone image (FIG. 3(b)) from the original picture (FIG. 3(a)). Since the average-tone image is equal to the original picture, the differential image is grey in an overall plane. FIG. 3(f) shows the differential image with grey. A differential tone is made by adding the fluctuation tones to the middle tone (L/2). Without fluctuation, the differential image is monotonous grey. The approximation functions denote a simple flat plane, having constant coefficients.

There is no error in the approximation of tones in the case of binary pictures. Thus the boundaries, i.e., outlines are the only elements of defining the pictures. Exact expression of the boundaries allows the method to compress the image data with a high quality having the reversibility of encoding. In the example, the bit rate is 0.22 [bit/pel]. Since the original picture was represented by 1 [bit/pel], the data is compressed to 22% by the function approximation.

The above examples clarify the steps of inputting image data, processing the image data, compressing the data, and storing the compressed data in memories. Since the steps of outputting the data is the reverse of the steps of inputting, compressing and storing the image data. The outputting is automatically determined by the processes from inputting to memorizing. This invention is capable of treating binary pictures in addition to the continual-tone pictures.

BRIEF DESCRIPTION OF THE DRAWINGS

FIG. 2(a) is an original, starting picture of "SIDBA/Girl" as an example of continual-tone pictures.

FIG. 2(b) is an average-tone image which has been made by dividing the original picture of FIG. 2(a) into the regions with similar tones and by painting each region with an average tone.

FIG. 2(c) is an assembly of boundaries which have been extracted from the region-divided image as boundaries between neighboring regions.

FIG. 2(d) is an assembly of branch points which have been extracted from the boundaries.

FIG. 2(e) is an assembly of turning points which have been extracted from the boundaries.

FIG. 2(f) is a differential image which has been produced by subtracting the average-tone image from the original picture.

FIG. 2(g) is a regenerated picture which has been produced by adding a regenerated subtraction image and the regenerated average-tone image.

FIG. 5(a) is an explanatory figure of a full scope of the two-dimensional image plane having I pixels in the x-direction and J pixels in the y-direction. The integer coordinate points are defined at the corners of pixels unlike traditional definitions. The uppermost, leftest corner is the original point (0,0). The x-direction is defined from the left to the right. The y-direction is defined downward. The lowest, rightest point is (I, J). The central point of the pixel at the i-th line, the j-th column is denoted as (i+0.5, j+0.5). The pixel is enclosed by four corners of integer coordinate points (i,j), (i+1, J), (i,j+1) and (i+1,j+1).

FIG. 5(b) is an enlarged view of the beginning corner part of the image plane shown in FIG. 5(a).

FIG. 6(a) is a figure of a set of linearly aligned 9×1 pixels which make an original direct line to be enlarged.

FIG. 6(b) is a figure of the same linearly aligned pixels for showing one definition of the coordinates of positioning integer coordinates at the centers of pixels.

FIG. 6(c) is a figure of an enlarged assembly of the linearly aligned pixels in the case of defining integer points at the center of pixels. Since the assembly of the aligned pixels has no width in the y-direction, the original line cannot be enlarged in the y-direction.

FIG. 6(d) is a figure of the same linearly aligned pixels for showing another definition of the coordinates of positioning integer coordinates at the corners of pixels.

FIG. 6(e) is an enlarged figure of the line of FIG. 6(a) in the case of defining integer points at the corners of pixels. Since the assembly of the linear pixels has a definite width even in the direction orthogonal to the length, the original line can be enlarged isotropically.

FIG. 7(a) is an explanatory figure of a full scope of an image plane for clarifying the raster scanning of a (2×2) window for seeking branch points on the image plane. The window scans from the leftest pixel to the rightest pixel in a line and scans from the left to the right in the nest line and so forth.

FIG. 7(b) is an example of four pixels which emerge in the (2×2) window. Since the window includes two white and two grey pixels, the central point is not a branch point.

FIG. 7(c) is an example of four pixels which emerge in the (2×2) window. Since the window includes one white, one grey and two black pixels, the central point in the window is a branch point which is a point at which more than two regions meet.

FIG. 8(a) is a figure of an explanatory image having five regions for showing the definition of a boundary interval which is an interval of a boundary between two branch points. γ, δ and ε are branch points.

FIG. 8(b) is a figure of an enlarged part of FIG. 8(a) having two branch points γ and δ for showing the definition of a boundary interval.

FIG. 9(a) is a figure for explaining the definition of a local directional vector in the case of α=2. The local directional vector is an arrow which extends from the point (η) preceding the outstanding point (ζ) by two dots to the point (κ) following the outstanding point (ζ) by two dots.

FIG. 9(b) is a figure of clarifying the change of the local directional vectors progressing in a series of a boundary.

DETAILED DESCRIPTION OF THE PREFERRED EMBODIMENTS

Figure 1:
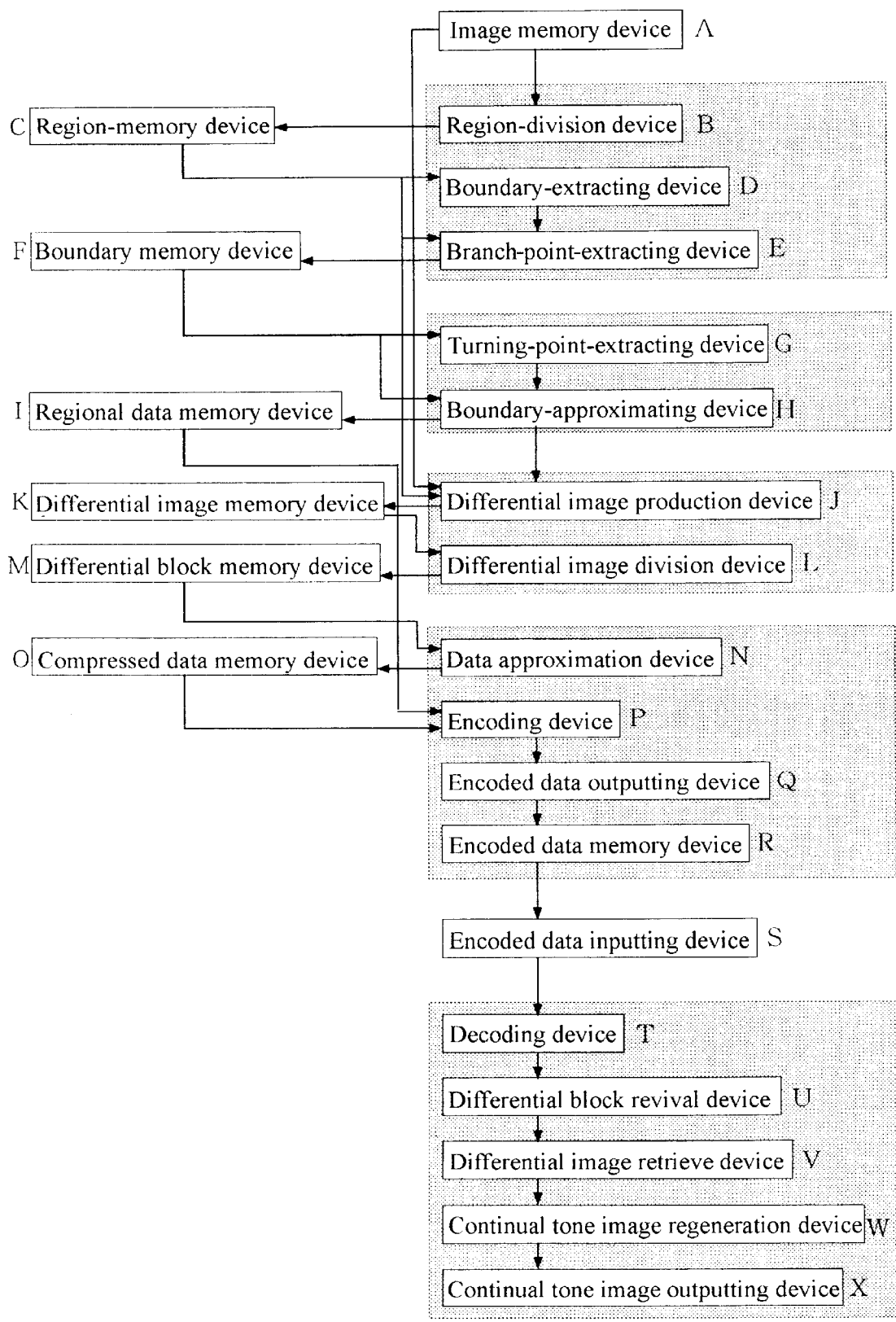
FIG. 1 is a block diagram showing all the devices of an inputting and outputting apparatus for continual-tone pictures which contain an image memory device, a region-generating device, a characteristic point deducing device, a subtraction image generating device, an encoded data producing device, a regenerated data producing device and memory devices for storing the results of the arithmetic devices.
Figure 3A:
FIG. 3(a) is an original, starting picture of a Chinese character "智" in the Gothic font as an example of binary pictures.
Figure 3B:
FIG. 3(b) is an average-tone image which has been produced by dividing the original picture of FIG. 3(a) into the regions with similar tones and painting each region with its average tone.
Figure 3C:
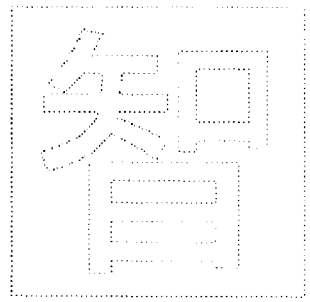
FIG. 3(c) is an assembly of boundaries which have been extracted from the region-divided image as boundaries between neighboring regions. In the case of a binary picture, the boundaries are the same as the outlines of the character.
Figure 3D:
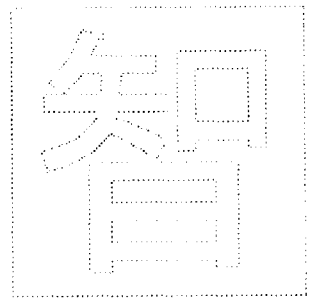
FIG. 3(d) is an assembly of the boundaries and branch points which were extracted from the boundaries. There is no branch point in the case of a binary picture.
Figure 3E:
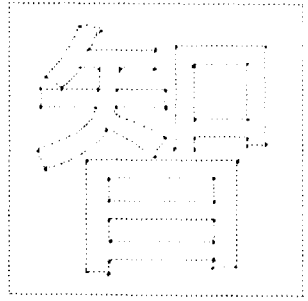
FIG. 3(e) is an assembly of turning points which were extracted from the boundaries and are shown as black dots.
Figure 3F:
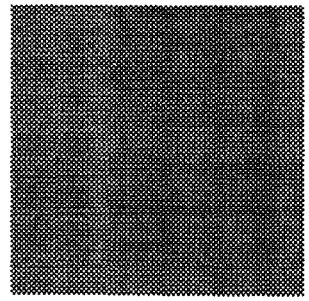
FIG. 3(f) is a differential image which has been produced by subtracting the average-tone image (FIG. 3(b)) from the original picture (FIG. 3(a)).
Figure 3G:
FIG. 3(g) is a revived picture which was produced by adding a regenerated subtraction image and the regenerated average-tone image.

This invention treats a continual-tone picture by the devices (A) to (X) shown in FIG. 1, which will be explained in detail.

A. Image Memory Device 1

An object picture is drawings, illustrations, characters and so on written on a sheet of paper or photographs having continually-changing tones. The object picture is sometimes optically inputted by an image scanner and is resolved to pixels having tone parameters. Alternatively, drawings, illustrations or characters are painted on the screen of a computer by a mouse or a digitizer. Otherwise, an object picture is supplied in a form of digitally-recorded information by some recording medium, e.g., a floppy disc, a hard disc or a CD. There are various types of inputting the object picture to the apparatus of the invention.

The image memory device 1 (A) is a device for storing the tones of all the pixels of the input picture. In the case of a monochromatic picture, a pixel has only a single tone parameter. The steps of tones are, for example, 256, 512 or so. In the case of a color picture, the picture should be resolved into four or three elementary-color images. Once the object is resolved by color, the object picture can be reduced to four or three independent monochromatic pictures.

A pixel has four or three tone parameters. Every elementary color image is a monochromatic continual-tone picture. Then the processes can be reduced to the case of a monochromatic picture. The input picture is expressed by a two-dimensional function defined on the whole of the image for giving a distribution of tones.

The tones of the input picture are given by a continual function f(x,y) defined on the two-dimensional coordinates (x,y). Although the steps of tones are digital numbers, e.g. 256, 512, etc., the tone function f(x,y) is now assumed as a normalized function taking a value between 0 and 1. The definition range (x,y) may be changed according to the object picture. In this example, the definition range (x,y) is also assumed to be a normalized scope of a square of 1×1. Through the normalization steps, an arbitrary continual-tone picture can be represented by the normalized tone function f(x,y) and the normalized definition range (x,y);

$$0 \leq f(x,y) \leq 1, \ 0 \leq x \leq 1, \ 0 \leq y \leq 1. \quad (1)$$

in an original picture, the tone f(x,y) and the position (x,y) take continual values in the allowed ranges. These variables, however, take discrete values when the picture is read-in by an image scanner. The tone f(x,y) is quantized into L levels between 0 and 1. The x-coordinate is also quantized into I dots, and the y-coordinate is sampled into J dots. Instead of the continual function f(x,y) and the continual coordinates (x,y), the sampled coordinates are denoted by discrete dots $(x_i, y_j)$, and the quantized tones are represented by $g(x_i, y_j)$.

$$g(x_i, y_j) \ \{0,1,2,\ldots,L-1\}, i=0,1,2,\ldots,I-1, \ j=0,1,2,\ldots,J-1 \quad (2)$$

L is the number of discrete steps of tone. I is the number of pixels in the x-direction, and J is the number of the pixels in the y-direction. The image plane has I columns and J lines of pixels. The coordinates of pixels are different from the coordinates of boundaries. The coordinates of boundaries are taken at the corners of pixels. The coordinates of pixels denote the centers of the pixels. Thus both the coordinates differ each other by half a pixel. The total number of the pixels is IJ. The three size parameters can be freely determined. The bigger these parameters become, the higher the quality of the revived pictures rises. The bigger numbers of parameters I, J and L require the larger capacity of memory and the longer processing time.

The image memory device 1 (A) stores all the digitalized tone parameters of all the pixels, as they are. All the image date must temporarily be memorized in the image memory device (A) before the data compression. Of course, a large capacity of memory is consumed, because the image memory device (A) contains all the image data; all the tones of all the pixels. The image data, however, are erased just when the image data are processed by the steps of the present invention. No memory of the crude image data remains in the memory devices of the computer when the compression process has been finished. Thus the temporary occupation of memories brings about no serious problem.

B. Region-Division Device

This is one of the characteristic points of this invention. Prior image processing methods ① to ⑩ mentioned before do not divide an input picture into plural regions spatially at all. This invention spatially divides a picture into a plurality of regions by the difference of tones. The region-division is a quite original way. The regions are neither inherent nor intrinsic to the input picture. The regions here do not correspond to the concrete, individual objects in the picture. The region-division is quite different from the extraction of the outlines of the objects in a binary tone picture. This invention forcibly makes the regions which have never existed intrinsically in the picture. Instead of actual objects or matters, this invention finds out imaginary regions on the input picture and divides the picture into separate regions.

How does this invention divide the picture into regions? This invention selects the pixels which neighbor with each other and have similar tones as members of a region. The criterion of belonging to the same region is the similarity of the tone. Two neighboring pixels shall be classified into the same region, if they have similar tones within an allowable tolerance. Another two neighboring pixels shall, otherwise, be classified into different regions, if they have different tones beyond the tolerance. Of course, the continuity of the pixels is essential in the division of the picture. The continuity of the pixels ensures the spatial continuity of the regions. The division based upon the similarity of tones characterizes this invention. The preliminary tone-based division brings about some advantages;

1. generation of boundaries which can be approximated by some suitable functions with a small number of parameters,
2. independent processing for individual regions, and
3. capability of data compression by gathering the pixels having similar tones into the common regions.

Advantage 3 is the most important. Every artificially extracted region is an assembly of the pixels with nearly equal tones.

Then the average of the tones is calculated in every region. The average tone is a parameter defined to a region. The average tone is a common, single value in a region. But the average tones are different for different regions.

Further, differences between the tones of individual pixels and the average tone are calculated for all the regions. The difference between the tone of the individual pixel and the average tone is called a "differential tone" or a "subtracted tone". The average of the differential tones is always 0 in every region. The change of the subtracted tones is small and slow. The changes of the differential (subtracted) tones can be easily approximated by low order functions for all the regions.

The above three advantages are essential to this invention. Intrinsic significance of the three features is preliminarily explained now. The tones may change at random two-dimensionally in the original picture. The change of tones may be smooth and slow at some parts but may be steep and discontinuous at other parts. Since the approximation functions must reflect the change of tones with fidelity, the approximation of steep, discontinuous parts requires high order polynomials which have plenty of parameters.

An increase of the number of parameters wastes time and memory for data processing. Besides the inconvenience in the calculation and accumulation, another fatal drawback accompanies the approximation by the high order polynomials. The approximation by high order polynomials is liable to induce unnecessary vibrations which are not intrinsically included in the tone variation. The byproduct of the unnecessary vibration reduces the accuracy of the approximation.

It is foolish to approximate the whole of the picture at a stroke by continual functions which extend in wide ranges. Then the present invention preliminarily divides the picture into a plurality of small regions which have only the pixels with similar tones. The division into regions facilitates the approximation by polynomials for two reasons.

One reason is that a narrow scope approximation lowers the order of polynomials and reduces determining the parameters determining the polynomials. The other reason is that the approximation by low order polynomials suppresses the unnecessary vibrations which are not intrinsically included in the original picture.

At the step, the picture has been classified into boundaries and regions. Since the imaginary regions have been selected as assemblies of the pixels having similar tones, the boundaries are discontinuous parts. All the parts which have random variations of tone must have been included in the boundaries. In other words, the step of dividing a picture into regions sweeps all the parts having steep changing tones into the boundaries. The boundaries are pitfalls of discontinuous parts. The boundaries are singular lines in the tone function. The boundaries are assemblies of singular points in the variations of tones. The region-division is the most effective way for sweeping discontinuities of tones aside out and gathering them into boundaries.

If we assume a tone function defined on the whole of the input picture, the singular lines have been all swept into the boundaries. Thus the regions have only smoothly changing parts without discontinuity. The individual regions are suitable for the approximation by low order polynomials.

In fact, in the step of the region-division, an average tone is calculated for every individual region. The averages are different for different regions of course. The average is a definite value for all the pixels within a region. Then the individual region is painted with the average tone. The assembly of the regions painted with the average tones is named an "average-tone image".

In a region, all the deviations of the tone of each pixel from the average tone are reckoned. The deviation is called a "differential tone" which is defined as a difference between the original tone of the pixel and the average tone of the region. The averages of the differential tones are always 0 in every region. The subtracted (differential) tones vary slowly and continually in any regions, since singularities have been expelled out of the regions. The subtraction tones change so weak and so small that low order polynomials can approximate the subtraction tones with high accuracy. The region-division step is important for the present invention.

As mentioned roughly till now, the region-division device is a means for dividing an input picture into plenty of small regions which are assemblies of the pixels having similar tones and neighboring with each other. The regions and the boundaries are chosen for reducing the tone differences among the pixels within a region but for gathering the discontinuity to the boundaries. The assembly of the boundaries and the regions gives three advantages of raising the quality of the revived picture, sharpening the edges, alleviating the number of the data, and shortening the processing time.

Attention must be paid to some matters. The region-division step of the present invention does not outline the real objects in the picture, but extracts a group of the pixels having similar tones to a region. The region-division does not seek for intrinsic regions, but makes forcibly the regions which do not exist inherently, and divides the picture into the imagined regions.

Step 1

Initial Settlement

A region label "Label $(x_i, y_j)$" is allotted to every pixel $(x_i, y_j)$. Label $(x_i, y_j)$ is a binary function which takes either 0 or 1 for denoting whether the outstanding pixel has been classified into some region. "0" means that the pixel is not region-divided. "1" means that the pixel has already been region-divided. At the initial stage, all pixels are allotted with label "0".

Label$(x_i, y_j)$=0 for all pixels at the beginning.

STEP 2

Initial Operation

For all regions, the maximum tone, the minimum tone and the average tone are denoted by $g_{max}$, $g_{min}$ and $g_{av}$ respectively. Since these are the parameters for regions, the parameter (r) for denoting the number of the region should be suffixed like $g_{max}^{(r)}$. But the region parameter (r) is omitted here for simplicity. The average $g_{av}$ is not an arithmetic average of all the pixels in the region but an average of the maximum and the minimum.

$$g_{av}=(g_{max}+g_{min})/2.$$

The input image is scanned in the raster order from the leftest and uppermost pixel for seeking for unlabeled pixels of Label$(x_i,y_j)$=0. When 0-label pixel is found out, 1-label is allotted to Label$(x_i,y_j)$=1 and $g_{max}$ and $g_{min}$ are equally determined to be the tone $g(x_i,y_j)$ of the pixel. Thus at first, the parameters are;

$$\text{Label}(x_i,y_j)=1 \qquad (4)$$

$$g_{max}=g_{min}=g(x_i,y_j) \qquad (5)$$

for the leftest, uppermost pixel.

This is the first operation in the raster scanning of a picture.
Step 3

The outstanding pixel is now denoted by $(x_i,y_j)$ which belongs to the r-th region. The input picture is divided into regions by adopting the concept of "eight-neighbors" which denote eight pixels up and down, right and left, and oblique around the outstanding pixel. The eight neighboring pixels of the pixel $(x_i,y_j)$ can be written as $(x_{i+k},y_{j+l})$, where k,l=0, −1 or +1 (except k=l=0). An unlabeled neighboring pixel of Label$(x_{i+k},y_{j+l}1)$=0 is compared with the average tone $g_{av}$= $(g_{max}+g_{min})/2$ of the r-th region. If the absolute value of the difference between the tone $g(x_{i+k},y_{j+l})$ and the average $g_{av}$ is smaller than an allowed width(tolerance) W, namely $$|g_{av}-g(x_{i+k},y_{j+l})|<W \qquad (6),$$

the neighboring pixel $(x_{i+k},y_{j+l})$ is selected to a member of the r-th region. Otherwise, if the difference is bigger than W, the neighboring pixel $(x_{i+k},y_{j+l})$ is judged as a member of a different region. Grouping of pixels on inequality (6) is very important for this invention.

The operation of the region-division consists of the generation of regions and the determination of the pixels which should belong to the regions. When the neighboring pixel has been classified to some region, the pixel $(x_{i+k},y_{j+l})$ is labeled and the label function becomes 1.

$$\text{Label}(x_{i+k},y_{j+l})=1(k,\ l=0,\ \pm 1). \qquad (7)$$

Labelling means that the pixel is classified into a region which has a small fluctuation of tones within the tolerance W. If there is a single neighboring pixel which satisfies inequality (6), the operation should be ended for the outstanding pixel (xi,yj).

But sometimes there are a plurality of neighboring pixels satisfying inequality (6) among the eight neighbors. Of course, the neighbors shall be merged into the current region. At the same time, the extremities $g_{max}$ and $g_{min}$ must sometimes be renewed. For the purpose, the following steps shall be done in parallel for all the neighboring pixels $(x_{i+k},y_{j+l})$ satisfying inequality (6) and being labelled. The tones $g(x_{i+k},y_{j+l})$ of the neighboring compared with $g_{max}$ and $g_{min}$.

If $g(x_{i+k},y_{j+l})$ is larger than $g_{max}$, $g_{min}$ shall be replaced by $g(x_{i+k},y_{j+l})$. If $g(x_{i+k},y_{j+l})$ is smaller than $g_{min}$, $g_{min}$ shall be replaced by $g(x_{i+k},y_{j+l})$. Namely, if $g(x_{i+k},y_{j+l})$ deviates from the present width of tones of the current region, the extremity which is exceeded by $g(x_{i+k},y_{j+l})$ shall be rewritten by $g(x_{i+k},y_{j+l})$. The renewal of $g_{max}$ and $g_{min}$ ensures the fact that all the tones included in the current region lie between $g_{min}$ and $g_{max}$. Since the neighbors satisfy inequality (6), the width of the tones never exceed W, which will be proved later. If $$g(x_{i+k},y_{j+l})<g_{min}, \qquad (8)$$

$g_{min}$ shall be rewritten by $g(x_{i+k},y_{j+l})$. $g_{min} \leftarrow g(x_{i+k},y_{j+l})$. Similarly, if $$g(x_{i+k},y_{j+l})>g_{max}, \qquad (9)$$

$g_{max}$ shall be rewritten by $g(x_{i+k},y_{j+l})$. $g_{max} \leftarrow g(x_{i+k},y_{j+l})$. If neither (8) nor (9) does not hold, both $g_{max}$ and $g_{min}$ maintain the previous values. Since $g_{max}$ and $g_{min}$ are renewed, the width of tones of the pixels belonging to the current r-th region is widened. However, any pixel once judged as a pixel in the r-th region does not deviate from the values which are determined by inequality (6), because the renewal has a tendency of letting the width between the maximum and the minimum be equal to W.

It may not be easy to understand. Thus the property is now proved in brief. Because of inequality (6), the difference between $g_{max}$ and $g_{min}$ of a region is smaller than or equal to 2W. At a certain time, the width of tones of the pixels of a region is denoted by 2U. Namely, $g_{max}-g_{min}$=2U. At the next time, if the tone g' of the pixel which was newly associated with the region is smaller than the current $g_{min}$, $g_{min}$ is rewritten by g'. The average gav decreases by $(g_{min}-g')/2$. The maximum tone $g_{max}$ of the region is unchanged now. The difference between the current $g_{max}$ and the new $g_{av}$ is;

$$g_{max}-g_{av}+(g_{min}-g')/2=(g_{max}-g')/2<W.$$

The result signifies the new width of the tones of the region is still smaller than 2W. Thus once a pixel has been judged as a member of a region, the pixel is everlastingly a member of the same region.

An increase of the members of a region enlarges the difference 2U between $g_{max}$ and $g_{min}$ in the region-division step. The upper limit of the difference 2U is 2W ($g_{max}-g_{min}$<2W). However, it is not necessarily true that the difference $(g_{max}-g_{min})$=2U converges to 2W. Of course, some regions have the final difference equal 2U to 2W. But other regions have the final difference 2U smaller than 2W. In any cases, the difference $(g_{max}-g_{min})$ never deviates from the width 2W.

The division of regions, however, is not uniquely determined. The region-division depends on the order of the classification step. Since there are a plurality of pixels neighboring to an outstanding pixel (xi,yj), the region with which a neighboring pixel is associated depends on the order of labelling. The central pixel (xi,yj) is denoted by C. Two neighboring pixels of C-pixel are denoted by D and E. C-pixel has a tone g. D-pixel has a tone of e.g., g+0.9W, and E-pixel has another tone of e.g., g−0.9W. If D-pixel is classified into a region earlier than E-pixel, the average of the region is raised up to g+0.45W.

Since g+0.45W−(g−0.9W)>W, E-pixel cannot join the current r-th regions, but is classified to another region. C-pixel and D-pixel are classified into the same region. E-pixel is affiliated to another region. Alternatively, if E-pixel is judged earlier than D-pixel, the average $g_{av}$ is revised to g−0.45W. The fall of the average refuses the affiliation of D-pixel to the r-th region. C-pixel and E-pixel are associated with the same region. D-pixel belongs to another region.

Thus the assortment depends on the order of labelling. However, in practice, the region-division is unique, because the order of labelling is predetermined. Namely, the predetermination of the order of labelling determines the assortment of pixels into regions. If the order of labelling were varied, the assortment of pixels would be changed as a matter of course. The fact clarifies that the region-division does not extract inherent, intrinsic features from the input picture. The regions do not correspond to intrinsic objects.

There is another example for explaining the special character of the region-division of the present invention. Assuming that four pixels C, D, E and F align in this order, and C-pixel, D-pixel, E-pixel and F-pixel have the tones of g, g+0.9W, g−0.5W and g−0.9W, C-pixel, D-pixel and E-pixel are affiliated to the same region, but F-pixel is excluded from the region.

The tone difference between D-pixel and E-pixel is 1.4W, but D-pixel and E-pixel belong to the same region. On the contrary, the tone difference between E-pixel and F-pixel is only 0.4W, but F-pixel is separated from E-pixel. The boundary traverses not the steepest gradient but a modest gradient. Such an unreasonable division results from the assortment of pixels depending upon the tone difference from the average tone by inequality (6) instead of differentiating the tone functions two-dimensionally.

If man divided a picture into regions by eye sight, he would draw boundaries across the steep slopes of tone having a large differentiation. The region-division of the present invention differs from such an intuitive, natural division by human eye-sight.

STEP 4

The previous Steps 1 to 3 affiliate all the neighboring pixels $(x_{i+k}, y_{j+l})$ satisfying (6) into the same region of the current pixel $(x_i, y_j)$. Then the current pixel shall be transferred to one of the neighbors $(x_{i+k}, y_{j+l})$. Thus $(x_i, y_j) \leftarrow (x_{i+k}, y_{j+l})$. Step 3 is repeated to the new current pixel. The repetitions of Step 3 for the neighbors satisfying (6) make up a continual region consisting of the pixels having similar tones.

If there is no neighboring pixel which satisfies (6), the r-the region has been completed. Thus the next (r+1)-th region shall be made by repeating Step 3 from the last neighboring pixel which does not satisfy (6). When the (r+1)-th region has been made, the (r+2)-th region shall be found out by Step 3. All the regions are produced in the raster order on the input image. As mentioned before, a pixel is labelled Label=1, when it is affiliated into a region. The region-division is ended when all the pixels have Label($x_i$, $y_j$)=1.

The regions have all been found out by repeating Step 2 to Step 4. The parameter W is a common width of the allowable tones in every region. The bigger the width parameter W is, the wider the regions are. The existence of wider regions requires a longer time for processing the regional data. On the contrary, a smaller width W increases the number of regions and the time for extraction of regions. The smaller W is liable to decrease the time of approximating the regions by the functions. The selection of W changes the mode of the region-division.

Every region is uniformly painted with the average tone "h" of the pixels belonging to the region. Here, the average tone h is a true average which is obtained by summing up the tones of all the pixels of the current region and dividing the sum by the number of the pixel in the region unlike the previous average $g_{av}$ which is a mean value of $g_{max}$ and $g_{min}$. Thus "h" is defined independently for every region.

The image having the regions painted with the average tones "h" is called an "average tone image". FIG. 4(a), FIG. 4(b) and FIG. 4(c) exhibit average tone images for W=8, W=16 and W=32 respectively. W=8 of FIG. 4(a) shows a clear average tone image which is quite similar to the input image, because the allowable width is too narrow. W=16 of FIG. 4(b) exhibits a blurred image in which a stripe of stain on the wall vanishes. FIG. 4(c) shows the average-tone image of W=32. Since the areas of individual regions are so wide that the image gives an impression different from the original picture. For example, the hair and the face of the girl lose the original features.

C. Region Memory Device

The region-memory device stores the average-tone image which represents the regions painted with the average-tone;

$$h(x_i, y_j) = 0, 1, 2, \ldots, L-1 \tag{10}$$

The average-tone h is a constant within a region irrespective of individual pixels in the region. Since h is a tone variable, h takes any one of 0, 1, 2, 3, ..., and L−1. The average-tone is a parameter of a region. The number (r) of the region should be suffixed to h. But the expression of the region number (r) is omitted in h.

D. Boundary-Extraction Device

The boundary-extraction device carries out the step of seeking the boundaries between neighboring regions. Since all the regions have been determined by the region-division device (B), the boundaries have been predetermined at the same time. The boundaries must be clearly extracted as the lines between the neighboring regions, because the boundaries will be expressed by functions at a later step. Unlike the outlines of binary pictures in conventional image processing methods, the boundary of the present invention is not an assembly of pixels. A series of pixels does not mean a boundary. The boundary requires a new definition in the present invention.

A convenient coordinate system is introduced for expressing the boundaries. FIG. 5(a) shows the coordinate defined on the input image. The coordinate has an origin (x,y)=(0,0) at the uppermost, rightest point. FIG. 5(b) is an enlarged part in the vicinity of the origin (0,0). X-coordinate (abscissa) horizontally expands from the origin to the right. Y-coordinate (ordinate) vertically extends from the origin to the bottom. In general, conventional methods used to take the centers of pixels for integer coordinate points (m,n), where m and n are integers.

Unlike the prior methods, this invention gives integer coordinate points (m,n) to the corners of pixels. Every pixel is enclosed by four integer points (m,n), (m+1,n), (m+1,n+1) and (m,n+1). The center of the pixel is expressed by a set of half-integers (m+0.5, n+0.5). The total number of pixels is I×J. The numbers of the integers x and y are (I+1) and (J+1). Integer x=0, 1, 2, 3, ..., or I. Integer y=0, 1, 2, 3, ..., or J.

The choice of the coordinate system has two advantages. One advantage is that the (integer) coordinate points can be the boundaries between regions. The other merit is that a point consisting of a single pixel or a line of a single pixel width can be treated as a region having a definite area instead of an infinitesimal area.

The first advantage is quite convenient for defining and determining the boundaries. The region-division (B) divides all the pixels into some regions. Every pixel is allotted to some region. No pixel is left for boundaries. In other words, the boundaries can include no pixel. The definition of the boundary itself is novel and singular. If the centers of pixels were to be the coordinate points, a series of pixels must have been allocated to boundaries. Some pixels would define regions and other pixels would depict boundaries. The boundaries could not exactly be determined by the prior definition of the coordinate system.

The second advantage is effective in enlargement, reduction or transformation. If the centers of pixels were to coincide with the coordinate points, a spot of a single pixel or a line of a single pixel width would be expressed as a point or a line without a definite area. If the point or the line were enlarged, the enlarged spot or line would have still a width of a single pixel, because an infinitesimal value is still infinitesimal even if it is multiplied by some definite number. Thus the enlargement would be anisotropic for the lines having a single pixel width.

Instead of the centers, this invention takes the corners of pixels as the coordinate points. Thus the spot of a dot (pixel) or the line of a dot width is also a region having a definite area, which is suitable for enlargement or other transformation of the image.

FIG. 6 demonstrates the difference of enlargement between the two coordinate systems. An original figure is a direct line consisting of nine aligning pixels as shown by FIG. 6($a$). If the integer coordinate points are allocated to the centers of pixels (FIG. 6($b$)), an enlarged line is still a line having the same single dot width, although the length is multiplied by the enlargement rate as exhibited by FIG. 6($c$). This is because the original line is represented by 0×9. If the coordinate points are allotted to the corners of pixels (FIG. 6($d$)), the original line is a rectangle having an area of 1×9.

Thus the line can be isotropically enlarged to both the direction of length and the direction of width, as shown in FIG. 6($e$). The choice of the coordinate system of FIG. 5 is effective for enlargement or reduction with fidelity. Such a choice of the coordinates is also one of the novel, characteristic points of the present invention. This invention denies the prior coordinate system which has a tendency of confusing pixels with coordinate points owing to the coincidence of centers of pixels with the coordinate points.

The whole of the input picture has been divided into regions by the steps explained hitherto. The data of the regions must be compressed for sparing the capacity of memories and facilitating the calculations. The minimum elements for defining the regions clearly are outlines of the regions. The whole of the input image is divided into regions and all the regions have outlines. There is another region outside of the outline. Thus an outline of a region should be rather called a "boundary" between regions. The regions are easily defined by the boundaries. Therefore, the regional data can be compressed by extracting the boundaries and expressing the boundaries by a small number of parameters.

The way of extracting the boundaries is explained. The boundaries are series of discrete boundary points. The boundary point series are a set of the (integer) coordinate points which are connected in four directions; up and down, right and left, on a boundary. Since the coordinate points are defined as corners of pixels, the four-linkage mode of connection is natural. The four-linkage neighbors of (m, n) are (m+1,n), (m−1,n), (m,n−1) and (m,n+1). The distance between two neighboring points is always equal to the side of a pixel.

Symbol "R" denotes the total number of regions. Symbol "r" denotes the number of a region (r=0, 1, 2, ..., R−1). N(r) is the total number of the points on the boundary enclosing the r-th region. "k" is the number of the point on the boundary (k=0, 1, 2, ..., N(r)−1). In general, the whole of the boundary point series is expressed by $\{x_k^{(r)}, y_k^{(r)}\}^{N(r)-1}{}_{k=0}{}^{R-1}{}_{r=0}$, where $x_k^{(r)}$ is x-coordinate of the k-th point of the boundary of the r-th region and $y_k^{(r)}$ is y-coordinate of the same point. The suffixed symbol of "$^{N(r)-1}{}_{k=0}$" means that the point number k takes all the values of 0, 1, 2, 3, ..., and N(r)−1 for the points $\{x_k^{(r)}, y_k^{(r)}\}$. The other suffixed symbol of "$^{R-1}{}_{r=0}$" means that the region number r takes all the values of 0, 1, 2, 3, ..., and R-1.

All the pixels have been divided into regions without a forlorn pixel and the boundaries are outlines of the regions. Thus the boundaries are easily be extracted from the data of the regions. The boundary point series are sought by the following steps.

STEP 1

Initial Adjustment r←0 (starting the processing of the 0-th region)

STEP 2

Extraction of Pixels of the r-th Region

The pixels of the r-th region are extracted from the data stored in the region-memory device (C).

STEP 3

Tracing of the Boundary Point Series

An arbitrary point on the boundary of the 0-th region is found out, for example, by the raster scanning of the pixels. The point series are traced clockwise on the boundary of the 0-th region from the point as an initial point ($x_0^{(0)}$, $y_0^{(0)}$). The data of the boundary points are extracted as an assembly $\{x_k^{(O)}, y_k^{(O)}\}^{N(O)-1}{}_{k=0}$. For example, the chain code method can be applied to the tracing of the boundary point series.

STEP 4

Judgment of the Finishing Condition

Boundaries are closed loops. Although a boundary may have branch points, any boundary is a closed loop running around some region. When a boundary is traced around a definite region, the tracer surely returns to the starting point on the boundary. The point series on the boundary is entirely extracted by tracing the close loop clockwise around the r-th region. When the trace around the r-th region has ended, r is replaced by (r+1). r←r+1. The points around the (r+1)-th region are extracted by Step 3. The boundaries of all the regions r=0, 1, 2, 3, ..., R−−1 are extracted by repeating Step 3 and Step 4. When r attains to R (r=R), all the boundary points $\{x_k^{(r)}, y_k^{(r)}\}^{N(r)-1}{}_{k=0}{}^{R-1}{}_{r=0}$ have been extracted, and the processing shall be finished. The following processing will be applied to all the boundaries similarly. Thus the region suffix "r" is omitted for simplicity in the following explanation. Other suffixes are sometimes omitted for simplifying the expression unless the omission causes misunderstanding.

E. Branch Point Extraction Device

The boundaries are closed loops which are not separated from each other, but are in contact with each other. The boundary often has the points at which more than two boundaries meet. The point at which a plurality of boundaries bisect is called a "branch point. A boundary is clearly different from an outline of a binary image, because an outline has no branch. The branch points are one type of the characteristic points on the boundaries. The branch point is defined as a point having bisecting boundaries or having more than two regions in contact on a boundary. A branch point extraction device seeks the branch points on the boundaries. The extraction of branch points is important. The branch points give one type of end points to the lines which are approximated by the pertinent functions.

The branch points are sought by scanning a (2×2) window on the average-tone image stored in the region-memory device (C) in the raster order. FIG. 7($a$) shows the raster scanning of the (2×2) window having four pixels. Such a window having four pixels determines whether the central point of the window is a branch point or not. If all the four pixels have the same tone, the central outstanding point is not a branch because no boundary exists in the window. At least one pixel must have a tone different from the others for including a boundary within the window. When the window has two different tones as shown in FIG. 7(b), the central outstanding point is judged as a non-branch point, because a branch point requires at least three different regions. When the (2×2) window includes three different tones, as shown in FIG. 7(c), the central point is judged as a branch point. If the window contains four different tones, the central point is also a branch point.

F. Boundary-Memory Device

All the attributes of the boundaries are stored in a boundary-memory device by using the data of branch points according to the following steps.

Step 1

Flags denoting a branch point are allotted to the branch points on the boundary point series.

Step 2

The part of a boundary between two neighboring branches is called a "boundary interval". The boundary interval is given a boundary interval number.

The boundary interval is a unit of the function approximation. Every boundary interval has two branch points at both ends. There is no branch point in the boundary interval except the ends. No intermediate point is a branch point in any boundary interval. When two neighboring regions commonly possess an interval, the boundary interval is numbered with the same number in both regions.

FIG. 8(a) demonstrates an example of an image having five regions with different tones. The branch point is a point at which at least three regions gather around. This example has three branch points. FIG. 8(b) is an enlarged view of the part encircled in FIG. 8(a) containing two branch points (γ) and (δ). The line γδ is a boundary interval which belongs to two neighboring regions.

All the closed boundaries are divided into plenty of boundary intervals by cutting the boundaries at the branch points. The boundary intervals are suffixed and memorized as $\{x_k^{(p)}, y_k^{(p)}\}_{k=0}^{M(p)-1}{}_{p=0}^{P-1}$ "P" is the total number of boundary intervals on the input image. Individual boundary intervals are denoted by a parameter "p" (p=0, 1, 2, 3, . . . , P−1). M(p) is the total number of serial points in the p-th interval. Serial points on the interval are numbered with "k" (k=0, 1, 2, 3, . . . , M(p)−1). Besides, $x_k^{(p)}$ is x-coordinate of the k-th point in the p-th boundary interval and $y_k^{(p)}$ is y-coordinate of the k-th point in the p-th boundary interval.

G. Turning Point Extraction Device

A boundary turning point is defined as a point on a boundary at which the gradient of the boundary changes drastically. The boundary turning point is the other important point on the boundary. The boundary turning point is shortened to a "turning point". The change of the gradient corresponds to a curvature. Thus the turning point is a big curvature point in other words. The branch points and the turning points characterize the boundaries. This invention further cuts the boundary intervals at the turning points.

Thus the boundaries are doubly divided at both the branch points and the turning points. It is one of the excellent features of the present invention to divide the boundaries by the branch points and the turning points and to approximate the divided parts by some special functions. Parts of a boundary divided at branch points and turning points are called "subboundaries". Attention must be paid to the difference among a boundary, a boundary interval and a subboundary. Branch points cut a boundary into a plurality of boundary intervals. Turning points cut a boundary interval into a plurality of subboundaries.

The boundary is the longest in length. The subboundary is the shortest among the three. Namely, (boundary)> (boundary interval)≧(subboundary). The boundary is a closed loop. The boundary interval and the subboundary are lines having both ends. The ends of a boundary interval are branch points. The ends of a subboundary are branch points or turning points. Since a boundary includes branch points which disturb a serial approximation of the boundary, this invention excludes branch points from the boundary. Since a boundary interval may include strongly-curved points which would invite high order polynomials for approximation, this invention excludes the turning points.

In general, the approximation of a drastically-changing curve (tones in this case) requires high order polynomials. It is difficult to approximate a random varying curve even by using high order functions. Even if the main portion of the curve can be approximated by a high order polynomial, the polynomial often invites strong parasitic vibrations near the ends of the interval like Runge's phenomenon. The parasitic, undesirable vibration is a common difficulty appearing in the case of approximating drastically-varying parts of the curve for any approximating function. The inventors supposed, if vehemently-changing parts had been preliminarily excluded from the curve, other smooth-changing parts may be approximated by lower order functions with a higher accuracy without parasitic vibrations. On the basis of the idea, this invention tries to eliminate vehemently-changing parts as turning points and to approximate smoothly, continually-changing parts by low order functions. This approximation has advantages of the low order function approximation, a small number of data, and exact regeneration with high fidelity.

The present invention succeeds in maintaining the quality of pictures and suppressing the amount of data, since this invention seeks and eliminates the turning points on the boundaries and approximates the subboundaries without singular points. In the concrete, the turning points are sought on the boundaries by the following steps.

Step 1

A local direction vector is defined at every point on boundary point series. The local direction vector is represented as "Direction(p,k)", where p denotes the number of a boundary and k is the number of a point on the boundary. Direction(p,k) means the local gradient of the boundary at the k-th point $\{(x_k^{(p)}, y_k^{(p)})\}$ on the p-th boundary. The Direction(p,k) of the current point $(x_k^{(p)}, y_k^{(p)})$ is defined as a vector which is drawn from one point $(x_{k-a}^{(p)}, y_{k-a}^{(p)})$ preceding the current point $(x_k^{(p)}, y_k^{(p)})$ by "a" unit lengths along the boundary to the other point $(x_{k+a}^{(p)}, y_{k+a}^{(p)})$ succeeding the current point by "a" unit lengths along the boundary. Here, the unit length is a length of the side of a pixel. The dots mean integer coordinate points, that is, the corners of pixels. Boundaries are all defined not on pixels but on dots.

$$\text{Direction}(p, k) := \text{vector}(x_{k+a}^{(p)} - x_{k-a}^{(p)}, y_{k+a}^{(p)} - y_{k-a}^{(p)}) \qquad (11)$$

Here "a" means a parameter signifying the locality of the vector. The vector spans two points on a boundary separating by 2a unit lengths. The two points $(x_{k-a}^{(p)}, y_{k-a}^{(p)})$ and $(x_{k+a}^{(p)}, y_{k+a}^{(p)})$ sandwich the current point $(x_k^{(p)}, y_k^{(p)})$. The parameter "a" is an integer which should be chosen for extracting the direction of the boundaries in the most suitable way. If a=1, the angle of the Direction(p,k) takes only eight values of 0, π/4, π/2, 3π/4, π, 5π/4, 3π/2, and 7π/4 (in general, m π/4: 0≦m=integer<8). If a=2, the Direction vectors take 16 values which are denoted as m π/4 (0≦m= integer<8) and n π/2±18.4°: 0≦n=integer<4). Generally, Direction vectors (p,k) take 8a different directions which are given by [n π/2+tan⁻¹{(s/(2a–s))}], where n=0, 1, 2, 3 and s=0, 1, 2, . . . , 2a–1. If the parameter a is small, the determination of the vectors is vulnerable to noise. If the parameter a is long, the determination of the vectors is insensitive to the change of the direction of boundaries.

FIG. 9(a) and FIG. 9(b) show an example when a=2, for clarifying the definition of the Direction vector. In FIG. 9(a), the local direction vector Direction(p, ζ) at ζ is an arrow ηκ. Squares mean pixels. The corner points correspond to the integer coordinate points (dots). Dot η precedes dot ζ by two unit lengths on a boundary. Dot κ succeeds dot ζ by two unit lengths. The vector does not necessarily cross the current (object) point (dot) but in many cases separates from the current dot. FIG. 9(b) exhibits an example of local direction vectors along with the boundary. The boundary starts from the upper, leftest dot, runs to the right, turns down at dot ν, turns to the right at dot λ, rises at dot μ, turns to the right at ξ, turns down again at ρ and so forth. Although the boundary is a closed loop having 28 dots, FIG. 9(b) shows only 11 vectors of the beginning half part. Since the boundary sinks at dots λ and μ temporarily, the local direction vectors lower just before the dots, and rise just after the dots. The vectors run roughly on the boundary dots, but conspicuously deviate from the boundary at turning points, for example, at ρ. Since this example adopts a=2, the angles of the vectors are restricted to 0, 18.4°, 45°, 71.6°, 90°, . . .

Step 2

This process quantumizes the local direction vectors into eight directions of a width of 45 degrees by the slanting angles. Namely, the direction space of the vectors is divided into eight fan-shaped areas defined by the radius of angles of –22.5°, +22.5°, 67.5°, 112.5°, . . . , and 292.5° slanting to the x-direction. The fan-shaped areas are called by the average inclining degrees. Thus the area between –22.5° and +22.5° is named 0° fan-shape area. Another area between +22.5° and 67.5° is named 45° fan-shape area. Another area between 67.5° and 112.5° is 90° fan-shape area. The other area between 247.5° and 292.5° is 270° fan-shape area. The vectors included in the same fan-shaped area are deemed to be the same vector. And new vectors are again attached with an angle which is an average on the fan-shape areas. For example, if the inclining angle ranges from 247.5° to 292.5°, 270° is assigned to the vector. The quantization aims at stabilizing the local directional vectors against noise. The quantized local direction vector is called a "directional vector" and is represented as Direction(p,k).

Figure 10:
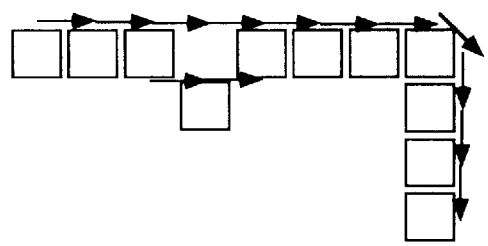
FIG. 10 is a figure of quantized local directional vectors defined at each point in the series of a boundary.

FIG. 10 shows an example of directional vectors which have been obtained by quantumizing the local direction vectors of FIG. 9(b). The length of the directional vectors is normalized to 1. The position of the vectors is also changed. The middle points of the directional vectors coincide with the current dots, because only the angle is significant for extracting the turning points. The lengths or stating points are less important.

Quantumization decreases the fluctuation of the directions of the vectors. Most of the vectors are reduced to 0° fan-shaped area and are given with an inclination angle of 0°. Vector κη which inclines at 18° in FIG. 9(a) is reduced to the quantized "0" fan-shaped area and is endowed with an inclination angle of 0 degree. Only one local direction vector in FIG. 9(b) inclines to x-axis at 45° which is classified to the 45° fan-shaped area and is give with a 45° angle by quantization. Vectors of a 72° inclination is classified to the 90° fan-shaped area and allocated with 90° by quantization. Quantumization cuts noise and makes an assembly of simplified direction vectors, as shown in FIG. 10. The choice of the parameter "a" has an influence on the result of course. Too long "a" causes insensitivity to the local change of direction of the boundaries. Too short "a" results in misoperation due to noise.

Step 3

The local turning angles θ (p,k) are reckoned at all series of dots on all the boundary intervals. The local turning angle θ (p,k) on a dot $\{(x_k^{(p)}, y_k^{(p)})\}$ of a boundary interval is defined as a difference between a direction vector preceding the current dot by b unit lengths and another direction vector succeeding the current dot by b unit lengths.

The local turning angle is defined by the inner product of the b-preceding vector and the b-succeeding vector divided by the product of the lengths of the vectors.

$$\cos\theta(p, k) = \frac{|\text{Direction}(p, k - b) \cdot \text{Direction}(p, k + b)|}{|\text{Direction}(p, k - b)| \, |\text{Direction}(p, k + b)|} \qquad (12)$$

The definition range of θ is –π<θ≦π. Eq. (12) cannot decide whether θ is positive or negative, because cosine function is an even function regarding θ. Then an extra condition gives the sign of θ. If the curve is a clockwise curve along the point series of a boundary, θ is defined as positive. If the curve is a counterclockwise curve along the point series of the boundary, θ is defined as negative. Eq. (12) includes not the Direction of the current dot itself, but includes the Direction vector at the (k–b)-th dot preceding the current dot (k-th dot) by b dots and the Direction vector at the (k+b)-th dot succeeding the current (k-th) dot by b dots.

Here "b" is a parameter representing the locality in the determination of the turning of the boundary. If b is too small, the turning angle θ cannot reflect wide-range changes of the boundaries. If b is too big, the turning angle θ omits localized changes of boundaries. The embodiment adopts b=1 which determines the turning angle θ by subtracting the angle of the one dot-succeeding vector from the angle of the one dot-preceding vector. Otherwise, b=2, b=3 or so is, of course, available.

Step 4

The localized turning angles θ (p,k) are calculated at all the dots k (k=0, 1, 2, . . . , N(r)) on the boundaries r (r=0, 1, 2, . . . , P). Then θ is compared with a parameter β. If θ (p,k) is larger than β, the point $(x_k^{(p)}, y_k^{(p)})$ is classified to a turning point. Namely, a turning point satisfies an inequality of $$|\theta(p,k)| \geq \beta. \qquad (13)$$

If θ (p,k) is smaller than β, the point is not a turning point but an intermediate, non-turning point which will be abandoned in the following approximation. β is a parameter which is predetermined to be a constant value between –π and +π for determining the degree of turning points.

Figures 11A, 11B:
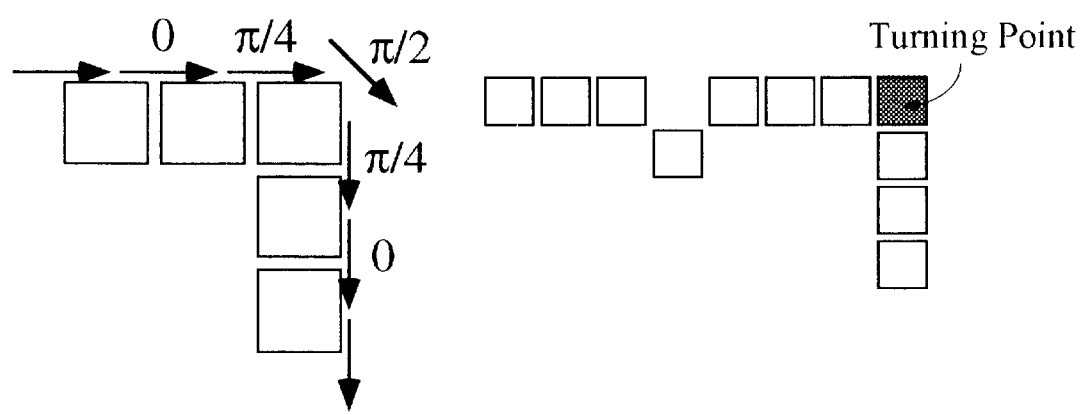
FIG. 11(a) is an explanatory figure for clarifying the determination of a turning point by the change of quantized local directional vectors.
FIG. 11(b) is a figure of an assembly of pixels for showing the turning point allotted at the corner of the pixels series.

FIG. 11(a) shows the quantized directional vectors and the turning angles at the serial points in the same example as FIG. 9 and FIG. 10. Since we assume that b=1 and that a clockwise bending gives positive turning angles, θ (p,k)= inclination angle(p,k–1)-inclination angle(p,k+1).

Inclination Turning Angle

|  | inclination | turning angle |
| --- | --- | --- |
| 1st dot | 0 | 0 |
| 2nd dot | 0 | 0 |

-continued

|  | inclination | turning angle |
|---|---|---|
| 3rd dot | 0 | π/4 |
| 4th dot | −π/4 | π/2 |
| 5th dot | −π/2 | π/4 |
| 6th dot | −π/2 | 0 |
| 7th dot | −π/2 | indefinite |

At three beginning dots, horizontally directed vectors (inclination angle=0) align. The turning angle is "0" for the second dot in FIG. 11(a). Then the fourth vector is directed to −45°. The turning angle is 45° (π/4) for the third dot. At the fifth dot, the vector is directed downward (inclination angle=−π/4). Thus the fourth turning angle is 90° (π/2). The fifth turning angle is 45° (π/4). Then the fourth dot at the corner is extracted as a turning point, since the dot has a turning angle of π/2. In FIG. 11(b). only the corner dot (ρ) is a turning point. Temporarily curving dots (v), (λ), (ξ) and (μ) are not extracted as a turning point.

Turning angles may be defined by another simpler way. If a turning angle θ (p,k) were defined to be a difference of the inclination angles of the neighboring vectors, the sum of the turning angles θ (p,k) would be always equal to the inclination angle of the current vector. The simple method would deem also the curving dots (v), (λ), (ξ), and (μ) to be turning points. But the dots (v), (λ), (ξ) and (μ) are not true turning points. The dots (v), (λ), (ξ), and (μ) must be eliminated posteriorly by some means. This invention need not such a step, since the dots (v), (λ), (ξ) and (μ) are not deemed as turning points from the beginning. This invention does not employ such a simple definition for the reason. Such a simple sum rule mentioned before does not hold in this invention.

There may be another simpler way for defining the turning angle by taking two points (K) and (M) (not shown in figures) in the vicinity of the outstanding point (L), drawing lines (KL) and (LM), and calculating the turning angle ∠KLM. If the deviation of ∠KLM from 2 π is large enough, the outstanding point (L) would be judged as a turning point. This may be called a "discrete curvature method". This method would erroneously find out the dots (v), (λ), (ξ) and (μ) as turning points. A drawback of the discrete curvature method is the impossibility of neglecting the false curving points (v), (λ), (ξ) and (μ).

Someone proposes a method of eliminating such redundant curving points in the discrete curvature method. For example, beforementioned ⑦ Horiuchi, Ohtaki, Toraichi, "Multistep extraction method of joint point by automatic functionization of the multifont", Trans. IEE Jpn(C), vol.113-C, No.12, pp.1136–1143, (1993) is suggested a method of removing the false turning points which have once been erroneously extracted like (v), (λ), (ξ) and (μ). This invention thus does not employ such a simple, but misleading discrete curvature method.

H. Boundary Approximation Device

The preceding steps have extracted boundaries, branch points and turning points on the boundaries. At the step, since the boundaries have been divided into branch intervals at the branch points, the boundary intervals have no more branch. Since the boundary intervals have been divided into subboundaries at the turning points, the subboundaries have no more turning point which has a big curvature. Namely, a boundary is divided into a plurality of boundary intervals at the branch points, and a boundary interval is again divided into a plurality of subboundaries at the turning points. A subboundary is a regular line without singularity. Here, the boundary approximation device (H) approximates the subboundaries by suitable functions.

The subboundary is a straight line or a smooth curving line, because the turning points with large curvatures have been removed. The word "line" means both a straight line and a smooth curving line for the subboundary. The ends of a subboundary are either a branch point or a turning point. The branch point and the turning point are called a characteristic point. Namely, characteristic points=branch points+turning points. The characteristic points are singular points on the boundaries. Subboundaries have no singular points except both ends.

The boundaries and the characteristic points have been extracted by the preceding steps. The boundary which is an assembly of points is given by a set of coordinates of series of points. A vast amount of the data, as they are, would consume great many bits of memories. Besides the enormous amount of data, enlargement, reduction, rotation, parallel displacement or other transformation is difficult to practice directly on the assembly of the crude data. This invention does not adopt such an inconvenient way of memorizing data. Otherwise, this invention tries to compress the data of the boundaries for alleviating the burden of memories and for allowing the enlargement or other transformation.

The coordinates of the characteristic points must be memorized in any way. It is, however, possible to reduce the quantity of the data by approximating the intermediate point series on the lines (subboundaries) between two neighboring characteristic points. The subboundaries sandwiched by two characteristic points are moderately-curving lines or straight lines which can be approximated with low order polynomials.

The inventor tried to apply spline functions having narrow ranges to approximate the subboundaries. Spline functions are a set of piecewise polynomials which are often used to interpolate random-distributing points. The points at which the polynomials change are called "knots." Every interval between the neighboring knots is expressed by a different m-th order piecewise polynomial. Two neighboring m-th order polynomials have the same value, the same first order differential, . . . , and the same (m−1)-th order differential at a knot. But the m-th order differential is discontinuous at the knot.

In general, the spline interpolation can raise the accuracy by dispersing knots at pertinent positions. It is one of the conventional skills of the spline approximation to seek the optimum positions of knots suitably for raising the accuracy.

This invention, however, abandons the freedom of distributing knots but determines the positions of knots automatically from the beginning of the approximation. "T" denotes the length of a subboundary. Piece number "M" is a new parameter for denoting the number of pieces. Namely, the subboundary T is equally divided by M into pieces of a length of (T/M). The knots are assumed to be distributed uniformly on the points separated on the subboundary by a length of (T/M). T and M determine automatically the positions of knots. T, the length, depends on the current subboundary. M is a freely-determinable parameter which gives the positions of knots. The accuracy of approximation can be heightened by increasing M.

The spline functions this invention adopts are a kind of normalized B-splines. The knots are given a subboundary at the points separated by a length (T/M). The division number M and the dimension m are the parameters for determining the spline functions. There are many sets of spline functions with different M and m. M is the number of dividing a subboundary. The divided lengths are called "pieces". A piece has a length of T/M which is denoted by α (Δ=T/M). Individual pieces are designated by suffixes k, l and so on.

The approximation uses a set of spline base functions (or spline bases in brief). A spline function is a localized function given as a sum of several polynomials. The approximation of the present invention represents an arbitrary curve by a linear combination of the spline base functions. M is the number of the pieces defined on a subboundary. M is called a division number, since a subboundary is divided into M pieces.

The dimension "m" is the order of the spline bases. Namely, the highest order of the terms of the base polynomial is m. For example, the 0-th order (m=0) spline base is 1 in a certain piece, but 0 in all other pieces. The integration is 1, since it is normalized. The 1st order (M=1) spline base is a triangle function spanning two neighboring pieces and yielding 1 by integration. The 2nd order (m=2) spline base is a smooth quadratic positive function ranging three neighboring pieces. The 3rd order (m=3) spline base is a cubic function spanning four neighboring pieces with vibration at both ends.

In general, the m-th spline base is an m-th order polynomial ranging over (m+1) pieces. The m-th order spline is often called the (m+1)-th rank spline which is represented as $N_{q,m+1}$. However, $N_{q,m+1}$ is simply written as $N_q$ by omitting (m+1). In any order base, the integration of a spline base gives 1 due to the normalization. Attention should be paid to the fact that the spline bases are different functions for different M, since the bases include the division number M through $\Delta=T/M$. The m-th order base function is given by $$N_q(t) = \frac{(m+1)\Delta^{-m}\sum_{w=0}^{m+1}(-1)^w\{t-(q+w)\Delta\}^m_+}{\{w!(m+1-w)!\}} \quad (14)$$

$$q = -2, -1, 0, 1, 2, \cdots, M-3 \ (\Delta = T/M)$$

Here, {a}+means a function which is equal to the bracketed "a" when a is positive, but is equal to 0 when a is negative. Namely, $\{a\}_+=a$ when a>0, but $\{a\}_+=0$ when a<0. $\{t-(q+w)\Delta\}^m_+$ is a function rising from $(q+w)\Delta$ in the m-th order of t. At the rising point of $t=(q+w)\Delta$, the value itself, the first rank differential, ..., and the (m−1) rank differential are all 0. Δ is a length of piece. The point $t=(q+w)\Delta$ is a knot. Σ $\{t-(q+w)\Delta\}^m_+$ means to add the m-th order function at the knot $t=(q+w)\Delta$ from w=0 to w=m+1. The first term rises at t=qΔ. If t<qΔ, Nq(t)=0. The (m+1)-th function cancels the sum of others. Thus t>(q+m+1)Δ, Nq(t)=0.

The spline base Nq(t) is a symmetric function ranging from t=qΔ to t={q+m+1}Δ and having a peak at t={q+(m+1)/2}Δ. The m-th order base makes a mountain covering (m+1) pieces by combining (m+2) m-th order polynomials. It is possible to change the dimension "m" at some subboundaries as a parameter. However, this embodiment fixes the value of m to a constant. For example, the embodiment employs quadratic polynomials (m=2). Of course, a similar result will be obtained by taking m=3 instead of m=2. In any case, this invention does not change the dimension "m" halfway.

Although free choice of dimension is one of the advantages of the spline interpolation, this invention never changes "m" from the beginning to the end. This invention abandons two advantages (free choice of knots and free choice of dimension) of the spline interpolation. However, the fixed knots and the fixed dimension bring about a new advantage to this invention. Since the dimension has been fixed, the spline bases are determined automatically, which facilitates the succeeding steps of calculations.

The previous steps have removed branch points and turning points from boundaries and have prepared subboundaries which contain no characteristic points except both ends. The subboundaries include low frequency components. Low dimension functions are sufficient to approximate the subboundaries.

Figure 19:
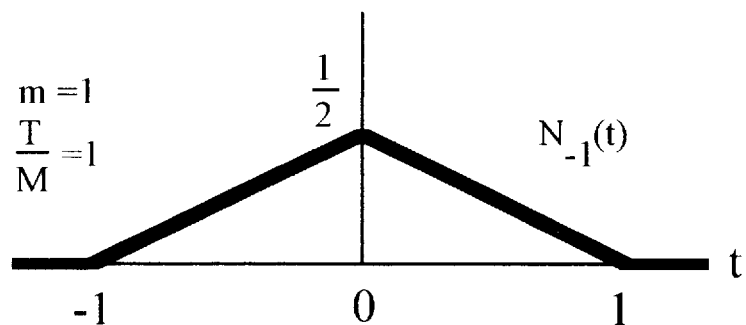
FIG. 19 is a graph of the first order (M=1) spline base function $N_{-1}(t)$ with a subinterval of T/M=1.

FIG. 19 is the graph of a normalized spline base function $N_{-1}(t)$ of n=1 which takes a piece of T/M=1 for simplicity. The m=1 spline base is a triangle peak function infeasible to represent arbitrary curves by a linear combination of the triangle functions. The 2nd order spline base can be obtained by substituting m=2 into Eq. (14).

$$N_q(t) = \frac{3\Delta^{-2}\sum_{w=0}^{3}(-1)^w\{t-(q+w)\Delta\}^2_+}{\{w!(3-w)!\}} \quad (15)$$

$$q = -2, -1, 0, 1, 2, \cdots, M-3 \ (\Delta = T/M)$$

Figure 20:
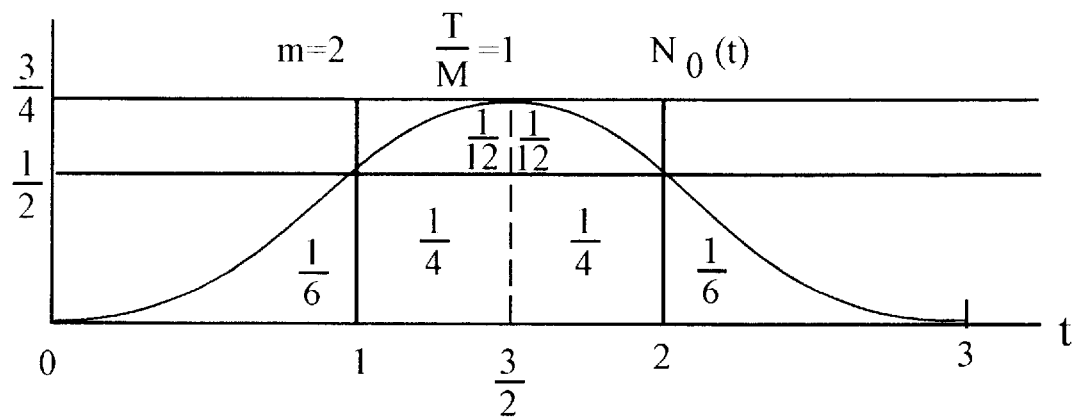
FIG. 20 is a graph of the second order (m=2) spline base function $N_0(t)$ with a subinterval of T/M=1.

FIG. 20 shows a normalized 2nd order spline base $Nq_{(t)}$, where m=2, q=0 and T/M=1. For the sake of simplicity, the graph has been drawn under the assumption of the piece length T/M=Δ=1. In general, the unit of abscissa is Δ=T/M and the unit of ordinate is $\Delta^{-1}$. The base $N_0(t)$ has a positive, round peak ranging in three pieces. The base function $N_0(t)$ slowly rises from 0 at t=0, attains the highest value 3/4 at t=3/2 and falls smoothly to 0 at t=3. The base $N_0(t)$ can be represented by simple quadratic polynomials;

(a) $0 \le t < 1$   $t^2/2$           (16)

(b) $1 \le t < 2$   $(3/4)-\{t-(3/2)\}^2$    (17)

(c) $2 \le t < 3$   $(t-3)^2/2$.       (18)

But if t<0 and t≧3, $N_0(t)=0$.

The function $N_0(t)$ itself and the 1st rank differential $dN_0/dt$ are continuous at the knots t=1, 2. But the 2nd rank differential $d^2N_0/dt^2$ is discontinuous there. $N_0(t)$ is normalized for yielding 1 by integration. The 2nd order spline is the simplest among the spline functions having smooth curving lines. FIG. 20 exhibits the areas of parts of $N_0(t)$.

$N_q(t)$ is a well-balanced function without oscillation. Since a base $N_q(t)$ pervades three pieces [q,q+1], [q+1,q+2] and [q+2,q+3], a piece between t=q and t=(q+1) is occupied only by three bases $N_q(t)$, $N_{q-1}(t)$ and $N_{q-2}(t)$.

The sum of the three bases with the same coefficient of 1 in the piece [q, q+1] gives 1. That is, $N_q(t)+N_{q-1}(t)+N_{q-2}(t)=1$ in [q, q+1]. This fact means that the 2nd order spline bases can represent even a straight line by equalizing the coefficients of the bases. The same matter holds in any other pieces and in all the subboundaries. The 2nd order spline bases can express any straight line by equalizing all the coefficients $\{c_q\}$ to a constant for any division number M. Thus even the smallest dimension of M=1 can represent a straight line by equalizing three x-coefficients $\{c_{xq}\}$ and y-coefficients $\{c_{yq}\}$.

The functions which are defined at all the pieces but are different polynomials at different pieces are called "piecewise polynomials". The second order spline is the simplest in the spline functions which can represent curves. It is a matter of course to build up this invention on the basis of third order splines. However, this invention will be described hereinafter on the framework constructed by the second order spline bases.

An arbitrary function f(t) is approximated by expanding the spline bases with coefficients $f(t)=\Sigma c_q N_q(t)$ on all the contributable knots q. In the case of the second order spline which pervades three pieces, $N_{-2}(t)$ has an influence on the 0-th piece [0, 1]. The last M-th piece $[M_{-1}, M]$ has components of $N_{M-3}$, $N_{M-2}$ and $N_{M-1}$. Therefore, "q" ranges from −2 to (M−1). There are (M+2) coefficients $\{c_q\}$ but M pieces of 0, 1, 2, . . . , M−1.

The current purpose is to approximate subboundaries without singular points. A boundary is intrinsically a continual line. In practice, the boundary which this invention defines is a series of points which are the corners of pixels. The boundary is a set of continually neighboring points. There are two ways for tracing continual point series; the four-neighbor approach and the eight-neighbor approach. The eight-neighbor approach joins a central point with another point among eight neighboring points. The four-neighbor approach couples a central point with another point of four neighboring points. Since the boundary is defined at the corners (dots) of pixels, the eight-neighbor approach is not suitable, since the chains connecting dots would cross over the pixels. Thus this invention joins the points on boundaries by the four-neighbor approach.

The points on a boundary is called a boundary point series. The total number of points is denoted by "n". The k-th point (0≦k≦n−1) is denoted by $(x_k, y_k)$. A boundary is represented by a set $\{(x_k, y_k)\}$ of the continually joining points.

The image memory device still maintains all the data of $\{(x_k, Y_k)\}$ at the present step. The amount of the data, however, is too large. It is desirable to memorize the regular subboundaries by a smaller amount of memory through some interpolation technique. The interpolation by spline functions has been explained hereinbefore. The subboundaries cannot be approximated by the spline functions, because the subboundaries are two-dimensional variables.

Fortunately, the number "k" determines the order of the point series and gives a tight connection between $x_k$ and $y_k$ of the k-th point. Such a structure allows the intermediate variable representation. The intermediate, independent variable is "t". All the points k of a subboundary are allocated to some values of t. "$t_k$" is the value allotted to the k-th points. "$t_k$" is a function uniformly increasing with k. The combination of $\{t_k\}$ with $\{(x_k,y_k)\}$ makes two sets of coordinates $\{(t_k, x_k)\}$ and $\{(t_k, y_k)\}$ for the point group $\{k\}$. Since $t_k$ is a monotonously-rising function of k, $x_k$ and $y_k$ are single-valued functions of t. The property enables spline functions to approximate $\{x_k\}$ and $\{y_k\}$.

Here, $\{x_k\}$ shall be approximated by $s_x(t)$, and $\{y_k\}$ shall be approximated by $s_y(t)$. The function $s_x(t)$ is a linear combination of the spline bases $\{N_q(t)\}$ with coefficients $\{c_{xq}\}$.

$$s_x(t) = \sum_{q=-2}^{M-1} c_{xq} N_q(t) \tag{19}$$

The function $s_y(t)$ is given by a linear combination of the spline bases $\{N_q(t)\}$ with coefficients $\{c_{yq}\}$.

$$s_y(t) = \sum_{q=-2}^{M-1} c_{yq} N_q(t) \tag{20}$$

$N_q(t)$ is a mountainous function localized in [q, q+3] as shown in FIG. 20. The localization is signified not by t but by q in $N_q(t)$. In the case of the second order splines, "$c_q$" represents the probability of being localized at q+(3/2). The approximation functions are given by determining 2(M+2) coefficients $\{c_{xq}\}$ and $\{c_{yq}\}$. In the step, the point number "n" should not be confused with the division number "M". If the subboundary is long, n is large, since n is the length of the subboundary. If the subboundary has strong vibration, M will become large, since M is a measure of the complexity of the subboundary. The data compression reduces the number of the image data from 2n of $\{(x_k, y_k)\}$ to 2M+4 of $\{(c_{xq}, c_{yq})\}$.

The Intermediate variable "t" takes continual values. At the k-th point on the subboundary, t takes "$t_k$". But t takes other continual values except $t_k$. Since t is a continual variable, $s_x(t)$ and $s_y(t)$ can be differentiated by t. The k-th point coordinates are approximately given by $s_x(t_k)$ and $s_y(t_k)$. However, $s_x(t_k)$ and $s_y(t_k)$ are not necessarily equal to $x_k$ and $y_k$, since $s_x(t)$ and $s_y(t)$ are approximating functions.

The determination of the approximating functions is equivalent to determining the coefficients $\{(c_{xq}, c_{yq})\}$. There are two ways for seeking the optimum coefficients. One way is the least square error method. The other is the "biorthonormal function method" which has been proposed by this inventor for the first time. The latter can calculate the coefficients in a far shorter time than the least square error method. The inventor believes that the biorthonormal function method contrived by the inventor is far superior to the least square error method. Since the coefficients can be reckoned by both methods, both the least square error method and the biorthonormal function method will be explained.

1. Determination of $\{(c_{xq}, c_{yq}\}$ by the least square error method

The least square method determines the coefficients $\{c_{xq}, c_{yq}\}$ by calculating the difference between $x_k$ and $s_x(t_k)$ and the difference between $y_k$ and $s_y(t_k)$, squaring the differences, summing the differences up, and minimizing the sum. The sum of the squares of the differences at all the points is denoted by a square error "Q". Q is given by $$Q = \sum_{k=0}^{n-1} \{s_x(t_k) - x_k\}^2 + \sum_{k=0}^{n-1} \{s_y(t_k) - y_k\}^2. \tag{21}$$

Here "k" denotes a point on the subboundary, taking the values 0, 1, 2 , . . . and n−1. The coefficients in $s_x(t)$ and $s_y(t)$ are determined for minimizing "Q". The least square error method is named after the technique of minimizing the square error. Q is converted by substituting Eq. (19) and Eq. (20) to;

$$Q = \sum_{k=0}^{n-1}\left\{\sum_{q=-2}^{M-1} c_{xq} N_{xq}(t_k) - x_k\right\}^2 + \sum_{k=0}^{n-1}\left\{\sum_{q=-2}^{M-1} c_{yq} N_{yq}(t_k) - y_k\right\}^2. \tag{22}$$

Eq. (22) contains two kinds of summations (Σ). Σ of k is a sum of the n points on the current subboundary. Σ of q is a sum of the (M+2) spline base functions. The spline bases are known functions. $(x_k, y_k)$ are also known. $\{c_{xq}\}$ and $\{c_{yq}\}$ are unknown parameters. When $c_{xq}$ and $c_{yq}$ were changed by infinitesimal amounts, Q would always increase in any case, if Q has taken the minimum value. Thus at the point, 2(M+2) partial differentials of Q with $c_{xq}$ and $c_{yq}$ are 0.

$$\delta Q / \delta c_{xj} = 0 \ (J=2, -1, 0, \ldots, M-1) \tag{23}$$

$$\delta Q / \delta c_{yj} = 0 \ (J=2, -1, 0, \ldots, M-1) \tag{24}$$

Eq. (22) and Eq. (23) yields $$\sum_{k=0}^{n-1}\sum_{q=-2}^{M-1} c_{xq} N_{xq}(t_k) N_{xj}(t_k) = \sum_{k=0}^{n-1} x_k N_{xj}(t_k). \quad (25)$$

Similarly, Eq. (22) and Eq. (24) yields $$\sum_{k=0}^{n-1}\sum_{q=-2}^{M-1} c_{yq} N_{yq}(t_k) N_{yj}(t_k) = \sum_{k=0}^{n-1} y_k N_{yj}(t_k). \quad (26)$$

The coefficients $c_{xq}$, $c_{yq}$ are determined by solving these linear equations. The number of the coefficients $\{c_{xq}\}$ is (M+2). The number of $N_{xj}(t_k)$ is n(M+2). Eq. (25) and Eq. (26) are 2(M+1)-dimension linear equations.

The approximation starts from M=1. The equations are solved for some M. If the result does not satisfy the predetermined criterion, the division number M is increased one by one to M+1. Solving the equations and examining the results are repeated till the result suffices the criterion.

Alternatively, matrix operation can determine the coefficients. The coefficients $\{c_{xq}\}$ are represented by a (M+2) dimension columnar vector $c_x$ (q=-2, -1, 0, ..., M-1). The coefficients $\{c_{yq}\}$ are represented by a (M+2) dimension columnar vector $c_y$ (q=-2, -1, 0, ..., M-1). The bases $\{N_{xq}(t_k)\}$ are represented by a (M+2)-column, n-line matrix $N_x$ (q=-2, -1, 0, ..., M-1; k=0, 1, 2, ..., n). "'N" means a transposed matrix of "N". $'N$ is an n-line, (M+2)-column matrix. Eq. (25) and Eq. (26) can be replaced by matrixes $$'N_x N_x c_x = N_x x \quad (27)$$

$$'N_y N_y c_y = N_y y \quad (28)$$

These matrixes determine $c_x$ and $c_y$, because x and y are known vectors and $N_x$ and $N_y$ are known matrix. $N_x$ and $N_y$ have no inverse matrix, since these are not a square matrix (line number=column number). The product $'N_x N_x$ is an (M+2)×(M+2) square matrix which has an inverse matrix $('N_x N_x)^{-1}$. Then, $$c_x = ('N_x N_x)^{-1} N_x x \quad (29)$$

$$c_y = ('N_y N_y)^{-1} N_y y \quad (29)$$

The coefficients $\{c_x\}$ and $\{c_y\}$ are calculated by Eq. (29) and Eq. (30). Determination of $\{c_x\}$ and $\{c_y\}$ by the least square error method results in the calculation based upon either Eqs. (25) and (26) or Eqs. (29) and (30).

When the coefficients $\{c_x\}$ and $\{c_y\}$ have been calculated, it is examined whether the $\{c_x\}$ and $\{c_y\}$ satisfy the criterion by calculating the root of the square error between $(x_k, y_k)$ and $(s_x(t_k), s_y(t_k))$ at every point k, comparing the square error with a predetermined value and examining whether all the square errors at all points are smaller than the predetermined value. Therefore, the maximum of the roots of the square errors among all k is denoted by $\epsilon$, $$\varepsilon = \sum_{k=0}^{n-1} [\{s_x(t_k) - x_k\}^2 + \{s_y(t_k) - y_k\}^2]^{1/2}, \quad (31)$$

where max means the maximum of the following terms [...] for k=0, 1, 2, ..., n-1. Attention should be paid to the fact that this criterion estimates the errors not by a sum of all square deviations but by the maximum deviation at a certain individual point. It should be noted that Eq. (31) is not an equation for the least square error method but an equation for the criterion. Although Eq. (31) slightly resembles Eq. (21), the meaning of Eq. (31) is entirely different from Eq. (21). Eq. (21) is a starting definition for practicing the least square error method for calculating $c_{xq}$ and $c_{yq}$. Eq. (31) gives a criterion for examining whether the calculated $c_{xq}$ and $c_{yq}$ can approximate the subboundary with fidelity.

The maximum error $\epsilon$ in Eq. (31) is compared with a predetermined value which is a measure of the degree of the approximation. A smaller $\epsilon$ would bring the approximation data $s_x(t_k)$ and $s_y(t_k)$ closer to the original data $(x_k, y_k)$. But a smaller $\epsilon$ requires more times of repetitions of approximation, which wastes longer time.

The critical value of e should be predetermined for reconciling the calculation time with the fidelity of regeneration. For example, 0.5 may be chosen as the critical value. In the case, the approximation steps will be repeated by raising M by 1 as long as $\epsilon \geq 0.5$. When $\epsilon < 0.5$, the approximation step is ended and the current coefficients are employed as the final coefficients. The criterion $\epsilon < 0.5$ aims at rigorous regeneration with high fidelity.

Otherwise, the critical value can be predetermined to be a value larger than 1. A large critical value reduces the time of calculation. Besides the saving of time, such a larger critical value is suitable for regeneration of smoother boundaries. The critical value should be determined in accordance with the purpose.

In general, for a certain division number M, when $\epsilon$ becomes smaller than the critical value, the approximation is finished, and the coefficients are employed as final $\{c_{xq}, c_{yq}\}$.

If $\epsilon$ is still higher than the critical value, a similar calculation shall be repeated by increasing M to M+1. Of course, When M is changed, all the pieces q (q=-2, -1, 0, 1, ..., M-1) and the bases $\{N_q(t_k)\}$ are changed. The bases are reckoned again and the coefficients shall be calculated. Then the maximum error $\epsilon$ of Eq. (31) is compared with the critical value. When s is still bigger than the critical value, a further similar calculation shall be repeated further by increasing M by 1 till $\epsilon$ becomes smaller than the critical value. A complex curve demands many times of repetitions of approximation calculation till $\epsilon$ falls below the critical value. The least square error method is possible only for small division numbers M. For a big M, it is difficult to calculate the inverse matrix of $('N_x N_x)$. The least square error method becomes incompetent for large division numbers M. The calculation of the coefficients requires a simpler method which alleviates the time of calculation. The following method which this inventor contrived for the first time suffices this requirement.

2. Determination of $\{c_{xq}, c_{yq}\}$ by Biorthonormal Function Method

The concept of a biorthonormal function is novel itself. The orthonormality of functions is first explained. We assume that there is a set of infinite functions which are specified by a parameter. If the integration of a product of two functions with different parameters in a certain integration range is always zero, it is said that the set of functions has orthonormality. For example, a set of sine functions or cosine functions has orthonormality, because the integration of the product of sine functions or cosine functions of different parameters in a cycle gives 0. Namely, the integration of the product of sin(pt) and sin(qt) from 0 to $2\pi$ is 0 except the case of p=q.

$$\int_0^{2\pi} \sin(pt)\sin(qt)dt = \pi\delta_{pq} \quad (p \text{ and } q \text{ are integers}). \tag{32}$$

$\delta_{pq}$ is Kronecker's $\delta$ which is 0 when p≠q but is 1 when p=q. Eq. (32) signifies that the integration of the product is $\pi$ in the case of p=q, but the integration is always 0 when p is different from q. The set of sine functions and cosine functions has an ideal orthonormality.

Some other sets of special functions have orthonormality. For example, Legendre's polynomials Pm(t) has such an orthonormality of the integration of products from −1 to +1.

$$\int_{-1}^{+1} P_m(t)P_n(t)dt = 2\delta_{mn}/(2n+1). \tag{33}$$

This equation means that the integration of a product of two Legendre's functions of different parameters in a cycle is zero. Since Legendre's functions are not normalized, the integration of the square of Legendre's functions is not 1. The coefficients can be easily calculated by making use of the orthonormality, when an arbitrary function is expanded by an infinite series of Legendre's functions with coefficients.

Bessel functions $J_m(t)$ have a special orthonormality.

$$(b^2 - a^2)\int_0^t xJ_m(ax)J_m(bx)dx = t[bJ_m(at)J_{m+1}(bt) - aJ_m(bt)J_{m+1}(at)] \tag{34}$$

Bessel functions lack periodicity, and have infinite zero-points. The orthonormality takes such a strange form. Eq. (34) is not a definite integration but an indefinite integration. An arbitrary function can be expanded by an infinite series of the m-th order Bessel functions $\{J_m(a_k x)\}$ having different zero-point multipliers $a_k$ which are zero-points of $J_m(x)$, i.e. $J_m(a_k)=0$. The coefficients can be reckoned by the orthonormality given by Eq. (34).

Hermite polynomials Hp(t) are endowed with a plain orthonormality. The integration of a product of two Hermite polynomials $H_p(t)$ and $H_q(t)$ from minus infinity to plus infinity is zero except the case of q=p.

$$\int_{-\infty}^{+\infty} H_p(t)H_q(t)dt = \delta_{pq}. \tag{35}$$

In addition to these familiar series of functions, some unknown function series have orthonormality. For example, the eigen functions $\{\Psi_p\}$ for Hamiltonian H which specifies energy satisfy the following Schroedinger equation $$H\Psi_p = E_p\Psi_p. \tag{36}$$

A product of two different eigen functions yields zero by the integration from minus infinity to plus infinity $$\int_{-\infty}^{+\infty} \Psi_p(t)\Psi_q(t)dt = \delta_{pq}. \tag{37}$$

The eigen functions $\{\Psi_p(t)\}$ have simple orthonormality due to the difference of the eigen values $E_p$, either if $\Psi_p(t)$ is known or if $\Psi_p(t)$ is unknown.

There are many other assemblies of functions specified by a parameter having orthonormality which means that the integration of a product of functions of different parameters is zero. It is ordinary that a set of functions discerned by a parameter has orthonormality among the members. The orthonormality is a quite popular, commonplace property for an assembly of special functions. Sometimes such a set of infinite functions is called an "orthonormal function system". If the functions are normalized, the set is called further a "normalized, orthonormal function system". The orthonormality is a convenient property for calculating the coefficients when an arbitrary function is represented by an infinite linear combination of the functions with coefficients. For instance, suppose an arbitrary function f(t) is expanded by the eigen functions $\{\Psi_p(t)\}$ of Schroedinger's equation as follows;

$$f(t) = \sum_{p=0}^{\infty} c_p \Psi_p(t). \tag{38}$$

The coefficients $c_p$ is simply given by the integration of the product of f(t) and $\Psi_p(t)$. Multiplying both sides of Eq. (38) with $\Psi_q(t)$, integrating the products, we obtain, $$\int_{-\infty}^{\infty} f(t)\Psi_q(t)dt = \sum_{p=0}^{\infty}\int_{-\infty}^{\infty}\Psi_q(t)c_p\Psi_p(t)dt = \sum_{p=0}^{\infty}\delta_{pq}c_p = c_q. \tag{39}$$

This result shows the fact that the coefficient can easily be determined by the integration of the product f(t) $\Psi_q(t)$ when the function is expanded on the function series with coefficients.

The reason why these sets of functions have orthonormality is that these functions infinitely oscillate into both the positive region and the negative region across the zero line. All the functions abovementioned oscillate up and down till infinity. The functions of different parameters have different mode of oscillation. The integration of the product of different parameter functions always is zero, because the different oscillation modes cancels with each other in the product.

Orthogonality, however, lacks for the spline function bases of any order. For instance, the second order (m=2) spline base $N_q(t)$ is a hill-shaped function localized at $t=(q+1.5)\Delta$. The integration of the product of two spline bases $N_q(t)$ and $N_p(t)$ is not zero at all. $\int N_q(t)N_p(t)dt \neq 0$. The spline functions do not form an orthonormal function system.

The assembly of the spline functions is a non-orthonormal function system. The spline functions are rather rare functions. What deprives the spline functions of orthonormality?

One is excess simplicity of the spline functions. The spline functions have a hill having feet with little oscillation. Taking only positive values, the second order (m=2) spline function does not fall below zero and does not oscillate, as shown in FIG. 20. The spline bases never oscillate across zero line. Therefore, orthonormality is denied in the spline functions. Higher order spline, e.g., 3rd order or 4th order, functions have the feet with weak oscillation. The oscillation at the feet is too weak to cancel the integration of a product of different parameter bases.

What suppresses the oscillation in the spline functions? Why do the spline functions induce little oscillation? The spline functions are artificial functions which were contrived to interpolate discrete points by smooth curves with oscillation as little as possible. Thus it is a matter of course that the spline functions are lacking in oscillation. The weak oscillation is equivalent to the discontinuity of the m-th order differential at knots of the m-th order spline functions. The m-th spline is a $C^{(m-1)}$ class function which can be differentiated till (m−1) times, but cannot be differentiated more than (m−1) times.

The spline functions are not infinite time differentiable functions. On the contrary, infinite time differentiations are fully possible on the sine functions, cosine functions, Legendre's functions, Hermite functions and the solutions of Schroedinger equation explained as the examples having orthonormality. Feasibility of the infinite time differentiations gives these functions strong oscillation. Orthogonality originates from the strong oscillation.

In contrast with these complete, orthonormal functions, the m-th order spline function is incapable of the m-th time differentiation for the purpose of suppressing oscillation. A simple hill-shape facilitates the calculation. But a difficulty arises from the simple hill-shape through the loss of orthonormality.

Due to the lack of orthonormality, it is quite difficult to calculate the coefficients, when an arbitrary function is expanded to a linear combination of the spline bases with coefficients. Non-orthonormality forbids the spline expansion from transferring from the 2nd form to the 3rd form of Eq. (39). The coefficients $\{c_q\}$ cannot be obtained by such a simple deduction of Eq. (39). Then the spline expansion forces people to calculate the coefficients by the complicated least square error method.

However, it would be still quite attractive to calculate $\{c_q\}$ of the spline expansion by a simple integration like Eq. (39). An alternative like Eq. (39) is ardently requested also for the spline expansion. Non-orthonormality refuses the direct application of Eq. (39) to the spline functions. Thus the inventor has forged artificially orthonormal functions $\{L_q(t)\}$ for spline bases $\{N_q(t)\}$ in order to calculate $\{c_q\}$ by a simpler way using the calculation like Eq. (39) than the least square error method. The new functions $\{L_q(t)\}$ are defined by the following relations. When an arbitrary function $f(t)$ is expanded by the spline bases, it would be requested for $\{L_q(t)\}$ that the coefficients $\{c_q\}$ can be calculated by a simple integration of a product $f(t)L_q(t)$. Namely when $f(t)$ is expressed by $$f(t) = \sum_{q=-2}^{M-1} c_q N_q(t), \tag{40}$$

the coefficients $\{c_q\}$ are briefly given by, $$c_q = \int_0^T f(t) L_q(t) dt. \tag{41}$$

$L_q(t)$ is a newly-proposed function for orthonormalizing the spline $N_q(t)$. If the set of the functions had orthonormality, $L_q(t)$ would be identical to $N_q(t)$ like the sine function, the cosine function and so on. Since the spline function lacks in orthonormality, the spline function requires new artificially-orthonormal functions. Eq. (41) signifies an ideal form of the artificial, orthonormal function. What is the orthonormal function? Can such a set of orthonormal functions exist on earth? Aside from the problem of existence, the artificial function $L_q(t)$ is called a "biorthonormal function" of $N_q(t)$. The biorthonormal function must suffice the orthonormality $$\int_0^T L_p(t) N_q(t) dt = \delta_{pq} \tag{42}$$

$(p, q = -2, -1, 0, 1, 2, \cdots, M-1)$

The reason why Eq. (42) is requisite is understood by substituting Eq. (40) into Eq. (41). The definite integration of a product of two functions is sometimes called an inner product from an analogy of vector operation. The fact that the inner product is zero is equivalent to the fact that two functions are orthonormal. Since spline bases are non-orthonormal functions, the inner product of the splines of $N_p(t)$ and $N_q(t)$ having different parameters p and q respectively has a definite value which is denoted by $g_{pq}$ $$\int_0^T N_p(t) N_q(t) dt = g_{pq} \tag{43}$$

$(p, q = -2, -1, 0, 1, 2, \cdots, M-1)$

The inner products $g_{pq}$ can be calculated. Including the division number M, $g_{pq}$ is a function of the difference (p−q). The scope of (p−q) is narrow, because $N_q(t)$ or $N_p(t)$ is a localized function which occupies only (m+1) pieces. The inner product $g_{pq}$ has a definite value for the difference (p−q) between −m and +m (−m≦(p−q)≦+m). In the case of m=2, the inner product $g_{pq}$ takes the following values

| | | |
|---|---|---|
| when $p = q$, | $g_{pq} = 1$, | (44) |
| when $p = q \pm 1$, | $g_{pq} = 1/3$, | (45) |
| when $p = q \pm 2$, | $g_{pq} = 1/24$, | (46) |
| otherwise | $g_{pq} = 0$. | (47) |

The assembly of the inner product of spline bases can be deemed as an (M+2)×(M+2) square matrix G. A convenient character of the spline inner product matrix G is that all components of G are known for any M by Eq. (44) to (47), whenever the division M changes. When M is increased to (M+1) for improving approximation, the matrix G is immediately given by the memory without calculating the components. The spline inner product matrix G is always a known matrix for arbitrary M. Another convenient character of G is the feasibility of reckoning an inverse matrix $G^{-1}$, because G is a symmetric matrix.

An arbitrary function can be represented by a linear combination of the spline base functions $\{N_q(t)\}$ in the definition interval [0, T]. The biorthonormal function $L_p(t)$ itself can be represented by a linear combination of $\{N_q(t)\}$ with coefficients $\{d_{pq}\}$, $$L_p(t) = \sum_{q=-2}^{M-1} d_{pq} N_q(t). \tag{48}$$

Substitution of Eq. (48) into Eq. (42) yields $$\sum_{s=-2}^{M-1} \int_0^T d_{ps} N_s(t) N_q(t) dt = \delta_{pq}. \tag{49}$$

The integration of the product $N_s(t)N_q(t)$ is $g_{sq}$ in Eq. (43). Eq. (49) becomes $$\sum_{s=-2}^{M-1} d_{ps} g_{sq} = \delta_{pq}. \tag{50}$$

A set of the expansion coefficients $\{d_{ps}\}$ can be deemed as components of an $(M+2)\times(M+2)$ square matrix D. As mentioned herebefore, the set of the inner products $\{g_{sq}\}$ forms the square matrix G. Kronecker's $\delta$ makes an $(M+2)\times(M+2)$ unit matrix I. Eq. (50) can be rewritten into a simple matrix equation $$D\ G=I. \tag{51}$$

Thus the coefficient matrix D is given by an inverse of the spline inner product matrix G.

$$D=g^{-1}. \tag{52}$$

The components of G have been given in Eq. (44) to Eq. (47) definitely. D can easily be calculated from G. Thus coefficient matrix D is also a known matrix for any M, which is a very convenient property. The matrix operation can be applied to approximate the subboundaries by the spline functions. An arbitrary function f(t) is expanded upon the spline bases like Eq. (40)

$$f(t) = \sum_{q=-2}^{M-1} c_q N_q(t). \tag{40}$$

Multiplying both terms of Eq. (40) by $L_p(t)$, and integrating both terms by t, we obtain;

$$\int_0^T L_p(t)f(t)dt = \sum_{q=-2}^{M-1} \int_0^T L_p(t)c_q N_q(t)dt. \tag{53}$$

The biorthonormality of Eq. (42) simplifies the right term of Eq. (53) to $\Sigma \delta_{pq} c_q = c_p$. As predicted by Eq. (41), the expansion coefficient $c_p$ is given by $$c_p = \int_0^T L_p(t)f(t)dt. \tag{54}$$

Since $L_p(t)$ is a known function, $c_p$ can be reckoned directly by Eq. (54). Alternately, Eq. (54) can be reduced to the spline base representation $$c_p = \sum_{q=-2}^{M-1} d_{pq} \int_0^T N_q(t)f(t)dt. \tag{55}$$

Since $\{d_{pq}\}$ are known coefficients, $\{c_p\}$ can be immediately reckoned. Eq. (54) and Eq. (55) are equivalent for determining the coefficients $\{c_p\}$.

The relation between the spline bases $N_q(t)$ and the biorthonormal $L_q(t)$ is further clarified. The spline base $N_q(t)$ is a simple, tranquil function with little oscillation. The 2nd order spline base has no oscillation as shown in FIG. 20. Even higher order splines have poor oscillation. On the contrary, the biorthonormal function $L_p(t)$ is a rapidly-changing function accompanied with strong oscillation which is required for cancelling the tranquil $N_p(t)$ in the product $L_p(t)N_p(t)$.

The spline function $N_q(t)$ is now expanded by the biorthonormal functions $L_p(t)$ with coefficients $\{u_{qp}\}$, i.e., $N_q(t)=\Sigma U_{qp}L_p(t)$. The inner product of $L_p$ and $L_q$ is denoted by $J_{pq}$. $\int L_p(t)L_q(t)dt=(L_p\cdot L_q)=J_{pq}$. A matrix J can be constructed by the set of $\{J_{pq}\}$. J is now called an orthonormal inner product matrix. Similarly a coefficient matrix U is built with the set of coefficient $\{u_{pq}\}$. J and U are $(M+2)(M+2)$ matrices. Since $\delta_{pq}=(L_p\cdot N_q)=\Sigma(L_p\cdot L_s)U_{qs}=\Sigma J_{sp}U_{qs}$, like Eq. (51), $$U\ J=I. \tag{56}$$

The matrix D of $\{d_{pq}\}$ connecting $L_p$ to $N_q$ is an inverse of the matrix U of $\{u_{qp}\}$ connecting $N_q$ to $L_p$. Then, $$U\ D=I,\ U\ J=I,\ D\ G=I. \tag{57}$$

Eq. (56) and Eq. (57) give simple relations among the four matrices D, J, U and G $$D=J \tag{58}$$

$$U=G=D^{-1}=J^{-1}. \tag{59}$$

Eq. (58) says that the orthonormal inner product matrix J of (Lp·Lq) is equal to the biorthonormal coefficient matrix D of $\{d_{pq}\}$ which are coefficients on $N_q$, when $L_p$ is expanded on $\{N_q\}$. On the contrary, Eq. (59) says that the spline inner product matrix G of $(N_p \cdot N_q)$ is equal to the spline coefficient matrix U of $\{u_{pq}\}$ which are coefficients on $L_q$, when $N_p$ is expanded on $\{L_q\}$. Eq. (59) ensures that D=J is an inverse of U=G. Therefore, the four matrices are not independent. If one matrix is determined, the other three are automatically determined. This is a very convenient property.

On the contrary, when an arbitrary function f(t) is expanded on the biorthonormal functions $\{L_q(t)\}$, i.e. $f(t)=\Sigma C_q L_q(t)$, the coefficient $\{c_q\}$ can be calculated by integrating the product of $\{N_q(t)\}$ and f(t). Namely $C_q=(f, N_q)$. $\{N_q\}$ and $\{L_q\}$ have such a complementary property. Thus $\{L_q\}$ are biorthonormal functions for $\{N_q\}$. At the same time, $\{N_q\}$ are biorthonormal functions for $\{L_q\}$.

Now the coefficient of the expansion of the subboundaries are reckoned by the biorthonormal function method instead of the least square error method. In a subboundary, the k-th point coordinate $(x_k, y_k)$ has been divided into $(t_k, X_k)$ and $(t_k, y_k)$ on the intermediate variable representation. Then $x_k$ is expanded on the spline bases $N_q(t)$ into $s_x(t)=\Sigma C_{xq}N_q(t)$ of Eq. (19). And $y_k$ is expanded on the spline bases $N_q(t)$ into $s_y(t)=\Sigma C_{yq}N_q(t)$ of Eq. (20). The approximated subboundary is given by the continual functions $s_x(t)$ and $s_y(t)$. The coefficients $\{C_{xq}\}$ and $\{C_{yq}\}$ are now calculated on the biorthonormal function method.

$$s_x(t) = \sum_{q=-2}^{M-1} c_{xq} N_q(t) \tag{19}$$

$$s_y(t) = \sum_{q=-2}^{M-1} c_{yq} N_q(t). \tag{20}$$

According to the principle aforementioned, the biorthonormal functions express the coefficients as $$c_{xq} = \int_0^T s_x(t)L_q(t)dt, \tag{60}$$

$$c_{yq} = \int_0^T s_y(t)L_q(t)dt. \tag{61}$$

The coefficients cannot be directly calculated yet, since $s_x(t)$ and $s_y(t)$ are still unknown. However this fact causes no problem. Known date are $(t_k, X_k)$ and $(t_k, y_k)$. Substituting $X_k$ to $s_x(t_k)$ and $y_k$ to $s_y(t_k)$, and replacing the integration in [0, T] by the summation at the points $k(k=0, 1, 2, \ldots, n-1)$, we obtain $$c_{xq} = \sum_{k=0}^{n-1} x_k L_q(t_k), \tag{62}$$

$$c_{yq} = \sum_{k=0}^{n-1} y_k L_q(t_k). \tag{63}$$

These equations give the coefficients $\{c_{xq}\}$ and $\{C_{yq}\}$. Since the orthonormal bases $Lq(t)$ is a known function, $L_q(t_k)$ can be immediately reckoned. Of course, when M changes, the orthonormal bases $L_q(t)$ also changes, because $L_q(t)$ contains M. However, $L_q(t)$ can be memorized in a table for the probable M. Thus $L_q(t_k)$ can be deduced as the value at $X=X_k$ from the table without delay.

Alternatively, the coefficients can be reckoned from the spline bases $\{N_q(t)\}$.

$$c_{xq} = \sum_{k=0}^{n-1} \sum_{p=-2}^{M-1} x_k d_{qp} N_p(t_k), \tag{64}$$

$$c_{yq} = \sum_{k=0}^{n-1} \sum_{p=-2}^{M-1} y_k d_{qp} N_p(t_k). \tag{65}$$

The matrix $\{d_{qp}\}$ is the inverse matrix of the spline inner product matrix $\{g_{pq}\}$. Thus $\{d_{qp}\}$ are known values for all possible M. $Np(t_k)$ is obtained from the table memory. Although Eq. (64) and Eq. (65) seem rather complicated, the calculation is facile. Spline bases $N_q(t)$ are 0 in almost all the definition range except a few pieces. As mentioned before, $N_p(t)$ is a localized function which rises at $t=p\Delta$, attains a peak at $t=(p+1.5)\Delta$ and dies away at $t=(p+3)\Delta$. Here $\Delta=T/M$, T is the full length of the subboundary, M is the division number of pieces and $\Delta$ is the unit length of a piece. The k-th point in n points takes $t=t_k$ in [0, T]. If the $\{t_k\}$ are uniformly distributed in [0, T], $N_p(t_k)$ has a positive definite value only when $$p/M \leq k/n \leq (p+3)/M. \tag{66}$$

Only three values of p among (M+2) components satisfy inequality(66) for a value of k. The other (M−1) bases $N_p(t_k)$ are all zero. Every k has three non-zero spline bases $N_q(t_k)$. Then 3n times of summation give the coefficient $c_{xq}$ in Eq. (64). Similarly $c_{yq}$ can be obtained by 3n times of summation. The biorthonormal function method based upon Eq. (62) and Eq. (63) or Eq. (64) and Eq. (65) is far superior in calculating the coefficients to the least square error method realized by Eq. (29) and Eq. (30) or Eq. (25) and Eq. (26). Of course this invention can be carried out by the least square error method. But this invention prefers to the biorthonormal function method which can greatly shorten the time of calculation.

By these calculations, the biorthonormal function method obtains 2(M+2) coefficients. Then the degree of the approximation is estimated by the same way which has already been clarified for the estimation of the results brought about by the least square error method. The estimation way requires that all the distances between the original points $(X_k, y_k)$ and the approximated points $(s_x(t_k), s_y(t_k))$ must be smaller than a predetermined critical value. The maximum of the distances is denoted by $\epsilon$ $$\varepsilon = \max_{k=0}^{n-1}[\{s_x(t_k) - x_k\}^2 + \{s_y(t_k) - y_k\}^2]^{1/2}. \tag{67}$$

The critical value is a parameter which can be freely determined in accordance with the purpose. For instance, when the critical value is settled to be 0.5, the result is examined by inequality $$\epsilon < 0.5. \tag{68}$$

If inequality (68) is satisfied, the approximation shall be ended and the current coefficients $\{C_{xq}\}$ and $\{C_{yq}\}$ shall be adopted as the final coefficients. If inequality (68) is not satisfied yet, the division number M is increased to M+1 and the same procedure shall be repeated, till (68) is satisfied.

The approximation of the subboundaries by the spline functions has been fully explained. The spline function approximation is competent enough for approximating the regions which are a posteriori yielded of continually-changing tone pictures. The same approximation can be applied to binary tone pictures which consists of only two colors, e.g., black and white, of course. In the case of binary tone pictures, inborn outlines of images become boundaries. Sometimes more rigorous regeneration of the boundaries is required. For the purpose, it may be advantageous to extract straight lines, circles and arcs from the assembly of the boundaries and to express them by another function.

I. Region Data Memory Device

These steps hitherto accumulates the attributes of the regions by dividing the input picture into a plurality of regions consisting of the pixels of similar tones, averaging the tones of the regions, extracting the boundaries between the regions, seeking branch points and turning points, expressing subboundaries between the branch point or the turning point by a linear combination of spline bases with coefficients and determining the coefficients of the linear combination of the spline expansion. Thus a plenty of the attributes of the regions are obtained. The region data memory device (I) stores many attributes as the region data;

(1) size of the input picture,
(2) number of the regions,
(3) average tones of the regions,
(4) boundary information,
(5) number of boundaries,
(6) starting points and division number M of the boundaries,
(7) coefficients of the spline approximation base functions.

Here (1) means the horizontal length and the vertical length of the input picture which requires 4 bytes, as shown in table 1. (2) denotes the number of the regions divided by the region-division device (B). The number depends on the substance of the input picture. It needs 2 bytes of the memory. (3) is the average tones of all the regions which have been calculated by the region-division device (B) and been memorized in the region memory device (C). K1 denotes the number of the regions now. Every region has an average tone. (3) requires K1 bytes for the memory.

Appearing here for the first time, the boundary information (4) determines the relation between the regions and the subboundaries. The regions have been numbered and the subboundaries have been numbered. A region is enclosed by a plurality of subboundaries. A subboundary is in contact with two regions on both sides. Some information must be given for clarifying the relation between the regions and the subboundaries. The boundary information contains two kinds of parameters. One is the numbers of the subboundaries enclosing a current region. The other is the directions of the boundaries with regard to the region.

The direction of a subboundary is not a concept which can easily be understood. Here the direction of a subboundary determines which side of the subboundary the region exists. Every region has a number but has no coordinates for specifying its position. The boundaries have their own coordinates for specifying the positions. Thus the regions cannot be specified by themselves. The position of the regions must be determined through the relation to the subboundaries enclosing the current region. It is important to determine which side of the subboundary the region exists. A region can uniquely defined by the subboundaries enclosing the region and the directions of the region with regard to the boundaries. The boundary information requires 4K1 bytes.

(5) means the number of the subboundaries which have no characteristic points except both ends. A boundary is a closed loop enclosing a region completely. A boundary is divided into several boundary intervals by the branch points. A boundary interval is divided into several subboundaries by the turning points. (5) needs 4 bytes for being memorized.

(6) shows the starting points and the division number M for approximation of all the subboundaries. K2 denotes the number of subboundaries. The starting points are necessary for determining the t=0 point in the spline function approximation. (6) needs 8K2 bytes. (7) means the concrete values of the coefficients $\{cxq\}$ and $\{cyq\}$ on the spline bases for approximating the subboundaries. (7) requires $\Sigma(M_{xk2}+M_{yk2})$ bytes, where $k_2$ is the number of the subboundary ($k_2$=0, 1, 2, 3, . . . , $K_2$-1), $M_{xk2}$ is the division number in x-direction and $M_{yk2}$ is the division number in y-direction. The numbers of the region data are listed in table 1.

Table 1 shows three categories of information. (1) is the original picture information. (2), (3) and (4) are the region information. (5), (6) and (7) are the boundary information in table 1. The original picture has been solved into the regions and the subboundaries. Every region has an average tone. Every subboundary has a concrete locus on the function approximation. What is the remainder? The rest is the information of the individual tones of the pixels in the regions. The average tones cannot fully represent the tone distribution in the original picture, since the average tone is only a single value for a region.

TABLE 1

SIZES OF REGION DATA

| NATURE OF INFORMATION | | DATA SIZE |
|---|---|---|
| Original Picture Information | Size | 4 bytes |
| Region Information | Number of regions | 2 bytes |
| | Average Tone | $K_1$ bytes |
| | Boundary Information | $4K_1$ bytes |
| Boundary Information | Number of subboundaries | 4 bytes |
| | Starting points & Division Number | 8 $K_2$ bytes $K_2$ - 1 |
| | Coefficients | $\Sigma(M_{xk2} + M_{yk2})$ $k_2$ = 0 bytes |

J. Differential Image Production Device

The processes hereto extracts the parts of the pixels having similar tones as regions, endows to the regions with the average tones, extracts the boundaries around the regions, cuts the boundaries at branch points into boundary intervals, divides the boundary intervals at turning points into subboundaries, and approximates the subboundaries by functions. FIG. 2(b) shows an average tone image which gives all the regions their average tones. The region-memory device (C) has memorized the FIG. 2(b) image, as it is. A region is painted with an average tone h. The average-tone image is akin to the original picture of FIG. 2(a), since continually-changing tones of the original are converted into stepwisely-changing tones of the average-tone image. The average tones, in general, represent the tones of the regions pretty well. The degree of the resemblance depends on the tone width W, as explained before.

The average-tone image is different, in detail tones, from the original picture. The average-tone image neglects the local variations of tone within the individual regions, because each region is uniformly painted by an average tone. The small fluctuations of tones must be taken into consideration for regenerating the picture with high fidelity.

The tone of an arbitrary pixel in a region is not necessarily equal to the average tone of the region, but is different from the average tone in many cases. Furthermore, the tones are varying pixel to pixel. A new contrivance is ardently requested now for taking account of the fluctuation of individual tones from the average tone. What suffices the request is the differential image generation device (J) which is explained now. The differential tone (diff) is defined as a deviation (g–h) of the tone (g) of a current pixel from the average tone (h) of the same region. Namely, diff=g–h. Or (pixel tone g)=(diff. tone)+(average tone h).

The next problem is how to handle the differential tones. It is not a good tactics to memorize all the differential tones of all pixels, as it is, because it would waste too many memories. An alternative may be a method of approximating the differential tones within every individual region, because the differential tones are defined within every region, and the regions have been defined by the boundaries. The approximation within regions would, however, be complicated due to the complexity of the boundary conditions, since the boundaries are not regular squares but random closed loops for the regions. It would be difficult to give the boundary conditions to each region. The within-region approximation would be also plagued by a number of data due to the insufficient complicated approximation. Such a large number of data requires a new breakthrough for processing the differential tones.

Instead of the localized processing, this inventor has hit upon an idea of wide range processing for the fluctuating tones of individual pixels in the regions. This inventor has made a new concept of differential (tone) image for the wide range processing. Instead of the individual, narrow regions, a "differential (tone) image" is imagined as an assembly of all the regions with differential tones. The differential tone image is shortened to a "differential image" for simplicity. The concept of the "differential image" is one of the most important matters in the present invention.

The size of the differential image is equal to the size of the input image, since all the regions once divided are unified again into the differential image. Both the boundaries and the regions are seemingly extinct in the differential image. The differential image, however, is different from the original image in the tones. The differential image is constructed with the differential tones diff=g–h, but the original image is built with the full tones g.

The "differential image" is defined as an image made by subtracting the average tones from the original, input image. As explained before, a pixel ($x_i,y_i$) has an original tone $g(x_i, y_i)$, and a region has an average tone h. Although the average tone $h^{(r)}$ has been originally defined in a region, the average tone $h^{(r)}$ is also assigned to individual pixels ($x_i, y_i$) belonging to the region (r), as denoted by Eq. (10). The average tone is defined as $h(x_i, y_i)=h^{(r)}$ for each of the individual pixels. The differential image is built up with all the pixels $(x_i, y_i)$ having differential tones $$\text{diff}(x_i, y_i) = g(x_i, y_i) - h(x_i, y_i). \tag{69}$$

It should be noted that the definition scope of $(x_i, y_i)$ is not restricted to a region, but is a full range of the input picture. Since all the regions are joined together, the boundaries are distinguished in the differential image. Another conspicuous property is a small fluctuation of tones, because the absolute value of the diff$(x_i, y_i)$ is always smaller than W from Eq. (6). Thus the differential image is more monotonous, smoother than the original image.

FIG. 2(f) shows a differential image. The tones of FIG. 2(f) are almost grey, and are far less various than the input image of FIG. 2(a). Why does the differential image take grey tones? The tones have been quantized in L levels by Eq. (2). Thus, the base tone of the differential image is L/2. Eq. (6) ensures that the fluctuation is less than W in the differential image. Then the tones of all the pixels are restricted in a very narrow scope between (L/2−W) and (L/2+W) which are grey in tone. The reason why the fluctuation is very small is that most of the fluctuation has been already removed by the average tones. The average-tone image of FIG. 2(b) absorbs most of the fluctuation.

Figure 12A:
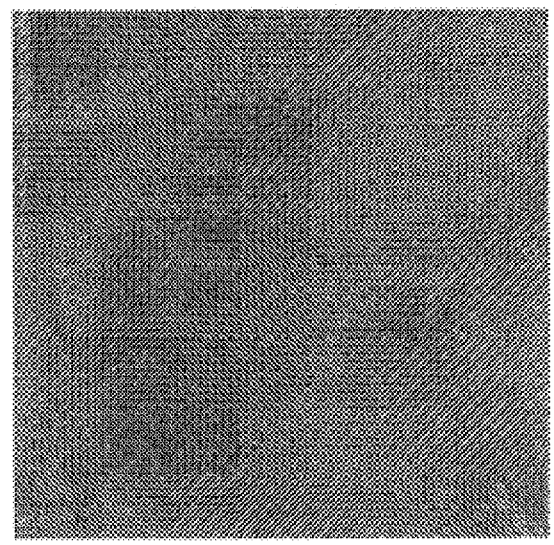
FIG. 12(a) is a differential image which is defined as a difference between an original picture and an average-tone image in the case of the tone width parameter W=8.
Figure 12B:
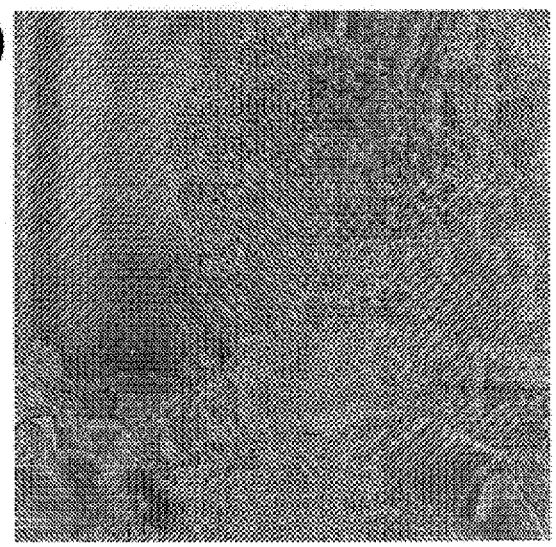
FIG. 12(b) is another differential image which is defined as a difference between the original picture and the average-tone image in the case of the tone width parameter W=16.
Figure 12C:
FIG. 12(c) is the other differential image which is defined as a difference between an original picture and an average-tone image in the case of the tone width parameter W=32.

The variation of tones in the differential image depends on W. FIG. 12(a), FIG. 12(b) and FIG. 12(c) show the differential images of W=8, W=16 and W=32, corresponding to the average-tone images of FIG. 4(a), FIG. 4(b) and FIG. 4(c) respectively. FIG. 12(a) is almost an even, smooth differential image of W=8. Man can hardly find a trace of the girl. Since W is small, the regions become very narrow, and the number of regions is large, which paints uniformly the full image with monotonous grey. For example, assuming the full degree L of tones to be 256 (L=256), the middle tone is 128. In the case of W=8, the tones g(x,y) is narrowly restricted between 120 and 136 (120≧g(x,y)≧136) in the full area of the differential image. The overall grey tone is only a reasonable result of the small W(=8). Almost all of the variations of tones of the original picture have been allocated to the average-tone image of FIG. 4(a) of W=8. The average-tone image and the differential image are complementary. In the case of W=8, the average-tone image of FIG. 4(a) is closely akin to the original picture of FIG. 2(a).

FIG. 12(b) exhibits the differential image of W=16. A dim image appears faintly, but man can scarcely identify the image. Since W slightly increases, the dim image emerges from the uniform grey of W=8. The rest of the tone variations is attributed to the average-tone image of FIG. 4(b).

FIG. 12(c) shows the differential image of W=32. The image is clearer than the image of the case of W=16. Man can seek a faint shape of the girl. More traits of the original picture are transferred in the differential image in W=32 than in W=16. By contrast, the average-tone image of FIG. 4(c) gives a far distant impression from the original girl, loosing fine variations of tones.

Comparison of W=8, W=16 and W=32 teaches us a complementary relation between the average-tone image and the differential image. Since g(x,y)=h (x,y)+diff (x,y), the tones of the original picture are divided into the average-tone image and the differential image. A narrow width W, e.g., W=8, allocates much more tone variations to the average-tone image than to the differential image. A wide width, e.g., W=32, allots still more tone variations to the differential image than to the average-tone image. What determines the ratio of division to the average-tone image and the differential image is the region tone width W.

Which is better, a big W or a small W? This is the next question. W, the tone width, is half of the maximum of the tone differences within a region. A large W widens the areas of regions. The average-tone image deviates far from the original picture. The differential image has some features of the original picture. A large W decreases the number of regions and the number of boundaries, which alleviates the time of processing of the boundary approximation and the memory of storing the region data and the boundary data. A large W, however, has a drawback of a large fluctuation of tones in the differential image. The differential image having such a large tone fluctuation requires a plenty of parameters for approximation. Besides the problem of the number of parameters, a large W degrades the accuracy of the approximation. Thus a large W increases the load of approximation of the differential image.

When W is small, the areas of regions become narrow. The narrow regions increase the numbers of regions, characteristic points (turning points and branch points) and the subboundaries. A small W enhances the number of region data and allocates still more the features to the average-tone image than to the differential image. The differential image has almost uniform grey tones due to the poor oscillation of tones. The poor oscillation enables low order functions to approximate the differential image with a small number of coefficients with high fidelity. A small W has the advantage of a small number of data and high fidelity regeneration, but suffers from the number of region data and the time of determining the subboundaries. The value of W should be determined for reconciling the region data and the differential image data. In general, a small W can enhance the accuracy of the approximation at the expense of the processing time.

K. Differential Image Memory Device

The differential image memory device (K) stores the differential tones diff$(x_i, y_i)$ of all the pixels $(x_i, y_i)$ in the differential image. (i, j) is the pixel number defined in the original picture (i=0, 1, . . . , I−1; j=0, 1, . . . , J−1). Of course, the differential tones could be memorized region by region, because the pixels have been divided into the regions. However, the differential image memory memorizes the differential tones by the pixel number (i, J), ignoring the membership of pixels to the regions. The differential image diff$(x_i, y_i)$ has the same size (i=0, 1, . . . , I−1; j=0, 1, . . . , J−1) as the original image. Since the differential image is free from the restriction caused by the regions, the approximation of the differential image is fully immune from the difficulty of the complicated boundary conditions and the enormous regional data. The differential image is memorized as the two-dimensional function diff $(x_i, y_i)$ of all the coordinates $(x_i,y_i)$ defined on the full scope of the image. Since diff$(x_i, y_i)$ has a small fluctuation of tones, low order polynomials can approximate diff$(x_i, y_i)$ with little error.

L. Differential Image Division Device

A further contrivance is proposed here for reducing the time and the data for approximating the differential image. The differential image is not partial images, but a single image unifying all the regions. The following steps are irrelevant to the individual regions.

The differential image has the same size as the original picture, being immune from the division due to the regions. The number of vertically-aligning pixels of the original image is denoted by "I", and the number of horizontally-aligning pixels of the same original image is denoted by "J". The differential image has I vertically-aligning pixels and J horizontally-aligning pixels. Since all the regions have been assembled into a differential image, the differential image has a rectangular shape which is suitable for function approximation.

There may arise a primitive question. The size of the differential picture is equal to the size of the original picture. Isn't there a significant difference between the approximation of the original image and the approximation of the differential image? The approximation of the differential image is clearly different from the approximation of the original picture. Since the original picture includes rough variations, the division number M and the coefficient number would be very large, if the original picture were to be approximated by the same form of functions. Despite a great number of the coefficients, the approximation would be rough and incorrect. The differential image is far superior to the original image for the function approximation.

The differential image is a special image suitable for the function approximation. The tones are nearly uniform within the full scope of the image, as shown in FIG. 12(a) of W=8. The uniformity is an important property of the differential image. The parts at which the tones change drastically have been eliminated as boundaries from the original image in advance. The boundaries absorb the irregular portions. The regions have little fluctuation of tones around the average tones, since diff=g−h. The average of the differential image is 0, and the fluctuation is small. As explained before, in the case of the full tone L=256, a W=8 differential image consists of the tones between 120 and 136. Such a poor fluctuation enables a low order function to approximate with high fidelity. A further contrivance is required for facilitating the function approximation of the differential image.

It is possible to approximate the overall differential image (I×J) at a stroke, of course. The approximation calculation shall be repeated till the errors diminish below the tolerance (the critical value). Since the differential image is too wide, it would take a long time to approximate all the differential image. It is effective for curtailing the time to divide the differential image into a plurality of small blocks and approximate individual blocks by a two dimensional function.

The embodiment thus divides a differential image lengthwise and crosswise into Q small rectangular or square blocks. A square block is preferable to a rectangular block, since the processing is symmetric both in x-direction and in y-direction. In the case of the square blocks, a differential image can be covered with the blocks without redundantly overlapping parts by determining a unit length of the block to be a common divisor s of I and J. Namely, I=ms and J=ns, where m and n are integers. Practically, the side b of a square block is determined to be b=s+1 for overlapping the neighboring blocks by a pixel width. The one pixel width overlapping facilitates assembling of the blocks. If the neighboring pixels did not overlap with each other at the peripheries of the blocks, the joint lines between the neighboring blocks would be lost, when the blocks are enlarged or cut down. A pixel width of the peripheries of blocks is overlapped for avoiding the occurrence of such rents.

Figure 13:
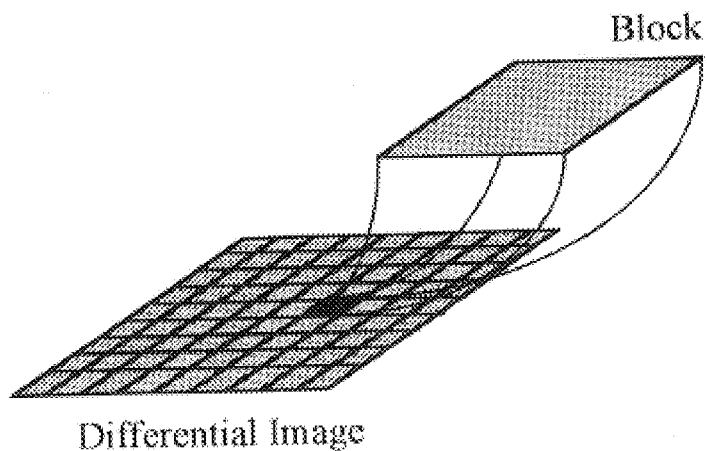
FIG. 13 is a figure of a differential image which is divided lengthwise and crosswise into small blocks for facilitating the arithmetic processing of approximating the tones of the subtracted image.

The differential image division device (L) divides the differential image into small blocks for the above reason. FIG. 13 schematically shows the division of the differential image. The differential tones are independently approximated in each of the individual blocks.

Otherwise, if the original image were divided into blocks instead of the differential image, the joint lines would be discontinuous and disturbed when the blocks were assembled together. Such a discontinuity at the joint lines is called a "block distortion" here. The direct division processing would be annoyed by this block distortion. This embodiment, however, is entirely immune from the block distortion, because the boundaries of regions have absorbed the random changing tone parts, and the differential image is covered with monotonous grey.

This invention, however, can be carried out without dividing the differential image. The division into a plurality of blocks is a contrivance for shortening the time of calculation. When the curtailment of time is less important, the differential image can be directly approximated by two-dimensional functions without dividing into blocks.

M. Differential Block Memory Device

The differential tones $\{\text{diff}(x_{iq}, y_{jq})\}^Q$ are stored by blocks in the differential block memory device (M). Q is the total number of the blocks. $(x_{iq}, y_{jq})$ means the coordinate of the i-th pixel in the q-th block, where q is the number of the blocks (q=0, 1, 2, . . . , Q−1). The diff($x_{iq}$, $y_{jq}$) is the differential tone of the i-th point in the q-th block.

N. Date Approximation Device

The data approximation device (N) approximates the differential blocks with two-dimensional spline functions. The size of the approximation is definite, for example, b×b in the previous case. This is the second approximation in this invention. The first one is the one-dimensional approximation of the subboundaries which do not have a definite size. The second approximation of the differential blocks is the most important approximation. The objects of the approximation have two-dimensional broadness. Thus the differential image shall be approximated by two-variable functions.

This embodiment adopts two-dimensional spline functions for approximating the tones of blocks. However, instead of the two-dimensional splines, three dimensional splines can also be applied to approximate the same differential blocks. The differential block is expanded on the two-variable base functions $\Psi_{mn}(x,y)$. The tone distribution in a block is expressed by a linear combination of the spline bases, that is, a sum of the spline bases multiplied by coefficients. The definition ranges of x and y are [0, 1], i.e., T=1. M is the division number in x-direction. N is the division number in y-direction. The spline base is given by $$\Psi_{mn}(x, y) = (3MN)^2 \sum_{k=0}^{3} \sum_{l=0}^{3} \frac{(-1)^{k+l}\{x-(k+m)(T/M)\}_{+}^{2}\{y-(l+n)(T/N)\}_{+}^{2}}{(3-k)!\,k!(3-l)!\,l!} \quad (70)$$

$$0 \leq x \leq 1, \quad 0 \leq y \leq 1. \quad (71)$$

In Eq. (70), $\{\alpha\}+$ signifies $\alpha$ when $\alpha \geq 0$, but 0 when $\alpha<0$. N, the division number in y-direction, is different from the base $N_q(t)$. $\Psi_{mn}(x,y)$ is a product of one-variable splines $N_m(x)$ and $N_n(y)$. Inequalities (71) declare that the definition range of x and y is [0,1]. The size of a block is b×b in the actual image plane. Then the coordinates are here normalized by replacing x by x/b and y by y/b. Thus the definition range is normalized into [0, 1]×[0, 1]. Since T=1, the unit width of a piece is 1/M in x-direction and 1/N in y-direction. Although the block is a square, M and N are not necessarily equal, because the degrees of tone variations are, in general, different in the x-direction and in the y-direction. The ranges of x and y which give non-zero $\Psi_{mn}(x,y)$ are $$m/M < X < (m+3)/M, \; n/N < y < (n+3)/N. \tag{72}$$

This is a square range for (x,y). Out of the square, $\Psi_{mn}(x,y)=0$. The maximum value is 9/16 realized at $x=(m+1.5)/M$ and $y=(n+1.5)/N$. The double integration of Eq. (71) by x and y is 1, since it has been normalized. This data approximation device (N) approximates diff($x_i, y_i$) of every block by a function S(x,y) which is a linear combination of $\{\Psi_{mn}(x,y)\}$ with coefficients $\{c_{mn}\}$. The block differential tone approximation function S(x,y) is given by, $$S(x, y) = \sum_{n=-2}^{N-1} \sum_{m=-2}^{M-1} c_{mn} \Psi_{mn}(x, y) \tag{73}$$

The block function is established by determining $\{c_{mn}\}$ since $\{\Psi_{mn}\}$ are known functions. The coefficients $\{c_{mn}\}$ are calculated by a similar manner to the ways for determining the subboundaries. The least square method and the biorthonormal function method are available for identifying the block differential tones. Both methods have been described before as the ways for approximating the subboundaries. The biorthonormal function method which has been contrived by the inventor is superior to the least square method. Thus the coefficients $\{c_{mn}\}$ are here reckoned only by the biorthonormal function method. Of course, the least square method can easily be applied to the differential tone approximation by referring to the previous steps.

The single-variable spline base $N_p(x)$ lacks orthonormality $((N_q \cdot N_p) \neq 0)$, as explained before. The two-variable spline base $\Psi_{mn}(x,y)$ which is a product of $N_m(x)$ and $N_n(y)$ lacks orthonormality as a matter of course. The coefficients $\{c_{mn}\}$ can also be reckoned facilely by defining two-variable biorthonormal functions $\Phi_{pq}(x,y)$. The spline bases $\Psi_{mn}(x,y)$ and biorthonormal bases $\Phi_{pq}(x,y)$ satisfy the double orthonormality condition;

$$\int_0^1 \int_0^1 \Psi_{mn}(x, y) \Phi_{pq}(x, y) dx dy = \delta_{mp} \delta_{nq}. \tag{74}$$

By the biorthonormal bases, if they exist, the coefficients $\{c_{mn}\}$ in Eq. (73) are briefly represented by $$c_{mn} = \int_0^1 \int_0^1 S(x, y) \Phi_{mn}(x, y) dx dy. \tag{75}$$

The biorthonormal base $\Phi_{mn}(x,y)$ has two variables and two suffixes. Since $\Psi_{mn}(x,y)$ is a plain product of $N_m(x)$ and $N_n(y)$, $\Phi_{mn}(x,y)$ can be determined by a similar manner to the way of seeking $L_p(x)$. Eq. (70) is reduced to $$\Psi_{mn}(x,y) = N_m(x) N_n(y). \tag{76}$$

$L_p(x)$ is the biorthonormal function of $N_m(x)$.

$$\int_0^1 N_m(x) L_p(x) dx = \delta_{mp} \tag{77}$$

$$\int_0^1 N_n(y) L_q(y) dy = \delta_{nq}. \tag{78}$$

The two-variable orthonormal base $\Phi_{pq}(x,y)$ which suffices Eq. (74) is uniquely determined to be $$\Phi_{pq}(x,y) = L_p(x) L_q(y). \tag{79}$$

$\{L_p(x)\}$ is a known function defined in [0,1]. It is convenient to prepare a table of the values $L_p(x)$ for all x of $0 \leq x \leq 1$. From Eq. (75) and Eq. (79), $c_{mn}$ is given by $$c_{mn} = \int_0^1 \int_0^1 S(x, y) L_m(x) L_n(y) dx dy. \tag{80}$$

In practice, S(x,y) is unknown function introduced for approximating diff($x_i, y_i$). S(x,y) is thus replaced by diff($x_i, y_i$) in Eq. (80). On the biorthonormal bases $L_m$ and $L_n$, $\{c_{mn}\}$ has a concrete expression $$c_{mn} = \sum_i \sum_j \text{diff}(x_i, y_j) L_m(x_i) L_n(y_j) / MN. \tag{81}$$

The summation regarding i and j shall be carried out with regard to all the pixels ($x_i, y_j$) contained in the current block of s×s pixels. Since $L_m(x)$ and $L_n(y)$ are known functions, Eq. (81) can be calculated. Alternately, Eq. (81) can be further reduced by the spline bases $N_p(x)$ and $N_q(y)$ to $$c_{mn} = \sum_{p=-2}^{M-1} \sum_{q=-2}^{N-1} d_{mp} d_{nq} \sum_i \sum_j \text{diff}(x_i, y_j) N_p(x_i) N_q(y_j) / MN. \tag{82}$$

The reason is briefly clarified. The two-variable biorthonormal base $\Phi_{mn}(x,y)$ is related to two-variable spline $\Psi_{pq}(x,y)$ by a tensor $d_{mnpq}$ as $$\Phi_{mn}(x, y) = \sum_{p=-2}^{M-1} \sum_{q=-2}^{N-1} d_{mnpq} \Psi_{pq}(x, y). \tag{83}$$

As $\Psi_{pq}(x,y)$ is a direct product of $N_p$ and $N_q$, the tensor $d_{mnpq}$ is a product of $d_{mp}$ and $d_{nq}$, $$d_{mnpq} = d_{mp} d_{nq}. \tag{84}$$

On the contrary, $\Psi_{mn}(x,y)$ is coupled to $\Phi_{pq}(x,y)$ by another tensors $\{u_{mnpq}\}$ as $$\Psi_{mn}(x, y) = \sum_{p=-2}^{M-1} \sum_{q=-2}^{N-1} u_{mnpq} \Phi_{pq}(x, y). \tag{85}$$

The tensor $u_{mnpq}$ also can be written as a product of $u_{mp}$ and $u_{nq}$, $$u_{mnpq} = u_{mp} u_{nq}. \tag{86}$$

The set of coefficients $\{c_{mn}\}$ can be calculated either by Eq. (81) or Eq. (82). Eq. (82) contains a product of $N_p(x)$ and $N_q(y)$ which have definite values for very restricted points. $N_p(x_i)$ has definite values for $p/M \leq x_i \leq (p+3)/M$, but is zero otherwise. There are three bases having definite values. Thus Eq. (82) has only nine terms having non-zero values. The summation in Eq. (82) is a sum of 9 terms instead of $(M+1)(N+1)$. In general, K×H denotes the size of a block. If the block is a square, K=H=s, $c_{mn}$ is obtained by the calculation of 9(K+1)(H+1) times. The total number of the blocks is Q. The full size of the image is I×J. These parameters satisfy the relation $$KHQ = IJ. \tag{87}$$

Division numbers M and N are parameters ruling the degree of approximation. Starting from M=1 and N=1, the approximation is repeated by raising M and N one by one till the approximation satisfies a requirement. Such repetitions of approximation are similar to the previous approximation of the boundaries. There are, however, four differences between the boundary approximation and the block tone approximation. One difference is the dimensions of the functions; the boundary approximation is based on the one-dimensional function, but the block tone approximation uses the two dimensional functions. Another difference is the sizes of the objects. The boundary approximation deals with various lengths of subboundaries. The tone approximation treats with a definite range of a block. A further difference is the objects. The boundary approximation handles geometric curving lines. The tone approximation deals with the tone at every point having definite L steps. The other difference is the variables. The boundary approximation uses an intermediate, independent variable t for describing dependent variables (x,y) as functions of t. The tone approximation bluntly deems the coordinates (x,y) as independent variables for describe the tone which is a dependent variable as a function of the independent (x,y).

The exactness of the approximation is estimated by the SNR (signal noise ratio) which is defined by $$SNR = 10\log_{10} \frac{L^2(K+1)(H+1)}{\sum_{i=0}^{K}\sum_{j=0}^{H}\{S(x_i, y_j) - \text{diff}(x_i, y_j)\}^2}. \tag{88}$$

Here L is the number of full degrees of tones, e.g., L=256, K and H are the lengths in the x-direction and in the y-direction of a block. The summation by i and j means the sum of all the pixels in a block. If the block is a square, K=H=s. $\{S(x_i,y_j)-\text{diff}(x_i,y_j)\}$ is an error of the tone approximation at a pixel $(x_i,y_i)$. The average of the square of errors is obtained by squaring the errors, summing up the squared errors in the x-direction and in the y-direction and dividing by (K+1)(H+1). The average squared error is normalized by dividing by $L^2$. The inverse of the normalized average squared error is a measure of the accuracy of approximation. The larger the inverse is, the higher the accuracy of approximation rises. Then Eq. (88) includes the inverse of the normalized average squared error in logarithm. The SNR has a unit of dB.

SNR=0 dB means that there is no signal at all, because the error is equal to the full tone range L. SNR=20 dB means that the average error per a pixel is about 1/10 of the full range L. SNR=40 dB signifies that the average error per a pixel is about 1/100 of the full range L. A critical value $\epsilon'$ is predetermined for estimating the exactness of the approximation. Namely, the approximation of block tones is repeated by increasing M and N to M+1 and N+1 respectively until $$SNR > \epsilon'. \tag{89}$$

When the approximation attains the accuracy satisfying inequality (89), the calculation is ended, and the current M, N and $\{c_{mn}\}$ are confirmed as final M, N and $\{c_{mn}\}$ respectively. $\epsilon'$ is an important parameter for ruling the correctness of the approximation. A higher $\epsilon'$ ensures higher preciseness, but requires a longer time. The determination of $\epsilon'$ is a critical problem. $\epsilon'$ should be determined in accordance with the purposes or the object pictures. For example, a value of 30 dB to 40 dB should be assigned to $\epsilon'$. When inequality (89) holds, the approximation function $\{c_{mn}(q)\}$ for the q-th block is settled, because M, $c_{mn}$ and $\Psi_{mn}$ have been decided.

A similar approximation shall be carried out for all blocks (q=0, 1, 2, 3, . . . , Q-1). Finally a set $\{c_{mn}(q)\}^{Q-1}_{q=0}$ of coefficients of the differential tones are obtained for all blocks. The data of M, N and $\{c_{mn}(q)\}^{Q-1}_{q=0}$ are here simply called "compressed data" which should be clearly distinguished from the "region data" stored the region memory device (I). The region data are also compressed data of the regions, the branch points, the turning points and the subboundaries, but are bluntly called "region data". The data of the block tone approximation may be called "block tone compressed data", but are now flatly called "compressed data".

The approximation is carried out block by block. As mentioned previously, the purpose of dividing the differential image into blocks and approximating the block tones is to curtail the time of calculation. The divisional processing is, of course, optional in this invention. If the restriction on the calculation time can be ignored, it is possible to approximate a full differential image without dividing into blocks as a matter of course. In the case, the devices and the steps of (L) and (M) should be eliminated, and the step and the device of the differential image memory (K) should be directly followed by the data approximation (N). The approximation would be carried out in the wide range of I pixels in the x-direction and J pixels in the y-direction.

The previously explained way prepares the transformation coefficients $\{d_{mnpq}\}$ which relate the biorthonormal bases to the spline bases and expands the block tones on the spline bases through the biorthonormal bases. The matrix D consisting of $\{d_{mn}\}$ is the inverse matrix $G^{-1}$ of the matrix G constructed by the inner product $(N_p \cdot N_q)$ of two spline bases $N_p$ and $N_q$, as shown in Eq. (51) and Eq. (52). Eq. (64) and Eq. (65) are suitable equations for calculating $\{c_{xq}\}$ and $\{c_{yq}\}$ without knowing the concrete form of the biorthonormal bases.

Alternately, the biorthonormal bases can be directly calculated. This inventor has given a concrete form of the biorthonormal base for the first time on his dissertation; (11) T. Horiuchi, "A study on adaptable system model and its application to desktop publishing system", Dissertation, University of Tsukuba, 1995.

Figure 21:
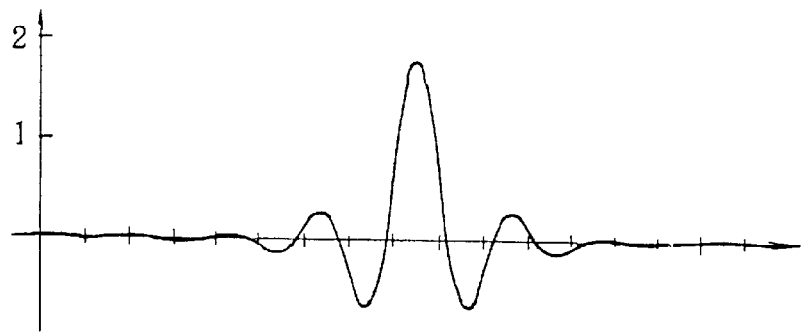
FIG. 21 is a graph of the biorthonormal function of the second order spline base function.

The biorthonormal base $L_m(t)$ is $$L_m(t) = \sum_{k=0}^{T} h^2 \int_{-1/2h}^{1/2h} \frac{\exp\{2\pi j f(k-m)h\}}{\sum_{p=0}^{T}\left\{\frac{\sin\pi(fh-p)}{\pi(fh-p)}\right\}^6} df\, N_k(t), \tag{90}$$

where h is the length of a piece, i.e., h=T/M. Eq. (90) cannot be analytically integrated, but can be calculated numerically by a computer. FIG. 21 exhibits the second order biorthonormal base. The integration is 1 ($\int L_m(t)dt=1$). The integration of a product with a different number of spline base $N_k(t)$ is 0 ($\int L_m(t)N_k(t)dt=0$, m≠k). What reduces the integration to 0 is the negative oscillation portions beside the peak. The existence of negative parts is essential to cancel the integration of the product $L_m(t)N_{m+1}(t)$ of neighboring bases $L_m(t)$ and $N_{m+1}(t)$ ($\int L_m(t)N_{m+1}(t)dt=0$). The oscillation attenuates rapidly. The integration of the product with the same number spline base $N_m(t)$ is 1 ($\int L_m(t)N_k(t)dt=0$, m≠k). The person who gave a concrete form of the biorthonormal base for the first time is the inventor. It is useful to calculate the biorthonormal bases and to list the individual values $\{L_m(t)\}$ in a table.

0. Compressed Data Memory Device

The data approximation device (N) supplies the compressed data of representing the tone distribution in the blocks into the compressed data memory device (O). The compressed data include the x-division number M, the y-division number N and coefficients $\{c_{mn}\}$ of every block. Containing the two-dimensional tone data, the compressed data are entirely different from the region data including the information of the characteristic points and the boundaries. Table 2 denotes the sizes of the data which are stored in the compressed data memory device (O).

TABLE 2

SIZES OF THE DATA OF THE BLOCK APPROXIMATION

| SUBSTANCE | | DATA SIZE |
|---|---|---|
| DIFFERENTIAL IMAGE | DIVISION NUMBERS | 2 byte |
| | COEFFICIENTS | 2MN byte |

P. Encoding Device

The steps hitherto have produced the region data stored in (I) and the compressed data stored in (O). It is, of course, possible to memorize these data, as they are. Otherwise, it is also possible to compress these data further and store the doubly compressed data in other memories. Encoding is a means for a further compression of the data. It is not novel, but is well-known to reduce the amount of information by encoding the data in the information processing technology. There are several different methods for encoding data. For example, this embodiment employs Haffmann's encoding method. Those other than the Haffmann encoding method are also available. Since Haffmann's encoding method is known well to the skilled in the information processing technology, the details of encoding the once compressed data are not described here. The encoding is carried out for both the region data of (I) and the compressed data of (O). The encoding step reduces the amount of data, but increases the processing time to the contrary. The adoption of the encoding step is optional, which should be determined in accordance with the purpose of the image processing. When time should be curtailed, the encoding should be omitted. When memories should be saved, the steps should include the encoding of the once compressed data.

Q. Encoded Data Outputting Device

The encoding device (P) encodes the region data and the compressed data, and the encoding data outputting device (Q) outputs the encoded data in a series of bit signals. The encoding is effective not only in compressing the data but also in keeping the secret. Since the data have been encoded by some method, the data must be decoded by the same method for being revived. A third party without the means of decoding cannot recover the data. The encoding plays a role of protecting the secrets.

R. Encoded Data Memory Device

The encoded data memory device (R) memorizes the encoded information of both region data and compressed data. The data stored in this device (R) can be read out at any time according to a request of outputting. These devices (A) to (R) are a series of inputting a picture, compressing the image data, storing the region data and the compressed data. These are an earlier half of the image processing. The latter half of the image processing is another series of reading out the data, decoding the data, reviving the image data and outputting the revived picture on some outputting device.

Instead of memorizing the image data as they are, this invention memorizes fully compressed data by extracting assemblies of pixels having similar tones as regions, painting every region with an average tone for producing an average-tone image, extracting boundaries, dividing the boundaries at branch points and turning points into subboundaries, approximating the subboundaries by the intermediate variable spline approximation, subtracting the average tone image from the input image for making a differential image, and approximating the differential image by two-dimensional spline functions. The stored data comprise the region data and the compressed data.

As before explained, the steps of dividing the differential image into blocks and approximating the differential tone block by block are not intrinsically necessary steps for this invention. Instead of dividing the differential image into blocks, it is also possible to approximate the full differential image at a stroke. This alternative dispenses with the differential image division device (L) and the differential block image memory device (M).

The steps of encoding and decoding are also optional. It is possible to omit the processing of encoding and decoding. In this case, the encoding device (P), the encoding data outputting device (Q), the encoded data memory device (R) and the encoded data inputting device (S) will be eliminated from the processing. The region data and the compressed data will be memorized as they are.

The description hitherto clarifies the steps of inputting, compressing and memorizing the image data. The compressed data can be stored in a floppy disc, a hard disc or an optomagnetic disc in addition to the RAM in the computer. The storage of the data may be ephemeral, temporary or eternal in dependence upon the object pictures, the purposes or the intentions of the operator.

The following description relates to the steps of reviving the original image from the memorized data. The reviving steps, the latter half of the processing, are only the reverse of the earlier half of inputting, compressing and memorizing the data. The reviving steps contain no novel matter, and comprise decoding, retrieval of a differential image, revival of the regions, reconstruction of the continually-changing tone picture and outputting of the continually-changing tone picture by some means. Since the data have been memorized as the coefficient of the spline function expansion series, it is feasible to regenerate the object picture in an enlarged scale or in a reduced size. Simple calculation realizes the rotation or the anisotropic enlargement of pictures. Since all the revival steps have any novel matters no more, the steps are briefly described for avoiding redundancy.

S. Encoded Data inputting Device

The encoded data inputting device (S) reads in the accumulated, encoded data containing both region data and compressed data. If the encoding steps (P), (Q) and (R) had been omitted in the earlier half processing, the encoding would be unnecessary, and the accumulated data would be supplied into a differential block regenerating device (U).

The reading-in to the encoded data inputting device (S) is carried out at any time convenient to the operator. When the final image data have been memorized in a floppy disc, an optomagnetic disc or a hard disc, the data should be read in directly from the memory device. In addition, it is feasible to input the data stored in a memory device at a remote place by transmitting the data through telephone cables or optical fiber cables.

T. Decoding Device

The decoding device (T) decodes the encoded data from the encoded data inputting device. The decoding method must correspond to the coding method. If data have been decoded by Haffmann's encoding method, the data should be decoded by Haffmann's method. Without the pertinent decoding software, the data cannot be decoded. Thus the information is kept in secret to the third party.

U. Differential Block Revival Device

The differential block revival device (U) retrieves differential tone blocks from the decoded compressed data which contain the x-division number M, the y-division number N and the expansion coefficients $\{c_{pq}\}$. The differential tones are revived block by block. The differential tone $S(x_i, y_j)$ at a sampling point $(x_i, y_j)$ in a block is represented by $$S(x_i, y_j) = \sum_{q=-2}^{N-1} \sum_{p=-2}^{M-1} c_{pq} \Psi_{pq}(x_i, y_j). \tag{91}$$

The coefficients $\{c_{pq}\}$ are given from the decoded compressed data. The two-variable spline base is a product of the single-variable spline functions $N_p$ and $N_q$ which have been calculated and been listed in the memory for possible M and N. Equivalently, Eq. (91) can be rewritten as $$S(x_i, y_j) = \sum_{q=-2}^{N-1} \sum_{p=-2}^{M-1} c_{pq} N_p(x_i) N_q(y_j). \tag{92}$$

As mentioned before, $N_p(x_i)$ depends on the dimension m and the division number M. This embodiment fixes m to m=2. But m=3, m=4 or so is also available. On the contrary, M is a free, adjustable parameter which rules the degree of the preciseness of the approximation. Since m is fixed already, $N_p(x)$ is uniquely defined by determining M. Furthermore, M appears in $N_p(x)$ only as the width (T/M) of a piece. $N_p(x)$ depends upon M weaker than upon m. The form of $N_p(x)$ is changed by m but is not influenced by M. M is the number of pieces whose width is T/M, where T is the definition range on $N_p(x)$. $N_p(x)$ has definite values only in three pieces from the p-th piece to the (p+2) th piece, $$Np(x) = 0.5\{(x/\Delta) - p\}^2 / \Delta \tag{93}$$
for $p\Delta \leq x \leq (p+1)\Delta$ $$Np(x) = \{(x/\Delta) - p - 1\}\{p + 2 - (x/\Delta)\}/\Delta + 0.5/\Delta \tag{94}$$
for $(p+1)\Delta \leq x \leq (p+2)\Delta$ $$Np(x) = 0.5\{p + 3 - (x/\Delta)\}^2 / \Delta \tag{95}$$
for $(p+2)\Delta \leq x \leq (p+3)\Delta.$ $N_p(x)$ is equal to zero for the other pieces except the above three. Being a product of $N_p(x)$ and $N_q(y)$, $\Psi_{pq}(x,y)$ is a localized function having definite values only in nine piece squares from x=p$\Delta$ to x=(p+3)$\Delta$ and from y=q$\Delta$ to y=(q+3)$\Delta$. The differential tones $S(x_i, y_j)$ of all Q blocks are obtained by carrying out Eq. (91) or Eq. (92) for all the blocks.

V. Differential Image Retrieve Device

The differential Image retrieve device (V) makes an entire differential image by joining all Q differential tone blocks lengthwise and crosswise with side lines of a single pixel width overlapping at the peripheries. Thus a unified (I×J) differential image is retrieved now.

W. Continual Tone Image Regeneration Device

The continually-changing tone image regeneration device (W) retrieves a continually-changing tone image by reviving subboundaries, adding the subboundaries on the differential image, restoring regions by unifying the subboundaries into boundaries, adding the average-tone h(q) to the differential tone $S(x_i, y_j)$ of every point $(x_i, y_j)$ enclosed in every region (q), and assigning continually-changing tone $g(x_i, y_j)$ ($g(x_i, y_j)$=h(q)+$S(x_i, y_j)$) to the point $(x_i, y_j)$.

The boundaries are retrieved by the following steps. All the turning points and the branch points have been given on the coordinates defined on the original image. These characteristic points are written on the differential tone image. The starting points of subboundaries are given by the characteristic points. The coefficients $\{c_{xp}, c_{yq}\}$ are read out from the memory. The subboundaries are given by the functions $s_x(t)$ and $s_y(t)$ which are represented by linear combinations of spline bases, $$s_x(t) = \sum_{p=-2}^{M-1} c_{xp} N_p(t), \tag{96}$$

$$s_y(t) = \sum_{q=-2}^{N-1} c_{yq} N_q(t). \tag{97}$$

These functions use t as an independent, intermediate variable for representing the relation between x and y. The definition range of t is restricted, for example, to be [0, 1]. By Eq. (96) and Eq. (97), $s_x$ and $s_y$ can be calculated at an arbitrary t. The subboundaries $\{(x_i, y_i)\}$ are given by reckoning $s_x(t)$ and $s_y(t)$ at t=$t_i$ which have been assigned to t with a certain small spacing in the interval [0,1]. All the boundaries can be restored by reckoning the point series on all the subboundaries. The regions (q) are determined by joining the subboundaries. The relation between the boundaries and the regions is established. All the pixels $(x_i, y_j)$ are classified into some regions without exception. Every region (q) has an average tone h(q) as an attribute which has been memorized in the region data memory device (I). The total tones $g(x_i, y_j)$ are retrieved by adding the average tone h(q) of the q-th region to the differential tones $S(x_i, y_j)$ of all the pixels belonging to the q-th region.

$$g(x_i, y_j) = S(x_i, y_j) + h(q). \tag{98}$$

The differential tones are grey, taking a value of a narrow width between (L/2)−W and (L/2)+W, where L is the number of degrees of tones, L/2 is a middle tone (grey) and 2W is the tone width of the pixels contained within a region. But the restored tones $g(x_i, y_j)$ are not restricted within such a narrow range, since h(q) varies at from region to region. S(x,y), differential tones, represent a subtle variation of tones.

X. Continual Tone Image Outputting Device

All the parameters specifying the continually-changing tone image have been calculated hitherto. Finally, the produced image must be output in a concrete form by a printer, a cutting plotter, a sculpture machine and so forth on a sheet or a tape of paper, cloth, wood, metal or the like. Since the picture is regenerated by calculation, it is feasible to enlarge or reduce the size of the image. It is desirable to use a large printer or a wide cutting plotter for enlarging the object picture. Besides drawing the flat two-dimensional image on a sheet, an automatic sculpture machine shapes a three-dimensional image on a thick wooden plank or a thick metal plate.

For example, a layout editor, which can reproduce images in size from a small square of a 1 mm side to a wide, long rectangle of a 900 mm width by a 16000 mm length, can be adopted for regenerating the picture from the coefficients of the spline bases. The reproduced picture is output, e.g., by a post-script printer endowed with a resolution of more than 600 DPI.

The above is the full explanation of the processing of this invention to treat with a monochromatic continually-changing tone picture. The monochromatic continual tone picture can be input, compressed, memorized, regenerated and output by the steps and the devices explained from (A) to (X). However, if the original one is a color continually-changing tone image, the devices and steps from (A) to (X) are insufficient yet. However, there is not any significant difficulty in the processing of color pictures. A color picture can be solved into three or four components (original colors). Any one of the components is a monochromatic picture. Thus a color picture can be always reduced to three or four monochromatic pictures by the component color resolution. Once the object color picture is resolved to monochromatic continually-changing tone pictures, the aforementioned steps from (A) to (X) can be applied to inputting, compressing, memorizing, regenerating and outputting every monochromatic picture. Then the three or four monochromatic pictures shall be synthesized into a unified color picture. The color picture, therefore, requires a color resolution device (Y) and a color synthesis device (Z) in addition to the steps and the devices from (A) to (X). The color resolution device (Y) resolves an input color picture into four or three component monochromatic pictures. The color synthesis device (Z) synthesizes four or three regenerated monochromatic pictures into a unified color picture.

Y. Color Resolution Device

There are two ways for encoding a color picture. One is "composite encoding" which encodes the color signals, as they are, without being resolved. The other is "component encoding" which solves a color picture into component pictures, and encodes every component picture. This invention employs the component encoding which solves a color picture into component pictures which are suitable for being treated with by the steps and the devices from (A) to (X). For the purpose, the color resolution device (Y) solves an input picture to components. There are several ways for solving a color picture into component monochromatic pictures. The set of three components of primary colors RGB (red, green, blue) has been widely employed for mixing color component pictures into a unified color picture like color televisions or color photographs. It is available to adopt the RGB method which solves a color picture into red, green and blue monochromatic pictures in this invention. The RGB resolution, however, has a drawback of the strong correlation, which is not much suitable for encoding.

Otherwise, the other three component resolution to primary colors YUV is a better alternative. Y, U and V are 6represented by linear combinations of R, G and B, as follows. Y=0.299R+0.587G+0.114B. U=R−Y. V=B−Y. The YUV resolution which has been often utilized for color information transmission is based on three components Y, U and V which are realized by linear combination of R, G and B. The YUV which has poor correlation with each other is preferable for encoding, since the result of encoding is decisively determined. This invention can be carried out on either the RGB three component resolution or the YUV three component resolution.

Unlike the synthesis or the resolution of light, the YMC synthesis based on the other primary colors YMC (yellow, magenta, cyan) is usually employed for producing colors by mixing dyes, paints or pigments. YMC is a set of the complementary colors of RGB. Namely Y=1−B, M=1−G and C=1−R. "YMC" is sometimes written as "CMY".

However, the YMC resolution cannot always fully synthesize black in the case of the color printing. Then four component synthesis YMCK (yellow, magenta, cyan, black) is used for reinforcing black tone in the color printing. This invention can be applied to color continually-changing tone pictures by resolving color pictures by any currently known sets of primary colors,

1. RGB
2. YUV
3. YMC
4. YMCK.

Color pictures shall be solved upon the RGB method or the YUV method for exhibiting the object pictures on computer displays. Otherwise, the color picture shall be resolved to primary colors YMCK for printing the objects on paper, cloth or so. A color picture is dissolved into three or four primary color monochromatic pictures. Every monochromatic picture is input into the image memory device (A) of a plurality of continually-changing tone pictures in FIG. 1, and is processed by the same steps in parallel or in series. It is preferable to process three or four monochromatic pictures in parallel in three or four similar devices at the same time.

Figure 22:
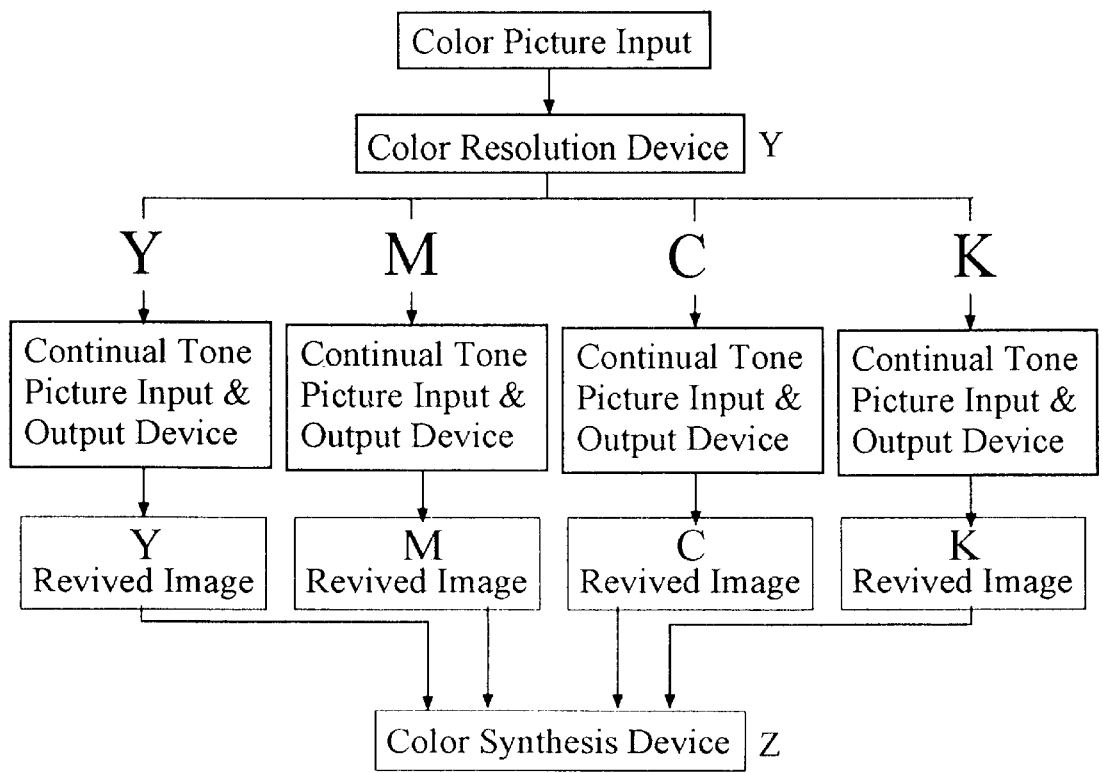
FIG. 22 is a block diagram of treating color pictures by dissolving an original color picture into elementary-color images (Y), (M), (C) and (K), processing each elementary-color image by the method of the present invention, regenerating the elementary-color images, and combining the elementary-color images into a single full-color picture.

FIG. 22 shows the steps of the color resolution—the image processing—the color synthesis. In the case of 4.YMCK, the color resolution device (Y) solves a color picture into four primary colors Y, M, C and K. The four pictures are input into four independent image processing devices which have entirely the same system as shown in FIG. 1. Every individual image processing device of an allocated eigen color compresses the image data, memorizes the compressed data and outputs a revived monochromatic picture of the eigen color.

Z. Color Synthesis Device

The revived pictures of Y, M, C and K colors are synthesized by a color synthesis device (Z), and are output as a single color picture. The synthesis must correspond to the resolution. Some outputting machine can synthesize component pictures automatically. In this case, the color synthesis device (Z) can be omitted.

PREFERRED EXAMPLES

Figure 14A:
FIG. 14(a) is an original picture of "Girl" which will be treated by the present invention as an example of a continual-tone picture.
Figure 14B:
FIG. 14(b) is an original picture of a Chinese character "愛" which will be treated by the present invention as an example of a binary picture.

In order to examine the performance of the present invention, the method of this invention is applied to "(1) SIDBA/GIRL" as an example of continual tone pictures and to "(2) 愛" in the MS Gothic font as an example of binary-tone pictures. FIG. 14(a) is the original picture of "GIRL". FIG. 14(b) is the original picture of "愛".

Example 1

Girl

The parameter W for region division and the tolerance $\epsilon'$ for estimation of errors can be adjustable in the present invention. Then the results are examined by changing W and $\epsilon'$to various values. FIG. 2(a) to FIG. 2(g) show the processing practiced by the present invention. FIG. 2(a) is the original picture which is the same as FIG. 14(a). FIG. 2(b) is the average-tone picture stored in the region memory device (C). The average-tone picture consists of the regions having average tones. The smallness of W increases the processing time through increments of the number of regions and boundaries. FIG. 2(c) is the figure of the boundaries. A big W reduces the number of boundaries and regions to the contrary. FIG. 2(d) exhibits the branch points. FIG. 2(e) shows the distribution of the turning points. W rules the regions, the boundaries, the branch points and the turning points.

FIG. 2(f) shows a differential image which is produced by subtracting an average tone image from the original picture and adding a middle value $gm=L/2$ (L: full degrees of tones). Thus all the pixels of the differential image have middle tones between $gm-W$ and $gm+W$. If W is small, the differential image bears few features of the original picture. The differential image is complementary to the average-tone image, because the sums of the tones of a differential image and an average-tone image are always equal to the tones of an original image. The more features the average-tone image bears, the less features the differential image wears. FIG. 2 shows a series of the inputting processes. The process of outputting is an inverse of the inputting process.

Figure 4:
FIG. 4(a) is an average-tone image of the starting picture "Girl" of FIG. 2(a), when the full step number of tones is 256 and the tone width parameter is W=8.
FIG. 4(b) is an average-tone image of the starting picture "Girl" of FIG. 2(a), when the full step number of tones is 256 and the tone width parameter is W=16.
FIG. 4(c) is an average-tone image of the starting picture "Girl" of FIG. 2(a), when the full step number of tones is 256 and the tone width parameter is W=32.
Figure 4:
Figure 4:

W is a parameter of determining the ratio of the features allocated into the average-tone image or into the differential image. FIG. 4 clarifies that average-tone images are varied by the change of W. FIG. 4(a) denotes an average-tone image of W=8 which has many narrow regions. The average-tone image expresses well the features of the original picture due to the smallness of W. The average-tone image of W=32 expresses the features insufficiently, because the number of regions is so small, and the regions are too wide.

FIG. 12 shows the transition of the differential image by the variation of W. The differential image of W=8 of FIG. 12(a) has nearly uniform tones near the middle degrees L/2, because almost all the features are absorbed in the average-tone image of FIG. 4(a). A dull image of a girl emerges in the differential image of W=16. The differential image of W=32 bears some features of the girl. The W=8 differential image is most suitable for approximation due to the poor fluctuation of tones. Low division number splines can approximate such a poor variation of tones with high accuracy.

W and $\epsilon'$ are important parameters ruling over the quality of regenerated pictures. However, the influence of $\epsilon$ 'is not so clear as W. $\epsilon$ ', the tolerance of the approximation of the differential image, is an important parameter ruling the result of the processing. $\epsilon'$ determines an allowable lower limit of the signal noise ratio SNR. 30 dB to 40 dB is desirable for $\epsilon'$ to enhance the quality of regenerated pictures. A higher $\epsilon'$ would raise the quality higher, but would increase the quantity of data, which requires a larger capacity of memory.

Figure 15:
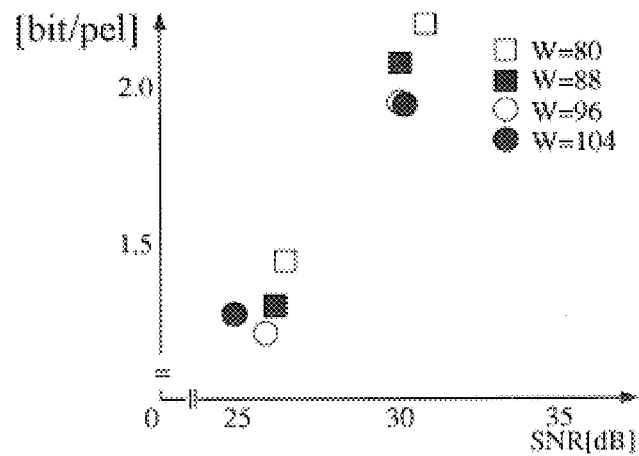
FIG. 15 is a graph showing the relation between the error parameter ε'(SNR:dB) and the bit number per pixel [bit/pel] for various tone width parameters W.
Figure 16A:
FIG. 16(a) is a picture which is data-compressed, memorized, and revived by the present invention of the original picture "Girl" of FIG. 14(a).

The bit number [bit/pel] per pixel is calculated by changing the parameters W and SNR for investigating the dependence of the information density upon W and $\epsilon'$. FIG. 15 shows the result of the calculation. Original pictures are represented by 256 tone steps (8 bits). The bit per pixel is 8 bit/pel for the original pictures. W=80 and $\epsilon'$(SNR)=30 dB give 2.2 bit/pel. W=80 and $\epsilon'$=26 dB reduce the datum amount to 1.4 bit/pel which is about one sixth of the original picture. Namely, the data are compressed into nearly ⅙. Generally, a large W reduces the number of regions, but induces the tone fluctuation in the differential image. Even for such a large W, the approximation image can be close to the original picture by taking a high $\epsilon'$. The original picture of FIG. 14(a) is revised into the revived picture of FIG. 16(a) by the processing of W=96 and $\epsilon'$=30 dB. Although W is big, the revived picture (FIG. 16(a)) bears clear features of the original picture (FIG. 14(b)) due to a high $\epsilon'$.

Figure 17A:
FIG. 17(a) is a revived picture in a smaller size of the original girl of FIG. 14(a).
Figure 17B:
FIG. 17(b) is a revived picture in the same size of the original girl of FIG. 14(a).
Figure 17C:
FIG. 17(c) is a revived picture in a larger size of the original girl of FIG. 14(a).
Figure 18A:
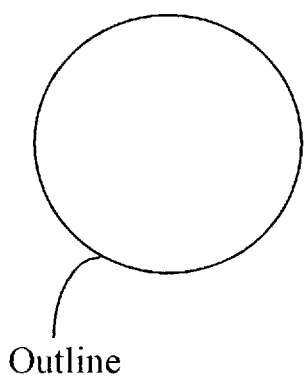
FIG. 18(a) is a simplified outline which is a closed loop without a branch point.
Figure 18B:
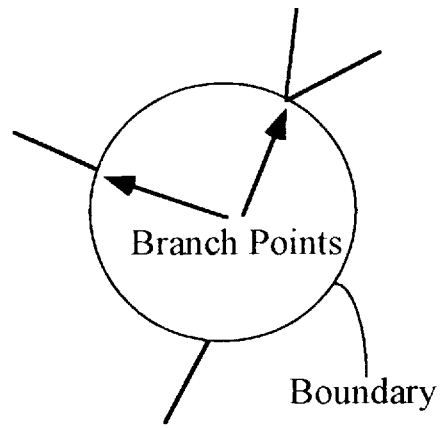
FIG. 18(b) is a simplified boundary which is a closed loop with branch points.

FIG. 17(a), FIG. 17(b) and FIG. 17(c) exhibit the regeneration images of different scales for W=16 and $\epsilon'$=40 dB. The pictures are revived with high fidelity. FIG. 17(a) is a reduced revived picture. FIG. 17(b) is a revived picture of the same size. FIG. 17(c) is an enlarged picture. The function approximation enables this invention to transform the pictures, such as, enlargement, reduction, anisotropic enlargement or rotation.

Example 2 愛

The main purpose of the invention is the processing of continual tone pictures. Of course, this invention can treat binary tone pictures which are far simpler than continually-changing tone pictures. This invention deals with binary tone pictures by the same steps of FIG. 1. However, the original picture has only two tones. When the picture is divided into a plurality of regions by the difference of tones, the regions have only two values of tones. The regions are exactly equal to the parts of white and the parts of black. Average tones can be determined to be either 0 or 256 in the case of L=256. There is no fluctuation of tones in every region.

The average-tone image is the same as the original binary tone picture. The boundaries coincide with the outlines of definite figures, characters or so on. The differential image is a uniform grey picture in which all the pixels have 256/2=128 degrees of tone. The number of bits per pixel is 1 bit/pel in original pictures. The differential image is approximated by the lowest division number spline having constant coefficients regardless to W and $\epsilon'$. The bit per pixel is 0.22 bit/pel when " 愛 " is treated by the present invention. The datum amount is reduced to one fourth of the original one by the invention.

Figure 16B:
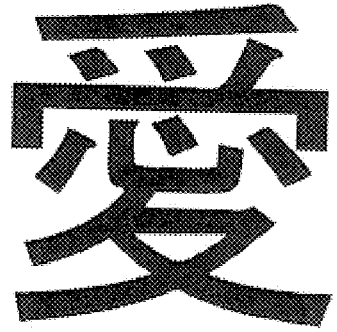
FIG. 16(b) is a picture which is data-compressed, memorized and revived by the present invention of the original picture of a Chinese character "愛" of FIG. 14(b).

FIG. 16(b) is the regenerated binary tone picture of FIG. 14(b). The original picture of FIG. 14(b) is plagued by zigzag outlines on weakly-slanting portions. The revived picture of FIG. 16(b) is immune from the zigzag outlines. The function approximation distinguishes the zigzag noise appearing on the outlines. Smooth outlines enhance the quality of the regenerated picture higher than the original picture. This invention improves the quality of pictures. This fact proves an epochmaking character of the present invention.

There is another important parameter $\epsilon$ in the present invention in addition to W and $\epsilon'$. It is the tolerance of $\epsilon$ (Eq. (31) or Eq. (67)) for the approximation of subboundaries. Since the boundaries coincide with inborn outlines, the approximation of boundaries is quite important for binary pictures. A smaller tolerance raises the accuracy of the approximation higher. Rigorous regeneration is not always desirable, since some defects accompany original pictures like the zigzag outlines of FIG. 14(b). The defects can be eliminated by determining an appropriate tolerance of $\epsilon$.

This invention succeeds in compressing data for saving the capacity of memories by the processes of reading-in a continual tone picture into the image memory, dividing the input image into regions, averaging the tones of the pixels in every region, making an average-tone image, extracting boundaries of the regions, dividing the boundaries at characteristic points into subboundaries, representing the subboundaries by multivariable vectors, approximating the subboundaries by functions, making a differential image by subtracting an average tone image from the original picture, and approximating the differential image by two variable functions. The function approximation drastically reduces the amount of the data for representing the picture. The smallness of the compressed data facilitates the storage, the regeneration and the enlargement. It is feasible to transmit the data to remote districts through telephone cables.

Relying upon the bitmap operation, conventional image processings used to accumulate the data directly related on pixels. Since the data are tightly fixed to individual pixels, it is nearly impossible to enlarge or reduce a picture, because the bitmap operation requires an enormous amount of calculations for enlargement or so on.

Relying on function approximation, this invention can regenerate an enlarged picture, a rotated picture or an anisotropically enlarged picture in a short time without degeneration of quality. This invention gives the most suitable image processing for computers, printing machines and remote transmission of information.

Although the main purpose of the present invention is the treatment of continually-changing tone pictures, this invention is also available to binary tone pictures. This invention can process arbitrary forms of pictures, e.g. photographs, illustrations, printed characters, manuscripts, computer graphics and so on.

What we claim is:

1. An apparatus of inputting and outputting continually-changing tone pictures comprising;

an image memory device (A) for memorizing an input image of a picture optically input by an image scanner, a picture input by another image inputting device or a picture produced in a computer as a set of continually-changing tones defined on a definite number of pixels aligning in a horizontal (x-) direction and in a vertical (y-) direction in an image plane;

a region division device (B) for dividing the input image into a plurality of regions having neighboring pixels of similar tones and reckoning an average-tone in every region;

a region memory device (C) for memorizing an average-tone image which is produced by painting every region with an average tone;

a boundary extracting device (D) for extracting boundaries dividing the neighboring regions as a series of points defined at corners of the pixels;

a branch point extracting device (E) for extracting points which lie on the boundaries in contact with more than two regions as branch points which divide a boundary into a plurality of boundary intervals;

a boundary memory device (F) for memorizing two dimensional coordinates (x,y) of points on every boundary interval sandwiched by two adjacent branch points;

a turning point extracting device (G) for extracting points at which the boundary interval turns at an angle more than a definite value as turning points which divide the boundary interval into a plurality of subboundaries;

a boundary approximation device (H) for producing approximation functions of the subboundaries terminated at the branch points or the turning points by repeating approximation of every subboundary with linear combinations of single-variable spline bases of division numbers M and N having an independent variable t and dependent variables x and y on a biorthonormal function method or on a least square method by increasing the division numbers M and N till the error becomes smaller than a critical value;

a regional data memory device (I) for memorizing information of the approximation functions of the subboundaries and relations of the subboundaries to the regions;

a differential image production device (J) for producing a differential image by subtracting the average-tone image from the input image;

a differential image memory device (K) for memorizing differential tones of the pixels aligning in x-direction and in y-direction in the differential image, a data approximation device (N) for producing approximation functions of the differential image by repeating approximation of the differential image by a linear combination of two-variable spline bases of division numbers M and N having independent variables (x,y) defined in the image plane and a dependent variable S denoting tones on a biorthonormal function method or on a least square method by increasing the division numbers M and N till the error becomes smaller than a critical value;

a compressed data memory device (O) for memorizing parameters of the approximation functions of the differential image;

a differential image retrieve device (V) for retrieving a differential image from the compressed data;

a continual tone image regeneration device (W) for regenerating a continually-changing tone image by reading out data of boundaries and average tones from the region memory device (C), drawing boundaries on the differential image, making regions enclosed by the boundaries and adding the average tones to the differential tones of the pixels in the regions; and a continual tone image outputting device (X) for outputting the regenerated continually-changing tone image.

2. An apparatus as claimed in claim 1, further comprising:

an encoding device (P) for encoding the regional data of the boundaries and the average tones from the regional date memory device (I) and the compressed data of the differential image from the compressed data memory device (O);

an encoded data outputting device (Q) for outputting encoded information of the regional data and the compressed data;

an encoded data memory device (R) for memorizing the encoded information of the regional data and the compressed data;

an encoded data inputting device (S) for inputting the encoded information from the encoded data memory device (R); and a decoding device for recovering the information of the regional data and the compressed data by decoding the encoded data;

wherein the differential image retrieve device (V) retrieves a differential image from the compressed data decoded by the decoding device (T).

3. An apparatus as claimed in claim 2, further comprising:

a differential image division device (L) for dividing the differential image from the differential image memory device (K) into a plurality of blocks;

a differential block memory device (M) for memorizing the blocks and the differential tones in every block;

a differential block revival device (U) for regenerating differential blocks from the compressed data;

wherein the data approximation device (N) produces approximation functions of the differential blocks by repeating approximation of every differential block by a linear combination of two-variable spline bases of division numbers M and N having independent variables (x,y) defined in the image plane and a dependent variable S denoting tones on a biorthonormal function method or on a least square method by increasing the division numbers M and N till the error becomes smaller than a critical value, and the differential image retrieve device (W) makes a differential image by gathering the differential blocks.

4. An apparatus of inputting and outputting color pictures comprising;

an image memory device (A) for memorizing data of an input image of a color picture optically input by an image scanner, a color picture input by another image inputting device or a color picture produced in a computer as a set of primary colors and continually-changing tones of the primary colors defined on a definite number of pixels aligning in a horizontal (x-) direction and in a vertical (y-) direction in an image plane;

a color resolution device (Y) for resolving data of the input image into a plurality of primary color images and making data of the continually-changing tones of the primary colors;

region division devices (B) of the number of the primary colors for dividing the input image of each primary color into a plurality of regions having neighboring pixels of similar tones and reckoning an average-tone in every region of each primary color;

region memory devices (C) for memorizing an average-tone image which is produced by painting every region with an average tone for each primary color;

boundary extracting devices (D) for extracting boundaries dividing the neighboring regions as a series of points defined at corners of the pixels for each primary color;

branch point extracting devices (E) of each primary color for extracting points which lie on the boundaries in contact with more than two regions as branch points which divide a boundary into a plurality of boundary intervals;

boundary memory devices (F) for memorizing two dimensional coordinates (x,y) of points on every boundary interval sandwiched by two adjacent branch points;

turning point extracting devices (G) for extracting points at which the boundary interval turns at an angle more than a definite value as turning points which divide the boundary interval into a plurality of subboundaries;

boundary approximation devices (H) for producing approximation functions of the subboundaries terminated at the branch points or the turning points by repeating approximation of every subboundary with linear combinations of single-variable spline bases of division numbers M and N having an independent variable t and dependent variables x and y on a biorthonormal function method or on a least square method increasing M and N till the error becomes smaller than a critical value;

regional data memory devices (I) for memorizing information of the approximation functions of the subboundaries and relations of the subboundaries to the regions;

differential image production devices (J) for producing a differential image by subtracting the average-tone image from the input image;

differential image memory devices (K) for memorizing differential tones of the pixels aligning in x-direction and in y-direction in the differential image, data approximation devices (N) for producing approximation functions of the differential image by repeating approximation of the differential image by a linear combination of two-variable spline bases of division numbers M and N having independent variables (x,y) defined in the image plane and a dependent variable S denoting tones by a biorthonormal function method or a least square method by increasing the division numbers M and N till the error becomes smaller than a critical value;

compressed data memory devices (O) for memorizing parameters of the approximation functions of the differential image;

differential image retrieve devices (V) for retrieving a differential image from the compressed data;

continual tone image regeneration devices (W) for regenerating a continually-changing tone images of each primary colors by reading out data of boundaries and average tones from the region memory device (C), drawing boundaries on the differential image, making regions enclosed by the boundaries and adding the average tones to the differential tones of the pixels in the regions;

a color synthesis device (Z) for synthesizing the continually-changing tone images of the primary colors together into a unified color image; and a color picture outputting devices for outputting the unified color picture.

5. An apparatus as claimed in claim 4, further comprising:

an encoding device (P) for encoding the regional data of the boundaries and the average tones from the regional date memory device (I) and the compressed data of the differential image from the compressed data memory device (O);

an encoded data outputting device (Q) for outputting encoded information of the regional data and the compressed data;

an encoded data memory device (R) for memorizing the encoded information of the regional data and the compressed data;

an encoded data inputting device (S) for inputting the encoded information from the encoded data memory device (R); and a decoding device for recovering the information of the regional data and the compressed data by decoding the encoded data;

wherein the differential image retrieve device (V) retrieves a differential image from the compressed data decoded by the decoding device (T).

6. An apparatus as claimed in claim 5, further comprising:

a differential image division device (L) for dividing the differential image from the differential image memory device (K) into a plurality of blocks;

a differential block memory device (M) for memorizing the blocks and the differential tones in every block;

a differential block revival device (U) for regenerating differential blocks from the compressed data;

wherein the data approximation device (N) produces approximation functions of the differential blocks by repeating approximation of every differential block by a linear combination of two-variable spline bases of division numbers M and N having independent variables (x,y) defined in the image plane and a dependent variable S denoting tones on a biorthonormal function method or on a least square method by increasing the division numbers M and N till the error becomes smaller than a critical value and the differential image retrieve device (W) makes a differential image by gathering the differential blocks.

7. A method of inputting and outputting continually-changing tone pictures comprising the steps of;

memorizing an input image of a picture optically input by an image scanner, a picture input by another image inputting device or a picture produced in a computer in an image memory device (A) as a set of continually-changing tones defined on a definite number of pixels aligning in a horizontal (x-) direction and in a vertical (y-) direction in an image plane;

dividing the input image into a plurality of regions having neighboring pixels of similar tones, reckoning an average tone in every region;

memorizing an average-tone image which is produced by painting every region with an average tone into a region memory device (C);

extracting boundaries dividing the neighboring regions as a series of points defined at corners of the pixels;

extracting points which lie on the boundaries in contact with more than two regions as branch points which divide a boundary into a plurality of boundary intervals;

memorizing two dimensional coordinates (x,y) of points on every boundary interval sandwiched by two adjacent branch points into a boundary memory device (F);

extracting points at which the boundary interval turns at an angle more than a definite value as turning points which divide the boundary interval into a plurality of subboundaries;

producing approximation functions of the subboundaries terminated by the branch points or the turning points by repeating approximation of every subboundary with linear combinations of single-variable spline bases of division numbers M and N having an independent variable t and dependent variables x and y by a biorthonormal function method or a least square method by increasing the division numbers M and N till the error becomes smaller than a critical value;

memorizing information of the approximation functions of the subboundaries and relations of the subboundaries to the regions into a regional data memory device (I);

producing a differential image by subtracting the average-tone image from the input image;

memorizing differential tones of the pixels aligning in x-direction and in y-direction in the differential image into a differential image memory device (K), producing approximation functions of the differential image by repeating approximation of the differential image by a linear combination of two-variable spline bases of division numbers M and N having independent variables (x,y) defined in the image plane and a dependent variable S denoting tones on a biorthonormal function method or on a least square method by increasing division numbers M and N till the error becomes smaller than a critical value;

memorizing parameters of the approximation functions of the differential image into a compressed data memory device (O);

retrieving a differential image from the compressed data;

reading out data of the boundaries from the boundary memory device (F);

reading out data of the average tones from the region memory device (C);

drawing boundaries on the differential image;

making regions enclosed by the boundaries;

adding the average tones of the regions to the differential tones of the pixels in the regions;

regenerating a continually-changing tone image; and outputting the regenerated continually-changing tone image.

8. A method as claimed in claim 7, further comprising the steps of:

encoding the regional data of the boundaries and the average tones from the regional date memory device (I) and the compressed data of the differential image from the compressed data memory device (O);

outputting encoded information of the regional data and the compressed data;

memorizing the encoded information of the regional data and the compressed data into an encoded data memory device (R);

inputting the encoded information from the encoded data memory device (R);

recovering the information of the regional data and the compressed data by decoding the encoded data; and retrieving a differential image from the decoded compressed data.

9. A method as claimed in claim 8, further comprising the steps of:

dividing the differential image from the differential image memory device (K) into a plurality of blocks;

memorizing the blocks and the differential tones in every block into a differential block memory device (M);

repeating approximation of every differential block by a linear combination of two-variable spline bases of division numbers M and N having independent variables (x,y) defined in the image plane and a dependent variable S denoting tones on a biorthonormal function method or on a least square method by increasing the division numbers M and N till the error becomes smaller than a critical value;

producing approximation functions of the differential blocks by determining coefficients on the spline bases;

memorizing the division numbers M and N and the coefficients of the approximation functions of the differential blocks into a compressed data memory device (O);

encoding the compressed data of the division numbers and the coefficients;

memorizing the encoded, compressed data of the division numbers and the coefficients;

decoding the encoded, compressed data;

regenerating differential blocks from the compressed data;

gathering the differential blocks; and retrieving a differential image by the gathered differential blocks.

10. A method as claimed in claim 9, wherein neighboring pixels having tones within a tone width of 2 W are sorted into a region and the differential image having middle tones within a 2 W tone width is adjustable by changing the tone width W.

11. A method as claimed in claim 9, wherein the tones $S(x,y)$ in a differential block are approximated by two-variable spline bases $\Psi_{mn}(x,y)$ as $S(x,y)=\Sigma c_{mn}\Psi_{mn}(x,y)$, and the coefficients $\{c_{mn}\}$ are given by $c_{mn}=\Sigma\Sigma \text{diff}(x_i, y_j)\Phi_{mn}(x_i, y_j)$, where $\text{diff}(x_i,y_j)$ is a differential tone at $(x_i,y_j)$ which is defined by $\text{diff}(x,y)=g(x,y)-h(q)$, $g(x,y)$ is an original tone, $h(q)$ is an average tone of the region, and $\Phi_{mn}(x,y)$ is a biorthonormal base of $\Psi_{mn}(x,y)$ which satisfies equations $(\Phi_{mn}\cdot\Psi_{pq})=\delta_{mp}\delta_{nq}$.

12. A method as claimed in claim 9, wherein the coordinates $(x_i,y_j)$ of a subboundary are approximated by single-variable spline bases $N_p(t)$ and $N_q(t)$ as $s_x(t)=\Sigma c_p N_p(t)$ and $s_y(t)=c_q N_q(t)$ and the coefficients $\{c_p\}$ and $\{c_q\}$ are given by $c_p=\Sigma x_i L_p(x_i)$ and $c_q=\Sigma y_i L_q(y_i)$, where $L_p(x)$ and $L_q(y)$ are biorthonormal bases of $Np(x)$ and $Nq(y)$ which satisfy equations $(N_m(x)\cdot L_p(x))=\delta_{mp}$ and $(N_n(y)\cdot L_q(y))=\delta_{nq}$.

13. A method of inputting and outputting color pictures comprising the steps of;

memorizing data of an input image of a color picture optically input by an image scanner, a color picture input by another image inputting device or a color picture produced in a computer as a set of primary colors and continually-changing tones of the primary colors defined on a definite number of pixels aligning in a horizontal (x-) direction and in a vertical (y-) direction in an image plane into an image memory device (A);

resolving data of the input color image into a plurality of primary color images;

making data of the continually-changing tones of the primary colors;

dividing each of the input images of the primary colors into a plurality of regions having neighboring pixels of similar tones, reckoning an average tone in every region for every primary color image;

memorizing an average-tone image which is produced by painting every region with an average tone into a region memory device (C) for each primary colors;

extracting boundaries dividing the neighboring regions as a series of points defined at corners of the pixels for all the primary colors;

extracting points which lie on the boundaries in contact with more than two regions as branch points which divide a boundary into a plurality of boundary intervals;

memorizing two dimensional coordinates (x,y) of points on every boundary interval sandwiched by two adjacent branch points into a boundary memory device (F);

extracting points at which the boundary interval turns by an angle more than a definite value as turning points which divide the boundary interval into a plurality of subboundaries;

producing approximation functions of the subboundaries terminated by the branch points or the turning points by repeating approximation of every subboundary with linear combinations of single-variable spline bases of division numbers M and N having an independent variable t and dependent variables x and y on a biorthonormal function method or on a least square method by increasing the division numbers M and N till the error becomes smaller than a critical value;

memorizing information of the approximation functions of the subboundaries and relations of the subboundaries to the regions into a regional data memory device (I);

producing a differential image by subtracting the average-tone image from the input image;

memorizing the differential tones of the pixels aligning in x-direction and in y-direction into a differential image memory device (K), producing approximation functions of the differential image by repeating approximation of the differential image by a linear combination of two-variable spline bases of division numbers M and N having independent variables (x,y) defined in the image plane and a dependent variable S denoting tones on a biorthonormal function method or on a least square method by increasing division numbers M and N till the error becomes smaller than a critical value;

memorizing parameters of the approximation functions of the differential image into a compressed data memory device (O);

retrieving a differential image from the compressed data;

reading out data of the boundaries from the boundary memory device (F);

reading out data of the average tones from the region memory device (C);

drawing boundaries on the differential image;

making regions enclosed by the boundaries;

adding the average tones of the regions to the differential tones of the pixels in the regions;

regenerating a continually-changing tone image for each primary colors;

synthesizing the continually-changing tone images of the primary colors together into a unified color image; and outputting the unified color picture.

14. A method as claimed in claim 13, further comprising the steps of:

encoding the regional data of the boundaries and the average tones from the regional date memory device (I) for all the primary colors;

encoding the compressed data of the differential image from the compressed data memory device (O) for every color;

outputting encoded information of the regional data and the compressed data;

memorizing the encoded information of the regional data and the compressed data into an encoded data memory device (R);

inputting the encoded information from the encoded data memory device (R);

recovering the information of the regional data and the compressed data by decoding the encoded data; and retrieving a differential image from the decoded compressed data.

15. A method as claimed in claim 14, further comprising the steps of:

dividing the differential image from the differential image memory device (K) into a plurality of blocks for every primary color;

memorizing the blocks and the differential tones in every block into a differential block memory device (M) for all the primary colors;

repeating approximation of every differential block by a linear combination of two-variable spline bases of division numbers M and N having independent variables (x,y) defined in the image plane and a dependent variable S denoting tones on a biorthonormal function method or on a least square method by increasing the division numbers M and N till the error becomes smaller than a critical value;

producing approximation functions of the differential blocks by determining the coefficients on the spline bases;

memorizing the division numbers M and N and the coefficients of the approximation functions of the differential blocks into a compressed data memory device (O);

encoding the compressed data of the division numbers and the coefficients;

memorizing the encoded, compressed data of the division numbers M and N and the coefficients;

decoding the encoded, compressed data;

regenerating differential blocks from the compressed data;

gathering the differential blocks; and retrieving a differential image by the gathered differential blocks.

16. A method as claimed in claim 15, wherein the tones $S(x,y)$ in a differential block are approximated by two-variable spline bases $\Psi_{mn}(x,y)$ as $S(x,y)=\Sigma c_{mn}\Psi_{mn}(x,y)$, and the coefficients $\{c_{mn}\}$ are given by $c_{mn}=\Sigma\Sigma \text{diff}(x_i, y_j)\Phi_{mn}(x_i, y_j)$, where $\text{diff}(x_i,y_j)$ is a differential tone at $(x_i,y_j)$ which is defined by $\text{diff}(x,y)=g(x,y)-h(q)$, $g(x,y)$ is an original tone, $h(q)$ is an average tone of the region, and $\Phi_{mn}(x,y)$ is a biorthonormal base of $\Psi_{mn}(x,y)$ which satisfies equations $(\Phi_{mn}\cdot\Psi_{pq})=\delta_{mp}\delta_{nq}$.

17. A method as claimed in claim 16, wherein the coordinates $(x_i,y_j)$ of a subboundary are approximated by single-variable spline bases $N_p(t)$ and $N_q(t)$ as $s_x(t)=\Sigma c_p N_p(t)$ and $s_y(t)=c_q N_q(t)$ and the coefficients $\{c_p\}$ and $\{c_q\}$ are given by $c_p=\Sigma x_i L_p(x_i)$ and $c_q=\Sigma y_i L_q(y_i)$, where $L_p(x)$ and $L_q(y)$ are biorthonormal bases of $N_p(x)$ and $N_q(y)$ which satisfies equations $(N_m(x)\cdot L_p(x))=\delta_{mp}$ and $(N_n(y)\cdot L_q(y))=\delta_{nq}$.

* * * * *